US010992933B2

(12) United States Patent
Choi et al.

(10) Patent No.: US 10,992,933 B2
(45) Date of Patent: Apr. 27, 2021

(54) VIDEO DECODING METHOD AND DEVICE FOR SAME AND VIDEO ENCODING METHOD AND DEVICE FOR SAME

(71) Applicant: SAMSUNG ELECTRONICS CO., LTD., Suwon-si (KR)

(72) Inventors: In-kwon Choi, Seongnam-si (KR); Min-woo Park, Yongin-si (KR); Bo-ra Jin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 15/998,649

(22) PCT Filed: Feb. 16, 2017

(86) PCT No.: PCT/KR2017/001737
§ 371 (c)(1),
(2) Date: Aug. 16, 2018

(87) PCT Pub. No.: WO2017/142335
PCT Pub. Date: Aug. 24, 2017

(65) Prior Publication Data
US 2020/0336739 A1 Oct. 22, 2020

Related U.S. Application Data

(60) Provisional application No. 62/295,646, filed on Feb. 16, 2016.

(51) Int. Cl.
*H04N 19/11* (2014.01)
*H04N 19/59* (2014.01)
(Continued)

(52) U.S. Cl.
CPC ........... *H04N 19/11* (2014.11); *H04N 19/105* (2014.11); *H04N 19/167* (2014.11);
(Continued)

(58) Field of Classification Search
CPC .... H04N 19/11; H04N 19/105; H04N 19/167; H04N 19/176; H04N 19/59; H04N 19/593; H04N 19/61
(Continued)

(56) References Cited

U.S. PATENT DOCUMENTS 9,247,247 B2  1/2016 Min et al.
9,420,294 B2  8/2016 Jeon et al.
(Continued)

FOREIGN PATENT DOCUMENTS

EP        2658263 A2     10/2013
KR  10-2014-0049098 A    4/2014
(Continued)

OTHER PUBLICATIONS

Communication dated Dec. 4, 2018, issued by the European Patent Office in counterpart European Application No. 17753496.3.
(Continued)

*Primary Examiner* — Hee-Yong Kim
(74) *Attorney, Agent, or Firm* — Sughrue Mion, PLLC

(57) ABSTRACT

Provided is a video decoding method including obtaining a bitstream including residual data about a residual block of a current block, determining a plurality of prediction directions with respect to the current block, determining a plurality of reference samples included in a neighboring region of the current block in a current image, by using the plurality of prediction directions that are determined, generating a prediction block of the current block by using the plurality of reference samples, obtaining a residual block of the current block based on the residual data about the residual block of the current block, and reconstructing the current block by using the prediction block of the current block and the residual block of the current block.

15 Claims, 33 Drawing Sheets

(51) Int. Cl.
  *H04N 19/61* (2014.01)
  *H04N 19/167* (2014.01)
  *H04N 19/176* (2014.01)
  *H04N 19/593* (2014.01)
  *H04N 19/105* (2014.01)

(52) U.S. Cl.
  CPC ........... *H04N 19/176* (2014.11); *H04N 19/59* (2014.11); *H04N 19/593* (2014.11); *H04N 19/61* (2014.11)

(58) Field of Classification Search
  USPC .................................................. 375/240.02
  See application file for complete search history.

(56) References Cited

U.S. PATENT DOCUMENTS

| | | | |
|---|---|---|---|
| 2012/0106636 A1 | 5/2012 | Kim et al. |
| 2013/0136175 A1 | 5/2013 | Wang et al. |
| 2013/0272400 A1 | 10/2013 | Jung et al. |
| 2016/0316201 A1 | 10/2016 | Lee et al. |
| 2016/0330478 A1 | 11/2016 | Jeon et al. |
| 2018/0316934 A1* | 11/2018 | Nam ...................... H04N 19/70 |

FOREIGN PATENT DOCUMENTS

| | | |
|---|---|---|
| KR | 10-2015-0071003 A | 6/2015 |
| KR | 10-2015-0140848 A | 12/2015 |
| KR | 10-2015-0141177 A | 12/2015 |
| KR | 10-2015-0145688 A | 12/2015 |

OTHER PUBLICATIONS

Thomas Wiegand et al., "Overview of the H.264/AVC Video Coding Standard", IEEE Transactions on Circuits and Systems for Video Technology, Institute of Electrical and Electronics Engineers, vol. 13, No. 7, Jul. 1, 2003, pp. 560-576 (17 pages total).

Ian E. Richardson, "H.264 and MPEG-4 Video Compression: Video Coding for Next-generation Multimedia", John Wiley & Sons., Ltd., Oct. 17, 2003, pp. 159-223 (65 pages total).

Search Report dated May 18, 2017, issued by the International Searching Authority in International Application No. PCT/KR2017/001737 (PCT/ISA/210).

* cited by examiner

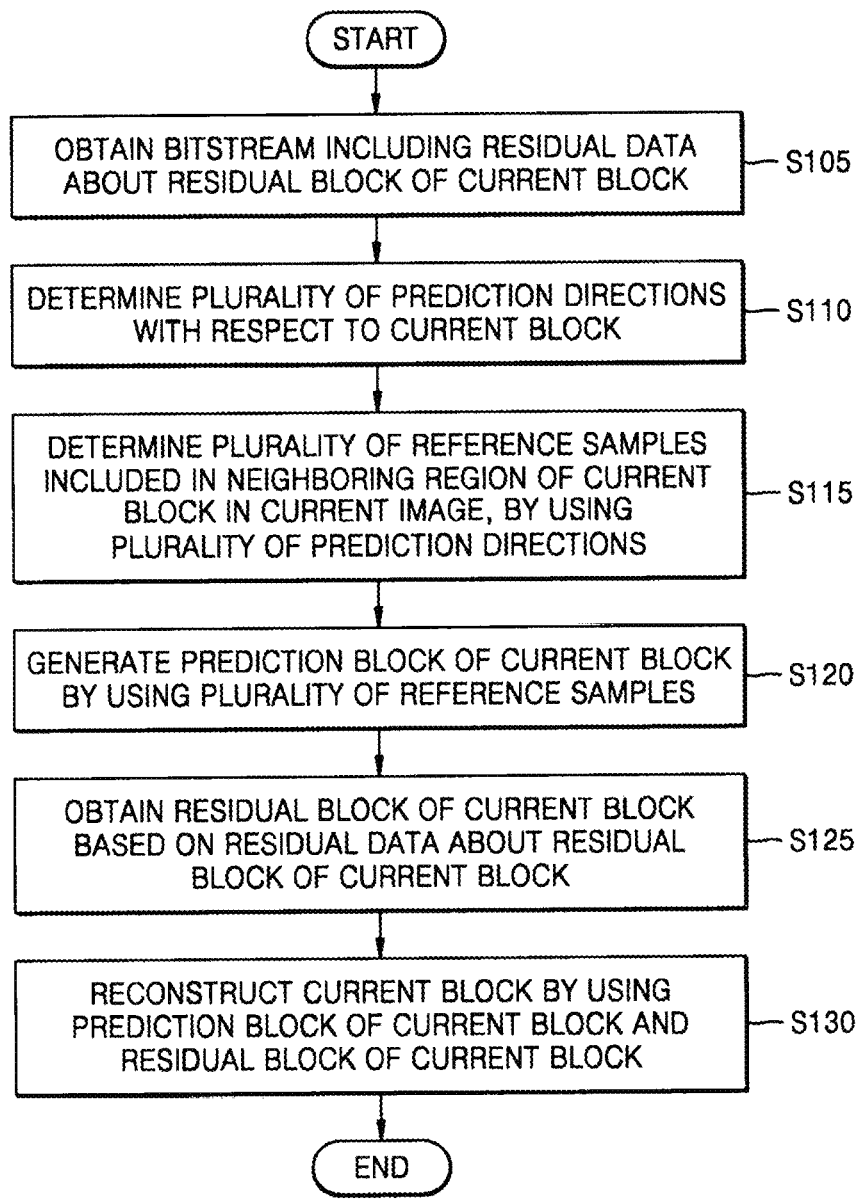

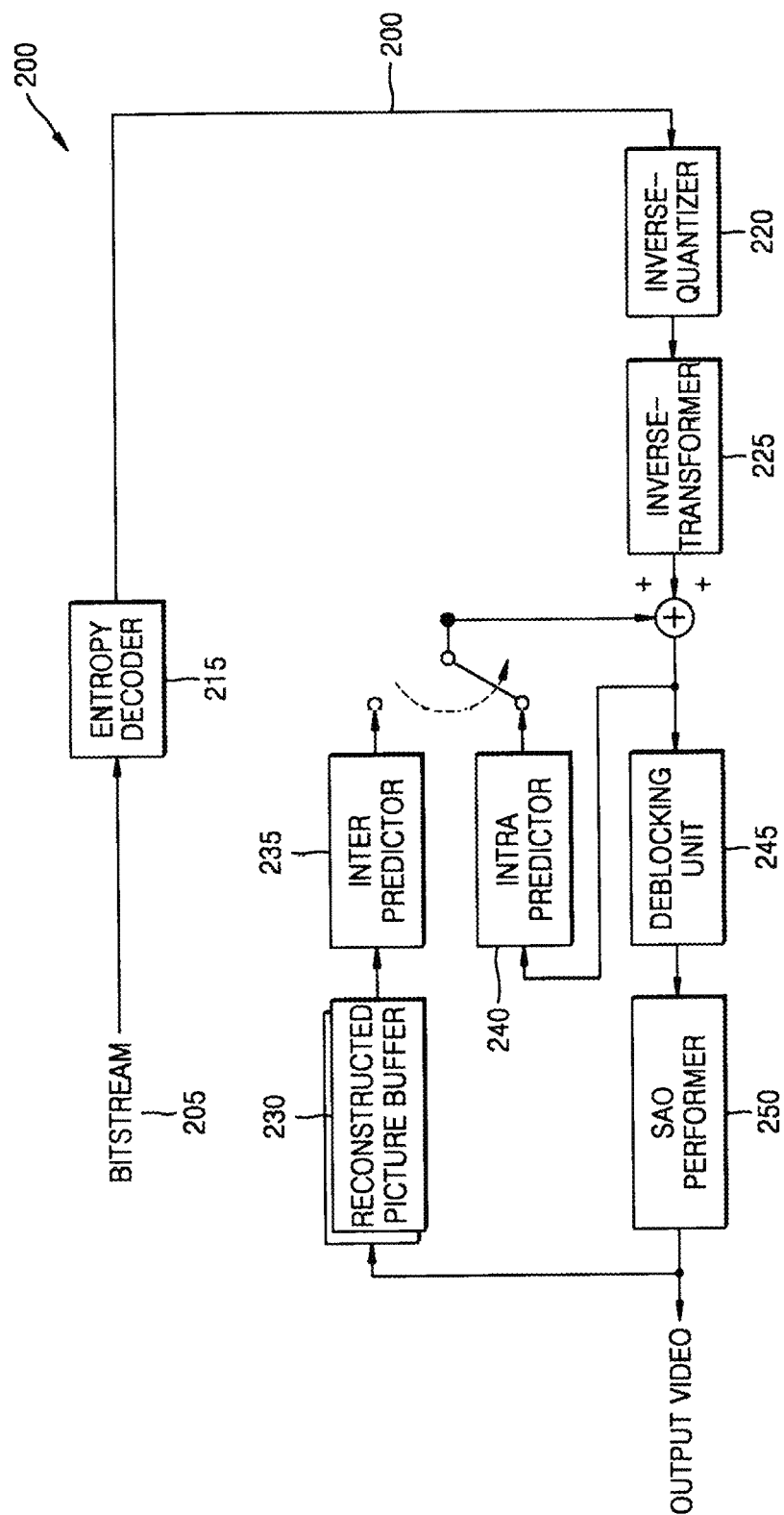

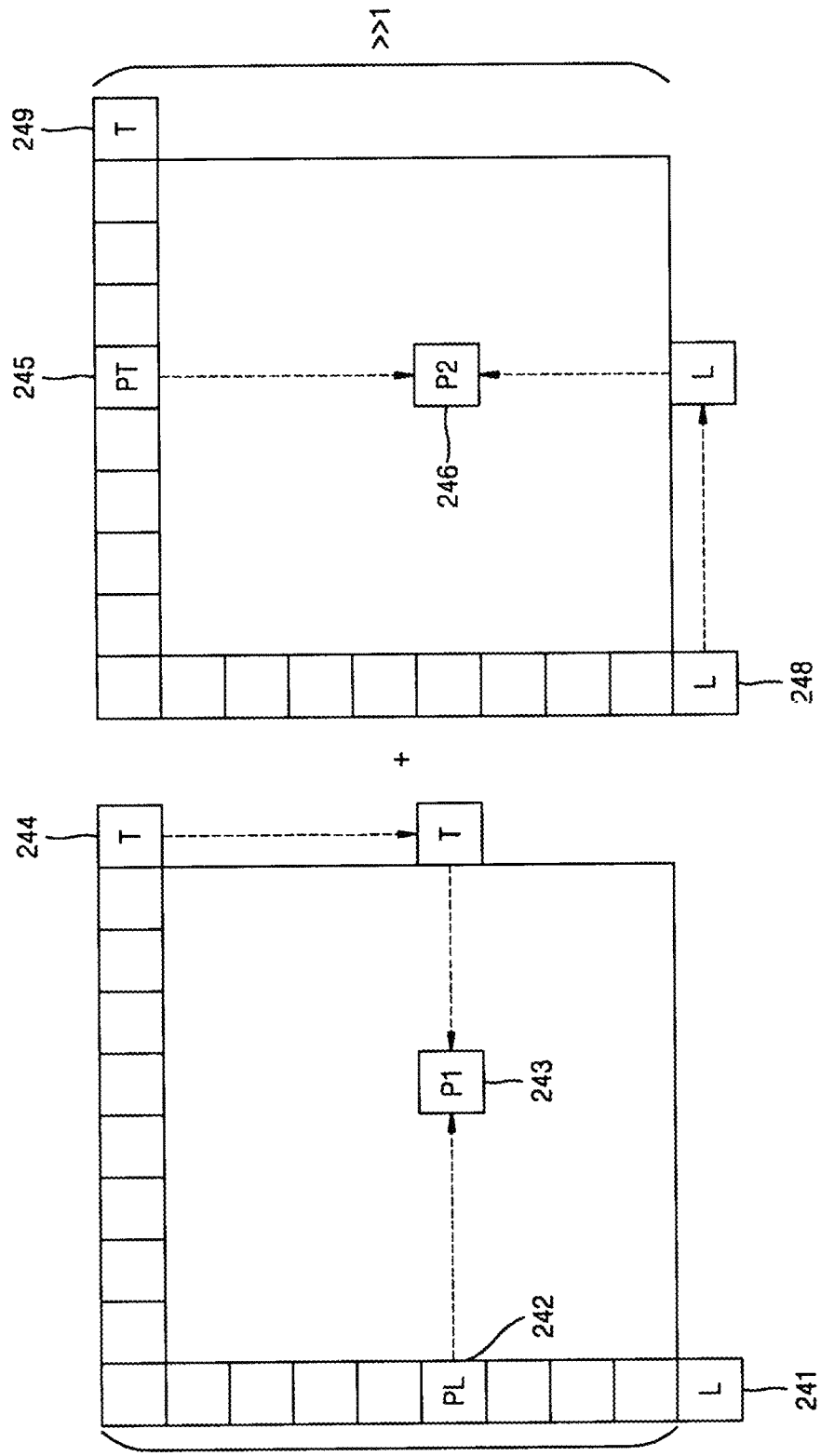

FIG. 20

| DEPTH \ BLOCK SHAPE | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... | ns
VIDEO DECODING METHOD AND DEVICE FOR SAME AND VIDEO ENCODING METHOD AND DEVICE FOR SAME

TECHNICAL FIELD

The present disclosure relates to a video decoding method and a video encoding. More particularly, the present disclosure relates to video decoding and video encoding performing intra prediction.

BACKGROUND ART

As hardware for reproducing and storing high resolution or high quality video content is being developed and supplied, the need for a video codec for effectively encoding or decoding high resolution or high quality video content has increased. In a conventional video codec, a video is encoded according to a limited encoding method based on coding units of a tree structure.

Image data of a spatial domain is transformed into coefficients of a frequency domain via frequency transformation. According to a video codec, an image is split into blocks having a predetermined size, a discrete cosine transform (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly, generated with small-sized data.

DESCRIPTION OF EMBODIMENTS

Technical Problem

According to various embodiments, a plurality of prediction directions with respect to a current block are determined, a plurality of reference samples included in a neighboring area of a current block in a current image are determined by using the plurality of prediction directions, and an intra prediction may be performed on the current block according to the plurality of reference samples. Thus, a similar value to that of an original block of the current block may be predicted, and encoding/decoding efficiency may be improved.

Provided is a computer-readable recording medium having recorded thereon a program for executing a method according to various embodiments.

Here, aspects of various embodiments are not limited thereto, and additional aspects will be set forth in part in the description which follows and, in part, will be apparent from the description, or may be learned by practice of the presented embodiments.

Solution to Problem

Aspects of various embodiments are not limited thereto, and additional aspects will be set forth in part in the description which follows and, in part, will be apparent from the description, or may be learned by practice of the presented embodiments.

According to an aspect of the present disclosure, a video decoding method includes: obtaining a bitstream including residual data about a residual block of a current block; determining a plurality of prediction directions with respect to the current block; determining a plurality of reference samples included in a neighboring region of the current block in a current image, by using the plurality of prediction directions that are determined; generating a prediction block of the current block by using the plurality of reference samples; obtaining a residual block of the current block based on the residual data about the residual block of the current block; and reconstructing the current block by using the prediction block of the current block and the residual block of the current block.

According to an aspect of the present disclosure, a video decoding apparatus includes: an obtainer configured to obtain a bitstream including residual data about a residual block of a current block; an intra predictor configured to determine a plurality of prediction directions with respect to the current block, to determine a plurality of reference samples included in a neighboring region of the current block in a current image by using the determined plurality of prediction directions, and to generate a prediction block of the current block by using the plurality of reference samples; and an image decoder configured to obtain the residual block of the current block based on the residual data about the residual block of the current block, and to reconstruct the current block by using the residual block of the current block.

According to an aspect of the present disclosure, a video encoding method includes: performing an intra prediction on a current block based on a plurality of prediction direction candidates with respect to the current block; determining a plurality of prediction directions with respect to the current block based on the intra prediction on the current block; generating a residual block of the current block by using a prediction block of the current block that is generated according to the determined plurality of prediction directions with respect to the current block; and generating a bitstream including data about the residual block.

The performing of the intra prediction on the current block based on the plurality of prediction directions with respect to the current block may include: determining a plurality of reference samples included in a neighboring region of the current block in a current image, by using the plurality of prediction directions with respect to the current block; and generating the prediction block of the current block by using the plurality of reference samples.

According to an aspect of the present disclosure, a video encoding apparatus includes: an intra predictor configured to perform an intra prediction on a current block based on a plurality of prediction direction candidates with respect to the current block, and to determine a plurality of prediction directions with respect to the current block based on the intra prediction on the current block; and an image encoder configured to generate a residual block of the current block by using a prediction block of the current block that is generated according to the determined plurality of prediction directions with respect to the current block, and to generate a bitstream including data about the residual block. The intra predictor is configured to determine a plurality of reference samples included in a neighboring region of the current block in a current image by using the plurality of prediction directions with respect to the current block, and to generate the prediction block of the current block by using the plurality of reference samples.

According to an aspect of the present disclosure, a computer-readable recording medium has embodied thereon a program for executing the method according to one or more embodiments.

Advantageous Effects of Disclosure

According to various embodiments, a plurality of prediction directions with respect to a current block are determined, a plurality of reference samples included in a neighboring area of a current block in a current image are determined by using the plurality of prediction directions, and an intra prediction is performed on the current block according to the plurality of reference samples. Thus, a similar value to that of an original block of the current block may be predicted, and encoding/decoding efficiency may be improved.

BRIEF DESCRIPTION OF DRAWINGS

FIG. 1B is a flowchart of a video decoding method according to various embodiments.

FIG. 2 is a block diagram of an image decoder according to various embodiments.

FIG. 4E is a reference diagram for describing a planar mode that is an example of an intra prediction mode.

FIG. 20 illustrates processes of determining a depth of a coding unit as a shape and size of the coding unit are changed, when a plurality of coding units are determined when the coding unit is recursively split, according to an embodiment.

BEST MODE

Figure 1A:
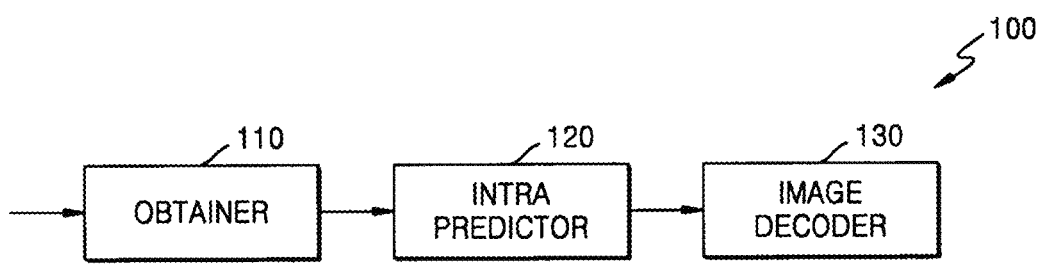
FIG. 1A is a block diagram of a video decoding apparatus according to various embodiments.

According to embodiments, a video decoding method includes: obtaining a bitstream including residual data about a residual block of a current block; determining a plurality of prediction directions with respect to the current block; determining a plurality of reference samples included in a neighboring region of the current block in a current image, by using the plurality of prediction directions that are determined; generating a prediction block of the current block by using the plurality of reference samples; obtaining a residual block of the current block based on the residual data about the residual block of the current block; and reconstructing the current block by using the prediction block of the current block and the residual block of the current block.

The plurality of prediction directions may be adjacent to one another.

The determining of the plurality of prediction directions with respect to the current block may include: determining a first prediction direction of a first region in the current block, by using an anchor prediction direction of an anchor sample from among samples of an anchor region including some samples of the current block and the neighboring region; and determining a second prediction direction of a second region in the current block by using the anchor prediction direction of the anchor sample.

The first region or the second region may be a sample or M×N blocks (M and N are integers).

The plurality of prediction directions with respect to the current block may include a first prediction direction and a second prediction direction, and the determining of the plurality of reference samples included in the neighboring region of the current block in a current image, by using the plurality of prediction directions that are determined, may include: determining a first reference sample by using the first prediction direction; and determining a second reference sample by using the second prediction, direction.

The generating of the prediction block of the current block may include: generating a first prediction block of the current block by using the first reference sample; generating a second prediction block of the current block by using the second reference sample; and generating the prediction block by using the first prediction block and the second prediction block.

The video decoding apparatus may further include: obtaining, from the bitstream, information about the first prediction direction; and determining the second prediction direction by using the information about the first prediction direction.

The first prediction direction and the second prediction direction may be determined by performing an interpolation based on the anchor prediction direction according to locations of the first region and the second region, which are apart from a location of the anchor sample.

A block including the current block may be hierarchically split to generate a transformation block having at least one transformation depth between a current transformation depth and a lower transformation depth, and the first region may be one of the transformation block having at least one transformation depth between the current transformation depth and the lower transformation depth.

The current block may be split in a horizontal direction or a vertical direction to generate a first block and a second block, and the determining of the plurality of prediction directions with respect to the current block may include: determining a first prediction direction of a first region included in the first block and a second prediction direction of a second region included in the first block, by using an anchor prediction direction of an anchor sample from among samples of a first anchor region that includes some samples of the first block and a neighboring region; and determining a third prediction direction of a third region included in the second block and a fourth prediction direction of a fourth region in the second block, by using an anchor prediction direction of an anchor sample from among samples of a second anchor sample that includes some samples of the second block and a neighboring region.

A filtering may be performed with respect to prediction directions or prediction values of samples located around a boundary between the first block and the second block.

Otherwise flag signalling about whether to use a suggested method)

The video decoding method may further include obtaining, from the bitstream, a flag indicating whether an intra prediction is performed on the current block based on one prediction direction or based on a plurality of prediction directions, wherein the determining of the plurality of prediction directions with respect to the current block may include: when the flag indicates that the intra prediction is performed on the current block based on the plurality of prediction directions, determining the plurality of prediction directions, and the determining of the plurality of reference samples included in the neighboring region of the current block in a current image, by using the plurality of prediction directions that are determined, may include: when the flag indicates that the intra prediction is performed on the current block based on the plurality of prediction directions, determining a plurality of reference samples included in a neighboring region of the current block in a current image, by using the determined plurality of prediction directions.

According to embodiments, a video encoding method includes: performing an intra prediction on a current block based on a plurality of prediction direction candidates with respect to the current block; determining a plurality of prediction directions with respect to the current block based on the intra prediction on the current block; generating a residual block of the current block by using a prediction block of the current block that is generated according to the determined plurality of prediction directions with respect to the current block; and generating a bitstream including data about the residual block.

The performing of the intra prediction on the current block based on the plurality of prediction directions with respect to the current block may include: determining a plurality of reference samples included in a neighboring region of the current block in a current image, by using the plurality of prediction directions with respect to the current block; and generating the prediction block of the current block by using the plurality of reference samples.

The plurality of prediction direction candidates may include a second prediction direction and a third prediction direction adjacent to a first prediction direction, the performing of the intra prediction on the current block based on the plurality of prediction direction candidates with respect to the current block may include performing an intra prediction on the current block by using the first prediction direction and one of the plurality of prediction direction candidates.

The determining of the plurality of prediction directions with respect to the current block may include determining the first prediction direction and one of the plurality of prediction direction candidates based on the intra prediction.

According to embodiments, a video decoding apparatus includes: an obtainer configured to obtain a bitstream including residual data about a residual block of a current block; an intra predictor configured to determine a plurality of prediction directions with respect to the current block, to determine a plurality of reference samples included in a neighboring region of the current block in a current image by using the determined plurality of prediction directions, and to generate a prediction block of the current block by using the plurality of reference samples; and an image decoder configured to obtain the residual block of the current block based on the residual data about the residual block of the current block, and to reconstruct the current block by using the residual block of the current block.

According to embodiments, a video encoding apparatus includes: an intra predictor configured to perform an intra prediction on a current block based on a plurality of prediction direction candidates with respect to the current block, and to determine a plurality of prediction directions with respect to the current block based on the intra prediction on the current block; and an image encoder configured to generate a residual block of the current block by using a prediction block of the current block that is generated according to the determined plurality of prediction directions with respect to the current block, and to generate a bitstream including data about the residual block, wherein the intra predictor is configured to determine a plurality of reference samples included in a neighboring region of the current block in a current image by using the plurality of prediction directions with respect to the current block, and to generate the prediction block of the current block by using the plurality of reference samples.

MODE OF DISCLOSURE

Hereinafter, an 'image' may refer to a still image or a moving image of a video, or a video itself.

Hereinafter, a 'sample' refers to data that is assigned to a sampling location of an image and is to be processed. For example, pixels in an image of a spatial domain may be samples.

Hereinafter, a 'current block' may denote a block of an image to be encoded or decoded.

FIG. 1A is a block diagram of a video decoding apparatus according to various embodiments.

A video decoding apparatus 100 according to various embodiments includes an obtainer 110, an intra predictor 120, and an image decoder 130.

The obtainer 110 may obtain a bitstream including residual data about a residual block of a current block.

The obtainer 110 may obtain information about a prediction mode of the current block from the bitstream. For example, the prediction mode of the current block may be an intra mode or an inter mode. The intra mode is a mode of generating a prediction sample value of a current block by using a sample value of a neighboring block of the current block, from among blocks that were decoded previously in a current picture, and the inter mode is a mode of generating a prediction sample value of the current block by using a sample value of a reference block of at least one reference picture that is different from the current picture.

When the information about the prediction mode of the current block indicates the intra mode, the obtainer 110 may obtain information about an intra prediction mode of the current block. Here, the intra prediction mode of the current block denotes a mode of performing an intra prediction on the current block by using a certain prediction direction.

For example, the intra prediction mode of the current block may be one of a direct current (DC) mode, a planar mode, and a direction mode in a specific angle. The DC mode is a mode of generating prediction sample values of samples included in the current block by using a sample value of a neighboring reference region located at a left or upper side of the current block. Here, the intra prediction direction according to the DC mode may be omni-direction. That is, the prediction sample value of the current block may be generated by using samples in the neighboring reference region at a left or upper side of the current block. The planar mode may be a mode for generating a prediction sample value of a current sample by using a first reference sample located at a left side of the current sample included in the current block and a second reference sample located at an upper side of the current sample, and a third reference sample located at a direction towards a lower left corner of the current block from the current sample and a fourth reference sample located at a direction towards an upper right corner of the current block from the current sample. The direction mode in a specific angle may be a mode of generating a prediction sample value of a current sample by using a reference sample located in a direction with a certain angle with respect to the current sample. Here, the intra prediction mode of the current block may be one, but the present disclosure is not limited thereto, and the intra prediction mode of the current block may be a plurality of intra prediction modes.

The obtainer 110 may obtain, from the bitstream, information about a plurality of intra prediction modes, and may obtain an intra prediction mode of the current block based on the information about the plurality of intra prediction modes.

Alternatively, the obtainer 110 may obtain, from the bitstream, information about a first intra prediction mode of the current block, to obtain the first intra prediction mode of the current block. The obtainer 110 may obtain a second intra prediction mode of the current block by using the first intra prediction mode of the current block. For example, the second intra prediction mode of the current block may be an intra prediction mode of a prediction direction adjacent to the prediction direction according to the first intra prediction mode of the current block. That is, an index indicating the second intra prediction mode of the current block may be a value obtained by adding N to or subtracting N from an index indicating the first intra prediction mode of the current block (here, N is an integer greater than 1).

The obtainer 110 may obtain the intra prediction mode of the current block by using information of a neighboring block that is previously decoded. For example, the obtainer 110 may obtain the intra prediction mode of the current block by using information about the intra prediction mode of the neighboring block of the current block. Here, the neighboring block may be located at a left side or an upper side of the current block. Alternatively, the obtainer 110 may obtain the intra prediction mode of the current block by using information about the intra prediction mode of the neighboring block of the current block and information about the intra prediction mode of a region included in the current block.

The information about the intra prediction mode of the current block may be index information indicating the intra prediction mode of the current block. That is, there may be an index indicating each intra prediction mode. However, the present disclosure is not limited thereto, that is, information about the intra prediction mode of the current block may be information about an x-axis direction component and a y-axis direction component of the prediction direction according to the intra prediction mode. For example, information about the x-axis direction component in the prediction direction according to the intra prediction mode may have a value of 0 and information about the y-axis direction component may have a value of −32.

In addition, the intra prediction mode of the current block may be obtained by using information about the prediction mode of the neighboring block. For example, the obtainer 110 may obtain information about the intra prediction mode of the current block that is determined by using the intra prediction mode information of a block at a left side of the current block, and intra prediction mode information of a neighboring block at an upper side of the current block and a neighboring block at an upper left side of the current block. For example, when the prediction mode of the current block is an intra mode, the obtainer 110 may determine the intra prediction mode of the block at the left side of the current block as a first intra prediction mode candidate, the intra prediction mode of the block at the upper portion of the current block as a second intra prediction mode candidate, and the intra prediction mode of the block at the upper left side of the current block as a third intra prediction mode candidate, and then, may obtain first index information indicating one prediction mode from among the intra prediction mode candidates. If the intra prediction mode of the region included in the current block is not one of the intra prediction mode candidates, the obtainer 110 may obtain first index information indicating that the intra prediction mode of the region included in the current block is not one of the intra prediction mode candidates.

When the first index information indicates that the intra prediction mode is not one of the intra prediction mode candidates, the obtainer 110 may obtain second index information indicating one of predetermined intra prediction mode candidates, except for the first intra prediction mode candidate, the second intra prediction mode candidate, and the third intra prediction mode candidate. The obtainer 110 may obtain the intra prediction mode of the current block based on the second index information.

The intra predictor 120 may determine an anchor region including some samples of the current block and of the neighboring region. Here, the anchor region may be a region including samples spaced a predetermined distance apart from a vertex at the upper left side of the current block. Here, the anchor region may denote a region including an anchor sample candidate. However, the present disclosure is not limited thereto, and a location and a size of the anchor region may be variously determined. The obtainer 110 obtains, from the bitstream, information about a location and a size of the anchor region, and the intra predictor 120 may determine the location and the size of the anchor region based on the information about the location and the size of the anchor region.

The intra predictor 120 may determine an anchor sample from among sample candidates included in the anchor region. Here, the anchor sample may be a sample that is positioned to a predetermined location in the anchor region. For example, the anchor sample may include four samples located respectively at corners of the anchor region. Alternatively, the anchor sample may include the samples at the corners (four corners) of the anchor region, samples of four anchor regions adjacent to centers in edges of the current block, and a sample of one anchor region adjacent to a center of the current block. However, the present disclosure is not limited thereto, and the number and locations of the anchor samples may vary. The obtainer 110 may obtain, from the bitstream, information about the number and locations of the anchor sample, and the intra predictor 120 may determine the number and locations of the anchor sample in the anchor region based on the information about the number and locations of the anchor sample.

The intra predictor 120 may determine a first prediction direction of a first region in the current block, by using an anchor prediction direction of the anchor sample. Also, the intra predictor 120 may determine a second prediction direction of a second region in the current block, by using the anchor prediction direction of the anchor sample. Here, the obtainer 110 may obtain, from the bitstream, information about the anchor prediction direction of the anchor sample, and based on the information about the anchor prediction direction of the anchor sample, the intra predictor 120 may determine the anchor prediction direction of the anchor sample and may determine the first prediction direction of the first region in the current block by using the anchor prediction direction of the anchor sample. Here, the information about the anchor prediction direction of the anchor sample may be information about the anchor prediction direction of some of the determined anchor samples (n samples, here, n is a positive integer), and prediction directions of the other anchor samples may be determined based on prediction directions of the neighboring blocks including the corresponding anchor samples. In this case, the obtainer 110 may obtain a bitstream including a flag indicating that the prediction directions of some anchor samples are determined based on the prediction direction of the neighboring block, and when the obtained flag represents that the prediction direction of the anchor sample is determined based on the prediction direction of the neighboring block, the intra predictor 120 may determine the prediction direction of some anchor samples based on anchor prediction direction information obtained from the bitstream and may determine the prediction directions of the remaining anchor samples based on the prediction direction of the neighboring block.

Here, the first region or the second region may be a sample or M×N blocks (M and N are integers). The first prediction direction and the second prediction direction may be determined by performing interpolation based on the anchor prediction direction of a plurality of anchor samples according to the locations of the first region and the second region that are apart from the locations of the plurality of anchor samples. Here, the current block may be a prediction unit. The prediction unit is an input/output unit used for an intra prediction processing, and may be at least one of prediction blocks of luminance and chrominance components. The prediction unit may be one of partitions split from a coding unit according to partition type information. However, the intra predictor 120 may sequentially perform intra prediction on the blocks included in the prediction unit in a predetermined order to determine prediction sample values of the blocks included in the prediction unit, and may determine a sample value of the prediction unit by using the prediction sample values of the blocks included in the prediction unit. Here, the block included in the prediction unit may be a transformation unit. The transformation unit denotes an input/output unit used for an inverse-transformation processing. However, the present disclosure is not limited thereto, that is, the transformation unit may be used for various decoding processes, in addition to the inverse-transformation processing. The transformation unit may be at least one transformation block of luminance and chrominance components.

The transformation unit may be a block hierarchically split from a coding unit. The coding unit is hierarchically split to generate a transformation block of at least one of a current transformation depth and a lower transformation depth.

The intra predictor 120 may determine the prediction direction of the first region by setting the transformation block of at least one transformation depth as the first region, and may determine a prediction sample value of the first region by using the prediction direction of the first region.

In addition, the current block may be split in a horizontal direction or a vertical direction to generate a first block and a second block.

The intra predictor 120 may determine a first anchor region including some samples of the first block and the neighboring region. The intra predictor 120 may determine an anchor sample from among the samples of the first anchor region. The intra predictor 120 may determine a first prediction direction of a first region in the first block, by using the anchor prediction direction of the anchor sample. Also, the intra predictor 120 may determine a prediction direction of a second region in the first block, by using the anchor prediction direction of the anchor sample. The intra predictor 120 may determine a second anchor region including the second block and some samples of the neighboring region. The intra predictor 120 may determine an anchor sample from among the samples of the second anchor region. The intra predictor 120 may determine a third prediction direction of a third region in the second block, by using the anchor prediction direction of the anchor sample. Also, the intra predictor 120 may determine a prediction direction of a fourth region in the second block, by using the anchor prediction direction of the anchor sample.

Filtering may be performed on prediction directions or prediction values of samples located around a boundary between the first block and the second block. For example, from among the samples located around the boundary between the first block and the second block, an average value of boundary samples of the second block, which are adjacent to boundary samples of the first block, may be determined as a prediction direction of the boundary samples of the first block and the boundary samples of the second block.

Also, the intra predictor 120 determines prediction directions of regions included in the first block, determines prediction directions of regions included in the second block, generates a first prediction block of the first block by using the prediction directions of the regions included in the first block, and generates a second prediction block of the second block by using the prediction directions of the regions included in the second block. In addition, an average prediction value of the boundary samples of the first prediction block adjacent to a boundary between the first prediction block and the second prediction block and the boundary samples of the second prediction block adjacent to the boundary samples of the first prediction block may be determined as the prediction value of the boundary sample of the first prediction block and the boundary sample of the second prediction block.

The intra predictor 120 may generate a prediction sample value of the first region by using the prediction direction of the first region included in the first block, generate a prediction sample value of the second region by using the prediction direction of the second region included in the first block, generate a prediction sample value of the third region by using the prediction direction of the third region included in the second block, and generate a prediction sample value of the fourth region by using the prediction direction of the fourth region included in the second block.

The obtainer 110 may obtain, from the bitstream, a first flag indicating whether the intra prediction is performed on the current block based on one prediction direction or based on a plurality of prediction directions.

In a case where the first flag indicates that the intra prediction is performed on the current block based on the plurality of prediction directions, the intra predictor 120 may determine the plurality of prediction directions and determine a plurality of reference samples included in a neighboring region of the current block in the current image by using the plurality of prediction directions.

When the first flag indicates that the intra prediction is performed on the current block based on the plurality of prediction directions, the obtainer 110 may obtain a second flag indicating whether a boundary filtering is performed by splitting the current block in the horizontal direction or in the vertical direction.

When the second flag indicates that the boundary filtering is performed on the current block by splitting the current block in the horizontal direction, the intra predictor 120 may split the current block in the horizontal direction to generate a first block and a second block. A filtering may be performed on prediction directions or prediction values of the boundary sample of the first block, which is adjacent to the boundary between the first block and the second block, and the boundary sample of the second block, which is adjacent to the boundary sample of the first block.

Likewise, when the second flag indicates that the boundary filtering is performed by splitting the current block in the vertical direction, the intra predictor 120 may split the current block in the vertical direction to generate a first block and a second block. A filtering may be performed on prediction directions or prediction values of the boundary sample of the first block, which is adjacent to the boundary between the first block and the second block, and the boundary sample of the second block, which is adjacent to the boundary sample of the first block.

The intra predictor 120 may generate a prediction sample value of the first region in the current block by using the first prediction direction. The intra predictor 120 may determine a reference sample with respect to a first sample included in the first region by using the first prediction direction, and may generate a prediction value of the first sample by using the reference sample with respect to the first sample.

The intra predictor 120 may generate a prediction sample value of the second region in the current block by using the second prediction direction. The intra predictor 120 may determine a reference sample with respect to a second sample included in the second region by using the second prediction direction, and may generate a prediction value of the second sample by using the reference sample with respect to the second sample.

The intra predictor 120 may determine a first reference sample of a current sample by using the first prediction direction, and may determine a second reference sample of the current sample by using the second prediction direction. The intra predictor 120 may generate a first prediction block of a current block including a first prediction sample value of the current sample, by using the first reference sample of the current sample. The intra predictor 120 may generate a second prediction block of a current block including a second prediction sample value of the current sample, by using the second reference sample of the current sample.

The intra predictor 120 may generate a prediction block of the current block by using the first prediction block and the second prediction block of the current block. For example, the intra predictor 120 may determine a weighted average value of a prediction value of each sample included in the first prediction block and a prediction value of each sample included in the second prediction block as a prediction value of each sample included in the current block.

In the above description, the intra predictor 120 is described to generate the prediction block of the current block by generating the first prediction block and the second prediction block, but the present disclosure is not limited thereto, that is, an N-th prediction block (N is an integer equal to or greater than 3) may be generated in a manner similar to that of generating the first prediction block and the second prediction block, and then, the intra predictor 120 may generate the prediction block of the current block by using the first prediction block, the second prediction block, and the N-th prediction block. The intra predictor 120 may determine a weighted average value by using a predetermined weighted value to the first prediction block, the second prediction block, . . . , and the N-th prediction block, as a prediction value of the prediction block of the current block. Here, the predetermined weighted value may be constantly 1/N. Alternatively, when N is 3, the weighted value may be respectively ½, ¼, and ¼. The weighted value may be variously determined with respect to each prediction block. For example, the weighted value may be determined in advance, but is not limited thereto, that is, information about the weighted value may be obtained from the bitstream. Alternatively, the weighted value may not be determined by obtaining, from the bitstream, the information about the weighted value, but may be inferred from information of the neighboring block. For example, a prediction direction of the current block is predicted by using the prediction direction of a neighboring region adjacent to the current block, and then, a relatively large weighted value may be determined with respect to a prediction block related to the prediction direction adjacent to the predicted prediction direction and a relatively small weighted value may be determined with respect to a prediction block related to the prediction direction away from the predicted prediction direction.

The image decoder 130 may reconstruct the current block by using residual data and the prediction block of the current block. The image decoder 130 may generate a residual block of the current block by performing an inverse quantization and an inverse transformation on the residual data. The image decoder 130 may reconstruct the current block by using the residual block of the current block and the prediction block of the current block. The image decoder 130 may reconstruct a sample value of the current block by adding residue values of samples included in the residual block of the current block to prediction values of samples included in the prediction block of the current block.

FIG. 1B is a flowchart of a video decoding method according to various embodiments.

In operation S105, the video decoding apparatus 100 may obtain a bitstream including residual data about a residual block of a current block.

In operation S110, the video decoding apparatus 100 may determine a plurality of prediction directions of the current block. The video decoding apparatus 100 may obtain, from the bitstream, prediction mode information indicating whether the prediction mode of the current block is an intra mode or an inter mode. When the prediction mode of the current block is an intra mode, the video decoding apparatus 100 may obtain, from the bitstream, a flag indicating whether the intra prediction is performed on the current block based on the plurality of prediction directions or based on one prediction direction. When the flag indicates that the intra prediction is performed on the current block based on the plurality of prediction directions, the video decoding apparatus 100 may determine the plurality of prediction directions of the current block. Here, the video decoding apparatus 100 may obtain, from the bitstream, information about the plurality of prediction directions, and may determine the plurality of prediction directions based on the information about the plurality of prediction directions.

In operation S115, the video decoding apparatus 100 may determine a plurality of reference samples included in a neighboring region of the current block in the current image by using the plurality of prediction directions. For: example, the video decoding apparatus 100 may determine a first reference sample of the sample included in the current block according to a first prediction direction from among the plurality of prediction directions. The video decoding apparatus 100 may determine a second reference sample of the sample included in the current block according to a second prediction direction from among the plurality of prediction directions.

Alternatively, the video decoding apparatus 100 may determine a first reference sample with respect to a first region in the current block, according to the first prediction direction from among the plurality of prediction directions. The video decoding apparatus 100 may determine a second reference sample with respect to a second region in the current block, according to the second prediction direction from among the plurality of prediction directions.

In operation S120, the video decoding apparatus 100 may generate a prediction block of the current block by using a plurality of reference samples.

For example, the video decoding apparatus 100 may generate a first prediction block of the current block by using a first reference sample of a current sample included in the current block. The video decoding apparatus 100 may generate a second prediction block of the current block by using a second reference sample of the current sample included in the current block. The video decoding apparatus 100 may generate the prediction block of the current block by using the first prediction block of the current block and the second prediction block of the current block.

In operation S125, the video decoding apparatus 100 may obtain a residual block of the current block based on residual data about the residual block of the current block.

In operation S130, the video decoding apparatus 100 may reconstruct the current block by using the prediction block of the current block and the residual block of the current block. The video decoding apparatus 100 may reconstruct a value of each sample included in the current block by adding a prediction value of each sample included in the prediction block of the current block to a residual value of each sample included in the residual block of the current block.

Figure 1C:
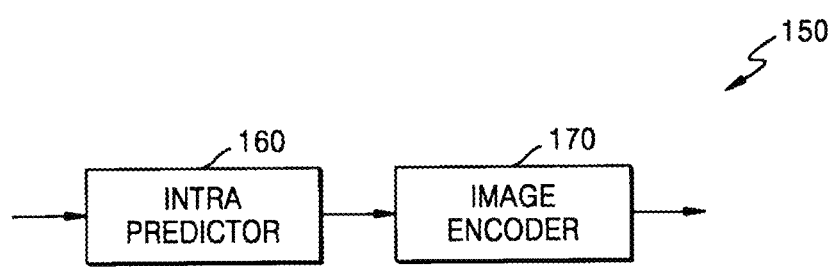
FIG. 1C is a block diagram of a video encoding apparatus according to various embodiments.
Figure 1D:
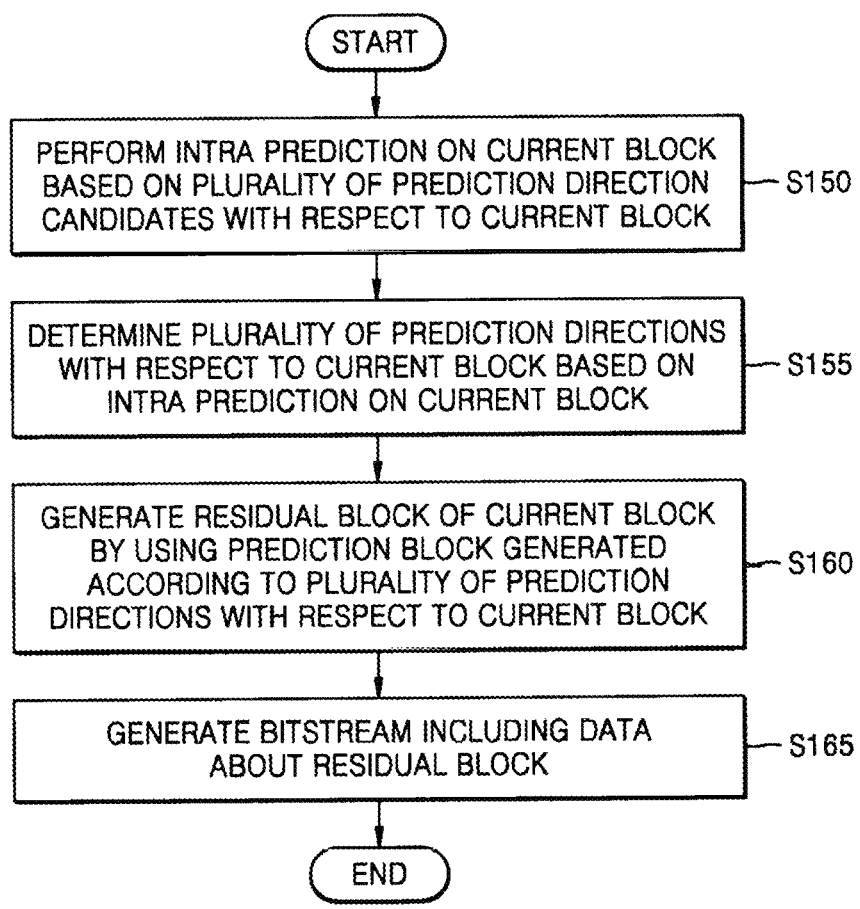
FIG. 1D is a flowchart of a video encoding method according to various embodiments.

FIG. 1C is a block diagram of a video encoding apparatus according to various embodiments.

A video encoding apparatus 150 according to various embodiments includes an intra predictor 160 and an image encoder 170.

The intra predictor 160 may perform an intra prediction on a current block based on a plurality of prediction direction candidates with respect to the current block. The plurality of prediction direction candidates with respect to the current block may include a second prediction direction and a third prediction direction adjacent to a first prediction direction.

The intra predictor 160 may perform an intra prediction on the current block by using one of the plurality of prediction direction candidates and the first prediction direction. That is, the intra predictor 160 may perform the intra prediction on the current block by using the first prediction direction and the second prediction direction, or may perform the intra prediction on the current block by using the first prediction direction and the third prediction direction.

The intra predictor 160 may determine one of the plurality of prediction direction candidates, based on the intra prediction on the current block by using one of the plurality of prediction direction candidates and the first prediction direction. The intra predictor 160 may determine a prediction direction associated with a result having smaller rate-distortion cost by comparing a result of performing the intra prediction on the current block by using the first prediction direction and the second prediction direction with a result of performing the intra prediction on the current block by using the first prediction direction and the third prediction direction. That is, the prediction direction may be determined as one of the second prediction direction and the third prediction direction. The intra predictor 160 may determine one of the plurality of prediction direction candidates and the first prediction direction as the plurality of prediction directions.

Processes of performing the intra prediction on the current block by the intra predictor 160 based on the plurality of prediction direction candidates will be described below.

The intra predictor 160 may determine a plurality of reference samples included in a neighboring region of the current block in the current image, by using the plurality of prediction directions with respect to the current block.

For example, the intra predictor 160 may determine a first reference sample with respect to a sample included in the current image, by using the first prediction direction with respect to the current block. The intra predictor 160 may determine a second reference sample with respect to the sample included in the current image, by using the second prediction direction with respect to the current block.

Alternatively, the intra predictor 160 may determine an anchor region including some samples of the current block and the neighboring region. The intra predictor 160 may determine a first prediction direction of a first region in the current block, by using an anchor prediction direction of an anchor sample from among the samples of the anchor region. The intra predictor 160 may determine a second prediction direction of a second region in the current block, by using an anchor prediction direction of the anchor sample from among the samples of the anchor region. Here, the first prediction direction and the second prediction direction may be determined when interpolation is performed based on the anchor prediction direction, according to the locations of the first region and the second region that are apart from the locations of the anchor sample.

The intra predictor 160 may generate a first block and a second block by splitting the current block in a horizontal direction or a vertical direction. The intra predictor 160 may determine a first anchor region including some samples of the first block and the neighboring region. The intra predictor 160 may determine a first prediction direction of a first region included in the first block and a second prediction direction of a second region included in the first block, by using an anchor prediction direction of an anchor sample from among the samples of the first anchor region.

The intra predictor 160 may determine a second anchor region including some samples of the second block and the neighboring region. The intra predictor 160 may determine a third prediction direction of a third region included in the second block and a fourth prediction direction of a fourth region included in the second block, by using an anchor prediction direction of an anchor sample from among the samples of the second anchor region. Filtering may be performed on prediction directions or prediction values of samples located around a boundary between the first block and the second block.

The first region and the second region may be a sample or a block of an M×N size (M and N are integers). A block including the current block is hierarchically split to generate a transformation block having at least one transformation depth of a current transformation depth and a lower transformation depth, and the first region and the second region may each be one of the transformation blocks having at least one transformation depth of the current transformation depth and the lower transformation depth.

The intra predictor 160 may determine a first reference sample of a first sample included in the first region, by using the first prediction direction. The intra predictor 160 may determine a second reference sample of a second sample included in the second region, by using the second prediction direction.

The intra predictor 160 may generate a prediction block of the current block by using a plurality of reference samples.

For example, the intra predictor 160 may generate a prediction value of the sample included in the current block by using the first reference sample, and based on that, the intra predictor 160 may generate a first prediction block of the current block including the above sample. The intra predictor 160 may generate a prediction value of the sample included in the current block by using the second reference sample, and based on that, the intra predictor 160 may generate a second reference block of the current block including the above sample. The intra predictor 160 may generate a prediction block of the current block by using the first prediction block and the second prediction block of the current block. That is, the intra predictor 160 may generate the prediction value of each of samples included in the prediction block of the current block, by using the prediction value of each sample included in the first prediction block of the current block and the prediction value of each sample included in the second prediction block of the current block.

Alternatively, the intra predictor 160 may determine a prediction value of a first sample included in the first region by using the first reference sample, and may determine prediction values of other samples included in the first region in this manner to determine the prediction value of the first region. The intra predictor 160 may determine a prediction value of a second sample included in the second region by using the second reference sample, and may determine prediction values of other samples included in second first region in this manner to determine the prediction value of the second region. The intra predictor 160 may generate a prediction block of the current block by using the prediction value of the first region and the prediction value of the second region.

The intra predictor 160 may determine a plurality of prediction directions with respect to the current block based on the intra prediction on the current block. The intra predictor 160 may determine one of a first prediction direction candidate and a second prediction direction candidate including a plurality of prediction directions, based on the intra prediction performed based on the first intra prediction direction candidate and the intra prediction based on the second prediction direction candidate. The intra predictor 160 may determine a prediction direction candidate related to a result having smaller rate-distortion cost, by comparing a result of the intra prediction performed based on the first intra prediction direction candidate with a result of the intra prediction performed based on the second prediction direction candidate. Here, the result of the intra prediction may include a result of performing an encoding operation on the current block by using a prediction block generated when the intra prediction is performed.

The image encoder 170 may generate a residual block of the current block by using the prediction block generated according to a plurality of prediction directions with respect to the current block. That is, the intra predictor 160 may generate the residual block of the current block by using the prediction direction related to the result having smaller rate-distortion cost between the first prediction direction candidate and the second prediction direction candidate.

The image encoder 170 may generate a bitstream including data about the residual block. The image encoder 170 may generate a bitstream further including information about the plurality of prediction directions determined with respect to the current block. The information about the plurality of prediction directions may generate a bitstream further including information about only one of the plurality of prediction directions. That is, when the video decoding apparatus 100 receives the bitstream generated by the image encoder 170, the video decoding apparatus 100 obtains, from the bitstream, information about one prediction direction, the video decoding apparatus 100 may obtain one prediction direction and may determine another prediction direction by using the one prediction direction. For example, a prediction direction of an intra prediction mode related to an index having a value obtained by adding or subtracting 1 to or from the index indicating the intra prediction mode according to the first prediction direction may be a second prediction direction.

The information about the prediction direction may be index information indicating the intra prediction mode related to a plurality of prediction directions. However, the present disclosure is not limited thereto, and the information about the prediction direction may be information indicating x-axis direction components and y-axis direction components of a plurality of prediction directions.

The intra predictor 160 may perform an intra prediction by using one of the plurality of prediction direction candidates. For example, the intra predictor 160 performs an intra prediction on the current block by using a prediction direction according to the first intra prediction mode, performs an intra prediction on the current block by using a prediction direction according to the second intra prediction mode, and may perform the intra prediction on the current block by using prediction modes according to various other intra prediction modes. A first prediction direction may be determined from among the plurality of prediction direction candidates, based on a result of intra prediction according to various prediction directions.

The intra predictor 160 may perform the intra prediction on the current block by using one of neighboring prediction direction candidates of the determined first prediction direction and using the determined first prediction direction. The intra predictor 160 may determine one of the neighboring prediction direction candidates of the intra prediction direction, based on the intra prediction. That is, by comparing rate-distortion costs of the intra prediction results, a neighboring prediction direction candidate related to the intra prediction result having the smallest rate-distortion cost from among the neighboring prediction direction candidates may be determined as the second prediction direction.

The image encoder 170 may generate a bitstream including information about the first prediction direction and the second prediction direction. That is, the image encoder 170 may encode information about the first prediction direction and the second prediction direction, and may generate the bitstream including, the encoded information about the first prediction direction and the second prediction direction.

In addition, the intra predictor 160 may determine the prediction direction related to the intra prediction result having smaller rate-distortion cost, by comparing the intra prediction result using the first prediction direction with the intra prediction result using the first prediction direction and the second prediction direction. That is, the first prediction direction may be determined, or the first prediction direction and the second prediction direction may be determined. The image encoder 170 may encode information about the determined prediction direction to generate a bitstream including the encoded information.

Figure 10:
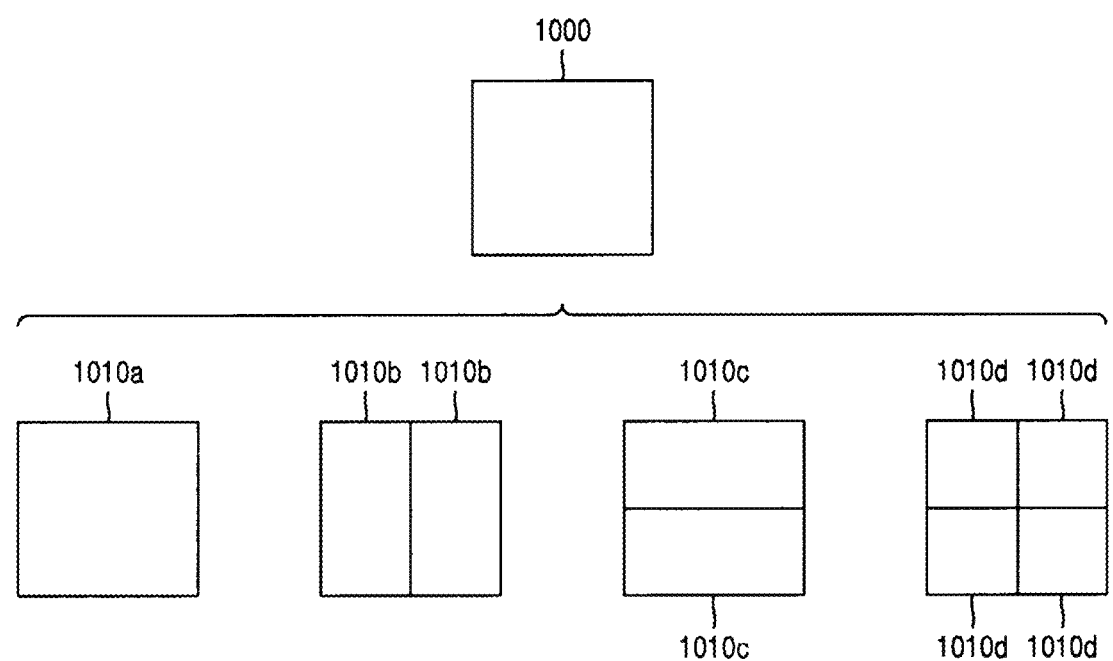
FIG. 10 illustrates processes of determining at least one coding unit as a current coding unit is split, according to an embodiment.

FIG. 10 is a flowchart of a video encoding method according to various embodiments.

In operation S150, the video encoding apparatus 150 may perform an intra prediction on the current block based on a plurality of prediction direction candidates with respect to the current block. Here, the plurality of prediction direction candidates may include a DC prediction direction, a planar prediction direction, and a prediction direction according to a specific angle. The video encoding apparatus 150 may perform the intra prediction on the current block by using a plurality of prediction directions from among the plurality of prediction direction candidates. For example, the video encoding apparatus 150 may perform the intra prediction on the current block by using first and second prediction directions from among the plurality of prediction direction candidates, or may perform the intra prediction on the current block by using third and fourth prediction directions.

In operation S155, the video encoding apparatus 150 may determine a plurality of prediction directions with respect to the current block, based on the intra prediction on the current block. For example, the video encoding apparatus 150 compares a result of performing the intra prediction on the current block by using the first and second prediction directions with a result of performing the intra prediction on the current block by using the third and fourth prediction directions, and may determine prediction directions related to the result of intra prediction having smaller rate-distortion cost.

The video encoding apparatus 150 may perform the intra prediction on the current block by using one prediction direction from among the plurality of prediction direction candidates. For example, the video encoding apparatus 150 may perform, among a plurality of prediction direction candidates (M prediction direction candidates), an intra prediction in the first prediction direction, an intra prediction in the second prediction direction, . . . , and an intra prediction in an N-th prediction direction (2<N<=M). The video encoding apparatus 150 may compare the intra prediction result in the first prediction direction, the intra prediction result in the second prediction direction, . . . , and the intra prediction result in the N-th prediction direction with one another, to determine the first prediction direction related to an intra prediction result having smaller rate-distortion cost.

The video encoding apparatus 150 may perform the intra prediction on the current block by using the determined first prediction direction and one of the plurality of prediction direction candidates except for the first prediction direction. For example, the video encoding apparatus 150 may perform the intra prediction on the current block by using the determined first prediction direction and a second prediction direction adjacent to the first prediction direction, and may perform the intra prediction on the current block by using the first prediction direction and a third prediction direction adjacent to the first prediction direction. Also, the video encoding apparatus 150 may perform the intra prediction on the current block by using the determined first prediction direction and a P-th prediction direction (3<P<=M) adjacent to the first prediction direction.

The video encoding apparatus 150 may determine, based on the intra prediction, one of the plurality of prediction direction candidates except for the determined first prediction direction and the determined first prediction direction as the plurality of prediction directions. For example, the video encoding apparatus 150 may compare a result of performing the intra prediction by using the first prediction direction and the adjacent second prediction direction, a result of performing the intra prediction by using the first prediction direction and adjacent third prediction direction, . . . , and a result of performing the intra prediction by using the first prediction direction and adjacent P-th prediction direction with one another, and then, may determine prediction directions related to the result of intra prediction having smaller rate-distortion cost as a plurality of prediction directions.

In operation S160, the video encoding apparatus 150 may generate a residual block of the current block by using a prediction block generated by the plurality of prediction directions with respect to the current block. The video encoding apparatus 150 may determine a difference between an original sample value of an original block of the current block and a prediction sample value of the prediction block of the current block as a residue sample value of the residual block of the current block, and may generate the residual block of the current block by using the residue sample value of the residual block.

In operation S165, the video encoding apparatus 150 may generate a bitstream including data about the residual block of the current block. The video encoding apparatus 150 may encode the residual block of the current block and may generate the bitstream including data about the encoded residual block of the current block.

Also, the video encoding apparatus 150 may encode information about the plurality of prediction directions determined as above and may generate a bitstream further including encoded information about the plurality of prediction directions.

The video encoding apparatus 150 may compare the result of performing the intra prediction on the current block only by using the first prediction direction with the result of performing the intra prediction on the current block by using the plurality of prediction directions including the first prediction direction, and when the result of performing the intra prediction on the current block by using the plurality of prediction directions has smaller rate-distortion cost, the video encoding apparatus 150 may generate a bitstream further including information about the plurality of prediction directions.

The video encoding apparatus 150 may encode a flag indicating whether the intra prediction is performed on the current block based on the plurality of prediction directions or based on one prediction direction and may generate the bitstream further including encoded flag.

FIG. 2 is a block diagram of an image decoder 200 according to various embodiments The image decoder 200 according to various embodiments performs operations for encoding image data in the obtainer 110, the intra predictor 120, and the image decoder 130 of the video decoding apparatus 100. Referring to FIG. 2, an entropy decoder 215 parses, from a bitstream 205, encoded image data that is to be decoded and encoding information that is necessary for decoding. The encoded image data is a quantized transformation coefficient, and an inverse-quantizer 220 and an inverse-transformer 225 reconstruct residual data from the quantized transformation coefficient.

An intra predictor 240 performs an intra prediction on each block. An inter predictor 235 performs an inter prediction on each block by using a reference image obtained from a reconstructed picture buffer 230. Here, the intra predictor 240 of FIG. 2 may correspond to the intra predictor 120 of FIG. 1A.

Prediction data and residual data with respect to each block generated by the intra predictor 240 or the inter predictor 235 are added to reconstruct data of a spatial domain with respect to the block of a current image, and a deblocking unit 245 and an SAO performer 250 may perform a loop filtering on the reconstructed data of the spatial domain and may output a filtered and reconstructed image 260. Also, reconstructed images stored in the reconstructed picture buffer 230 may be output as reference images.

In order for the image decoder 130 of the video decoding apparatus 100 to decode image data, stepwise operations of the image decoder 200 according to various embodiments may be performed per block.

Figure 3:
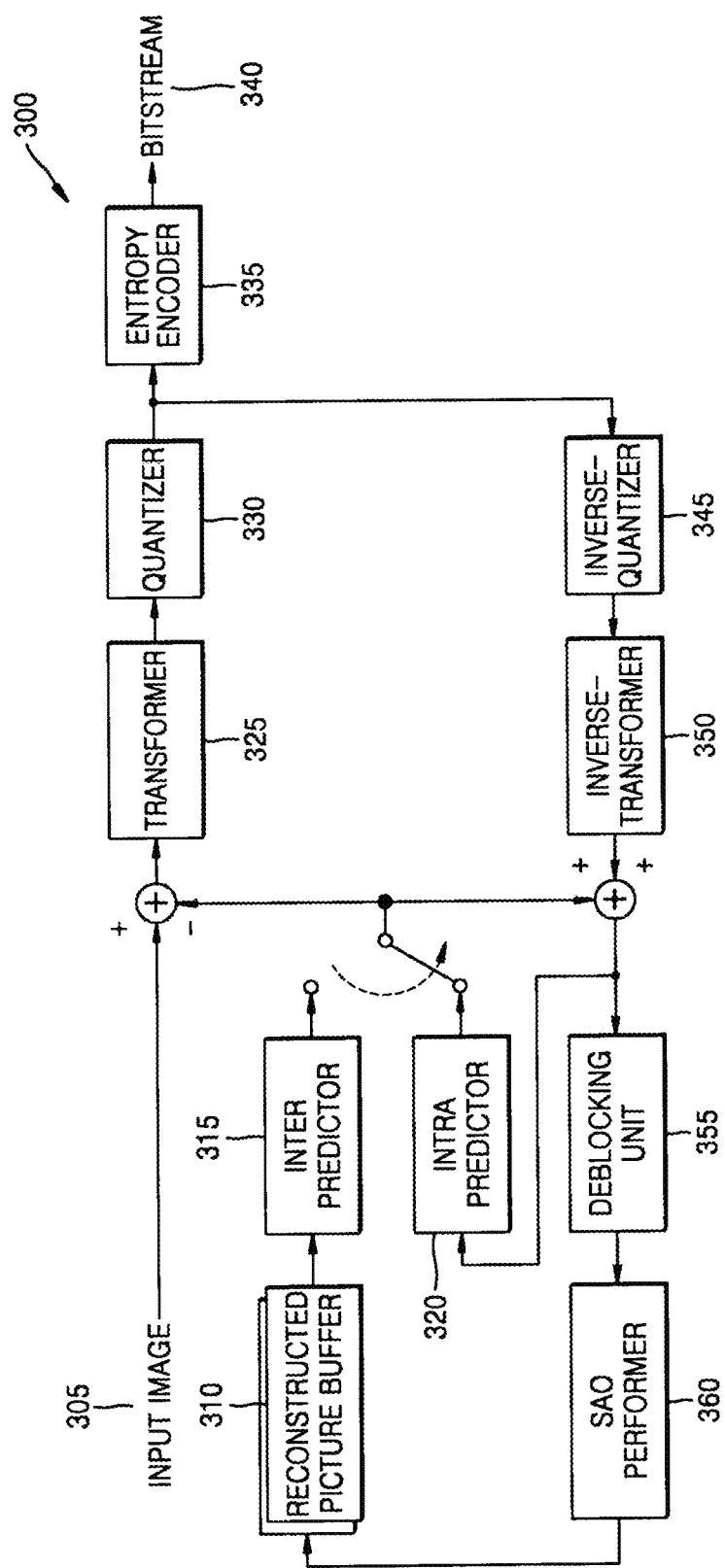
FIG. 3 is a block diagram of an image decoder according to various embodiments.

FIG. 3 is a block diagram of an image encoder according to various embodiments.

An image encoder 300 according to various embodiments performs operations performed by the intra predictor 160 and the image encoder 170 of the video encoding apparatus 150 to encode image data.

That is, an intra predictor 320 performs intra prediction on each block in a current image 305, and an inter predictor 315 performs intra prediction on each block by using the current image 305 and a reference image obtained from a reconstructed picture buffer 310. Here, the intra predictor 320 of FIG. 3 may correspond to the intra predictor 160 of FIG. 1C.

Residual data is generated by subtracting prediction data with respect to each block output from the intra predictor 320 or the inter predictor 315 from data with respect to an encoded block of the current image 305, and the residual data is output through a transformer 325 and a quantizer 330, as a quantized transformation coefficient for each block. The quantized transformation coefficient may be reconstructed as residual data of a spatial domain through an inverse-quantizer 345 and an inverse-transformer 350. The reconstructed residual data of the spatial domain may be added to the prediction data with respect to each block output from the intra predictor 320 or the inter predictor 315, and then, is reconstructed as data of a spatial domain with respect to the block of the current image 305. A deblocking unit 355 and an SAO performer perform an in-loop filtering on the reconstructed data of the spatial domain, to generate a filtered and reconstructed image. The reconstructed image is stored in a reconstructed picture buffer 310. Reconstructed images stored in the reconstructed picture buffer 310 may be used as reference images for inter prediction on other images. An entropy encoder 335 performs an entropy encoding on the transformation coefficient quantized in the transformer 325 and the quantizer 330, and a coefficient that is entropy encoded may be output as a bitstream 340.

In order to apply the image encoder 300 according to various embodiments to the video encoding apparatus 150, stepwise operations of the image encoder 300 according to various embodiments may be performed on each block.

Figure 4A:
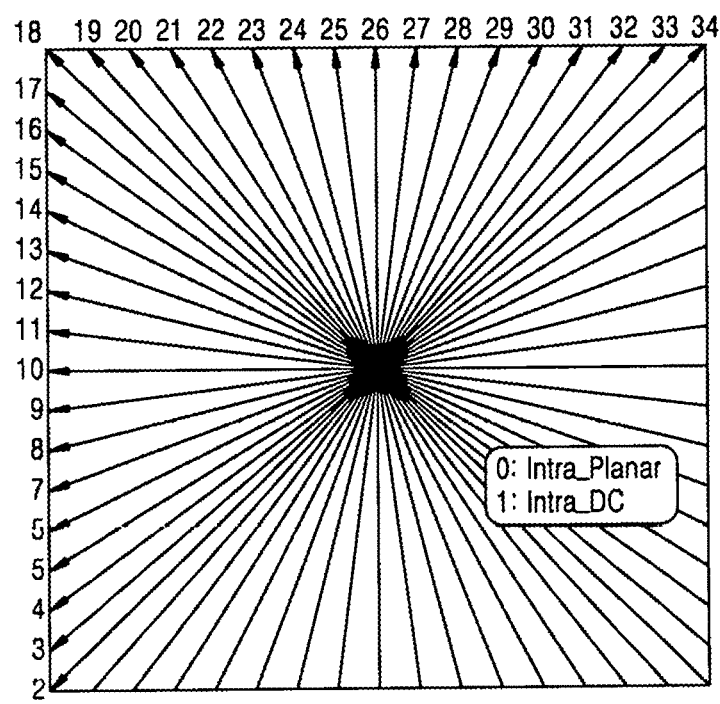
FIG. 4A is a diagram showing a prediction direction and index according to an intra prediction of an embodiment.

FIG. 4A is a diagram showing a prediction direction and an index according to an intra prediction of an embodiment.

Referring to FIG. 4A, an intra prediction mode according to an embodiment may include thirty-four (34) kinds of intra prediction modes. Each of the intra prediction modes may be indicated as an index.

When the intra prediction mode is a planar mode, an intra prediction mode index of the planar mode may be 0.

When the intra prediction mode is a DC mode, an intra prediction mode index of the DC mode may be 1.

The prediction direction according to a specific angle is a prediction direction based on an angle formed with respect to a reference direction such as an x-axis direction (or y-axis direction) of a current sample included in a current block, and may include thirty-two (32) prediction directions. Intra prediction mode index of the prediction direction according to the specific angle may be represented as 2 to 34. An intra prediction mode index of a prediction direction (a direction pointing to a lower left side of the current sample) forming an angle of −45° with respect to the x-axis direction may be 2, and an intra prediction mode index of a prediction direction (a direction pointing to a lower left side of the current sample) forming an angle of −45° to 0° with respect to a horizontal direction may be 3 to 9.

A prediction direction equal to the x-axis direction is a horizontal direction, and an intra prediction mode index of the horizontal direction may be 10.

An intra prediction mode index of a prediction direction (a direction pointing to an upper left side of the current sample) forming an angle of +45° with respect to the x-axis direction may be 18, and an intra prediction mode index of a prediction direction (a direction pointing to an upper left side of the current sample) forming an angle of 0° to +45° with respect to a horizontal direction may be 11 to 17.

A prediction direction forming an angle of +90° with respect to the x-axis direction is a vertical direction, and an intra prediction mode index of the vertical direction may be 26. An intra prediction mode index of a prediction direction (a direction pointing to an upper left side of the current sample) forming an angle of +45° to +90° with respect to the x-axis direction may be 19 to 25.

An intra prediction mode index of a prediction direction (a direction pointing to an upper right side of the current sample) forming an angle of +135° with respect to the x-axis direction may be 34, and an intra prediction mode index of a prediction direction (a direction pointing to an upper right side of the current sample) forming an angle of 90° to 135° with respect to a horizontal direction may be 27 to 33.

Although an example in which directions in a specific angle are 32 is described above, the present disclosure is not limited thereto, that is, directions in the specific angle may be N. For example, N may be 64. Here, an intra prediction mode index of a direction of a specific angle may be determined in a similar way to the above description.

Figure 4B:
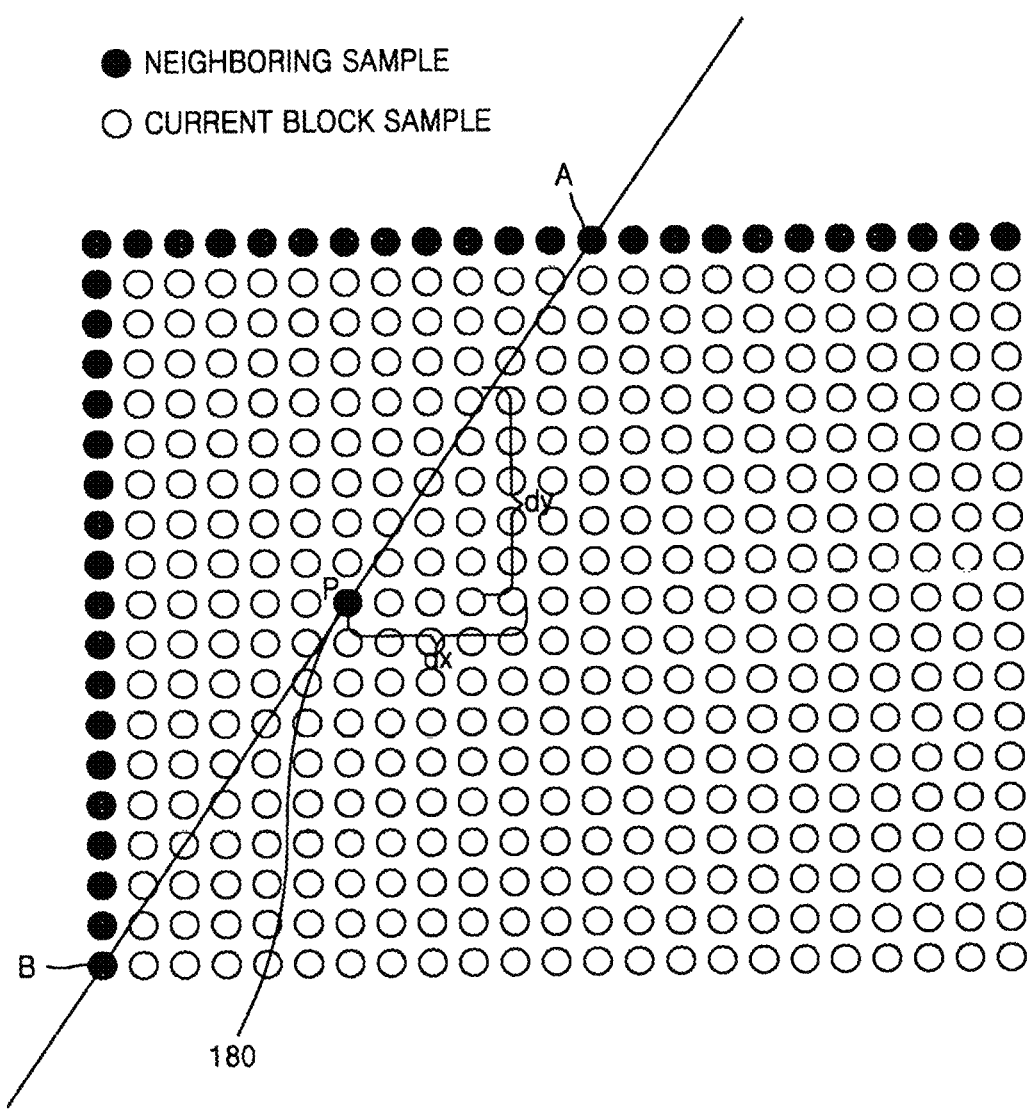
FIGS. 4B to 4D are reference diagrams for describing intra prediction modes having various directionalities according to an embodiment.
Figure 4C:
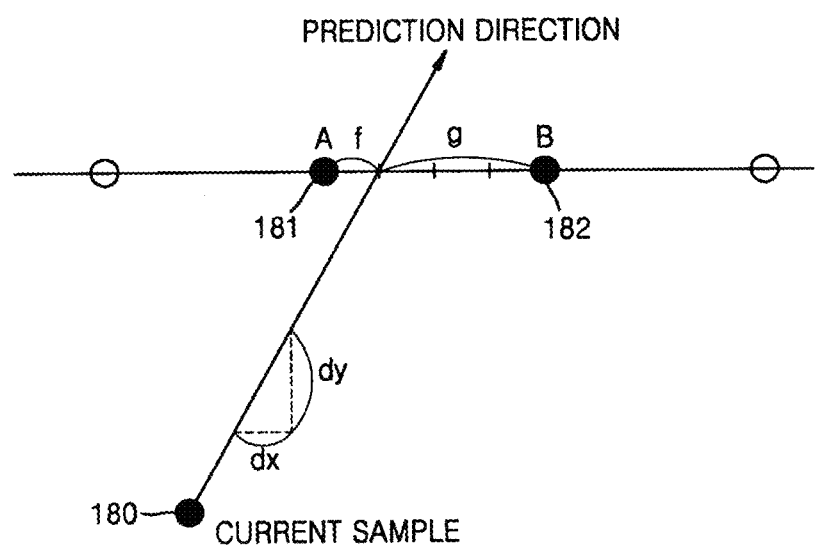
Figure 4D:
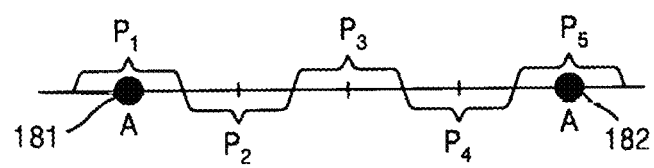

FIGS. 4B to 4D are reference diagrams for describing intra prediction modes having various directionalities according to an embodiment.

In the intra prediction modes according to an embodiment, a neighboring reference sample is determined by using a line having an inclination of $\tan^{-1}(dy/dx)$ that is determined by using a plurality of (dx,dy) parameters, and prediction may be performed by using the neighboring reference sample.

Referring to FIG. 4B, based on a current sample. P to be predicted in the current block, neighboring samples A and B positioned on an extension line 180 having an angle of $\tan^{-1}(dy/dx)$ that is determined according to a value of (dx, dy) for each mode may be used as predictors of the current sample P. Here, a neighboring sample used as the predictor may be a sample of a previous block at an upper side, a left side, an upper left side, and a lower left side of the current block, wherein the sample is previously encoded and reconstructed.

Also, when the extension line 180 does not pass through neighboring samples at integer positions, but passes between neighboring samples at integer positions, a neighboring sample closer to the current sample P from among the neighboring samples adjacent to the extension line 180 may be used as a predictor, or a weighted average value obtained while considering distances between the neighboring samples adjacent to the extension line and intersection of the extension line 180 may be used as a predictor of the current sample P.

FIGS. 4B and 4C are reference diagrams for, describing processes of generating a predictor when the extension line 180 of FIG. 4B does not pass through the neighboring samples at the integer positions, but passes between the neighboring samples at the integer positions.

Referring to FIG. 4C, when the extension line 180 having an angle of $\tan^{-1}(dy/dx)$ determined according to a value of (dx, dy) for each mode passes between a neighboring sample A 181 and a neighboring sample B 182 at integer sample positions, a weighted average value obtained considering distances of the neighboring samples A and B 181 and 182 adjacent to the extension line 180 to the intersection between the extension line 180 and a line extending from the neighboring samples A and B may be used as the predictor of the current sample P. For example, when a distance between the intersection of the extension line 180 having an angle of $\tan^{-1}(dy/dx)$ and the neighboring sample A 181 is f and a distance between the intersection and the neighboring sample B 182 is g, the predictor of the current sample P may be obtained as $(A*g+B*f)/(f+g)$. Here, f and g may be normalized to integers. When implementing actual software or hardware, the predictor of the current sample P may be implemented through a shift operation such as $(g*A+f*B+2)\gg 2$. As shown in FIG. 4C, when the extension line 180 passes through a point at a ¼ location close to the neighboring sample A 181, from among quartered points between the neighboring sample A 181 and the neighboring sample B 182 at integer sample positions, the predictor of the current sample P may be obtained as $(3*A+B)/4$. The above operation may be implemented via a shift operation taking into account a rounding process, e.g., $(3*A+B+2)\gg 2$.

In addition, when the extension line 180 having an angle of $\tan^{-1}(dy/dx)$ determined according to a value of (dx, dy) for each mode passes between the neighboring samples A and B 181 and 182 at the integer sample positions, a section between the neighboring samples A and B 181 and 182 is partitioned into a predetermined number, and for each partitioned region, a weighted average value obtained considering the distance between the reference samples A and B 181 and 182 and the intersection may be used as a prediction value. For example, referring to FIG. 4D, the section between the reference sample A 181 and the reference sample B 182 is partitioned into five sections P1 to P5 as shown in FIG. 4D, a representative weighted average value is determined considering the distance between the neighboring samples A and B 181 and 182 and the intersection for each section, and the representative weighted value may be used as a predictor of the current sample P. In detail, when the extension line 180 passes the section P1, a value of the neighboring sample A 181 may be determined as the predictor of the current sample P. When the extension line 180 passes the section P2, a weighted average value obtained considering distances between a middle point of the section P2 and the neighboring samples A and B 181 and 182, that is, $(3*A+1*B+2)\gg 2$, may be determined as a predictor of the current sample P. When the extension line 180 passes the section P3, a weighted average value obtained considering distances between a middle point of the section P3 and the neighboring samples A and B 181 and 182, that is, $(2*A+2*B+2)\gg 2$, may be determined as a predictor of the current sample P. When the extension line 180 passes the section P4, a weighted average value obtained considering distances between a middle point of the section P4 and the neighboring samples A and B 181 and 182, that is, (1*A+3*B+2)»2, may be determined as a predictor of the current sample P. When the extension line 180 passes the section P5, a value of the neighboring sample B 182 may be determined as a predictor of the current sample P.

Also, as shown in the drawing, when there are two neighboring samples meeting the extension line 180, that is, the neighboring sample A at an upper side and the neighboring sample B at a left side, an average value of the upper neighboring sample A and the left neighboring sample B may be used as the predictor of the current sample P. Alternatively, when a value of dx*dy is a positive value, the upper neighboring sample A may be used and when the value of dx*dy is a negative value, the left neighboring sample B may be used.

The intra prediction mode having various directionalities may be set in advance at an encoding terminal and a decoding terminal, and thus, only an index of set intra prediction mode for each block may be transmitted.

FIG. 4E is a reference diagram for describing a planar mode that is an example of an intra prediction mode.

Referring to FIG. 4E, in order to obtain a predictor of a current sample, a predictor P1 obtained through a linear interpolation on the current sample in a horizontal direction and a predictor P2 obtained through a linear interpolation on the current sample in a vertical direction are generated, and then, an average value of the predictors P1 and P2 may be used as the predictor of the current sample. The intra prediction mode of FIG. 4E is defined as a planar mode. According to the planar mode, a sample T 244 that is located immediately to a right side of a rightmost sample from among samples of a same block, wherein the samples are located at an uppermost column of the block, is copied to samples at right side of a rightmost column to generate samples immediately at the right side of the rightmost column. In addition, a predictor P1 243 is obtained through a linear interpolation in a horizontal direction by using samples immediately at the right side of a leftmost column and a rightmost column located in the same row as the current sample. As shown in FIG. 4E, the predictor P1 243 obtained through the linear interpolation on the current sample in the horizontal direction is obtained by the linear interpolation of a sample PL 242 at the leftmost column in the same block and located at the same row as the current sample and a sample T generated by copying the sample T 244 at an immediate right side of the rightmost column, e.g., an average value or a geometrical mean value taking into account the distance.

Similarly, according to the planar mode, from among samples of the same block located at a leftmost column of the block, a sample L 248 located right under a lowermost sample is copied to samples right under the lowermost column to generate samples right under the lowermost column. In addition, a linear interpolation using samples in an uppermost row and right under the lowermost row located in the same column as the current sample is performed in a vertical direction to obtain a predictor P2 246. As shown in FIG. 4E, the predictor P2 246 obtained through the linear interpolation on the current sample in the vertical direction may be obtained through the linear interpolation of a sample PT 245 at the uppermost row in the same column of the current sample within the same block and a sample L generated by copying the sample L 248 right under the lowermost row. Finally, in the planar mode, an average value of the predictor P1 243 in the horizontal direction and the predictor P2 246 in the vertical direction, that is, P1+P2»1, is determined as a final predictor of the current sample.

Figure 5A:
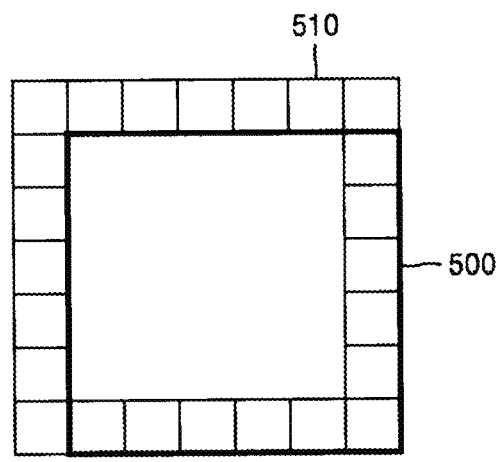
FIGS. 5A and 5B are diagrams showing an anchor region of a current block according to an embodiment.
Figure 5B:
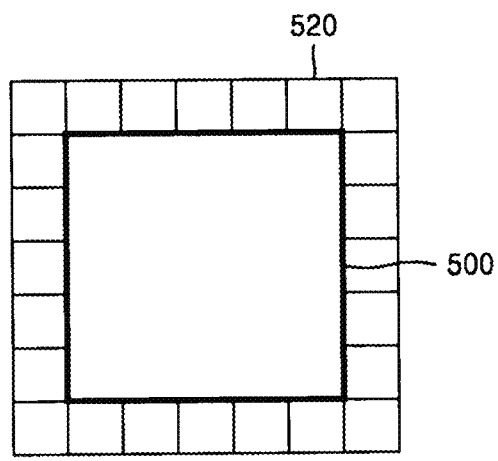

FIGS. 5A and 5B are diagrams showing an anchor region of a current block according to an embodiment.

Referring to FIG. 5A, the video decoding apparatus 100 may determine an anchor region 510 in order to determine a plurality of prediction directions with respect to a current block 500, while performing the intra prediction on a current block 500. That is, the anchor region 510 of the current block 500 may include internal samples of the current block 500, which are adjacent to right and lower edges of the current block 500, and external samples of the current block 500, which are adjacent to upper and left edges of the current block 500. Processes of determining the plurality of prediction directions with respect to the current block by using the anchor region will be described later with reference to FIGS. 6A and 6B.

Referring to FIG. 5B, the video decoding apparatus 100 may determine an anchor region 520 in order to determine a plurality of prediction directions with respect to the current block 500, while performing the intra prediction on the current block 500. That is, the anchor region 520 of the current block 500 may include external samples of the current block 500, which are adjacent to edges of the current block 500. Processes of determining the plurality of prediction directions with respect to the current block 500 by using the anchor region will be described later with reference to FIGS. 6A and 6B.

The anchor region of the current block is shown with reference to FIGS. 5A and 5B, but anchor regions of various shapes may be determined. That is, the anchor region may include internal or external samples adjacent to edges of the current block, or may include samples of the current block, which are adjacent to a horizontal or vertical line based on a center of the current block.

FIGS. 5C to 5H are diagrams showing anchor samples in an anchor region of a current block according to an embodiment.

Figure 5C:
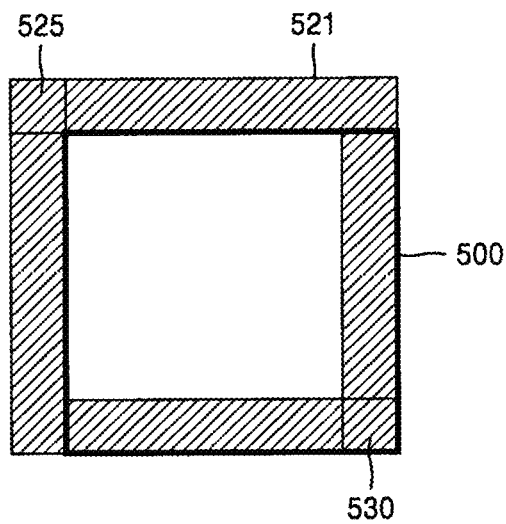
FIGS. 5C to 5H are diagrams showing anchor samples in an anchor region of a current block according to an embodiment.

Referring to FIG. 5C, anchor samples 525 and 530 of the current block 500 may be determined. An anchor region 521 of the current block 500 may be determined, and then, the anchor sample 525 and the anchor sample 530 may be determined from among samples included in the anchor region 521. That is, an upper left sample in the anchor region may be determined as the anchor sample 525, and a lower right sample in the anchor region may be determined as the anchor sample 530.

Figure 5D:
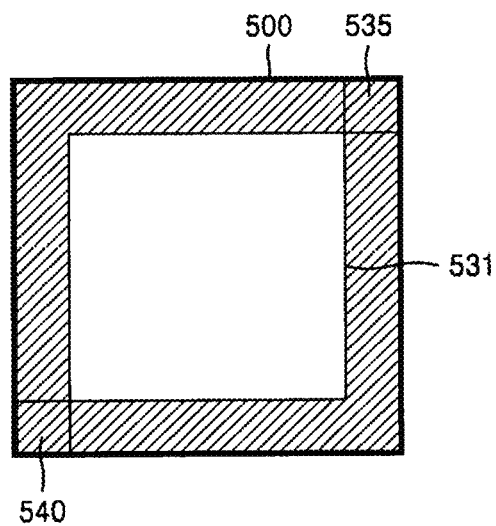

Referring to FIG. 5D, anchor samples 535 and 540 of the current block 500 may be determined. An anchor region 531 of the current block 500 may be determined, and then, the anchor sample 535 and the anchor sample 540 may be determined from among samples included in the anchor region 531. That is, an upper right sample in the anchor region may be determined as the anchor sample 535, and a lower left sample in the anchor region may be determined as the anchor sample 540.

Figure 5E:
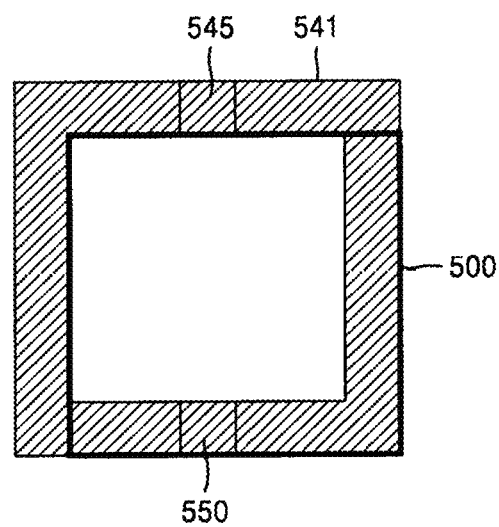

Referring to FIG. 5E, anchor samples 545 and 550 of the current block 500 may be determined. An anchor region 541 of the current block 500 may be determined, and then, anchor sample 545 and the anchor sample 550 may be determined from among samples included in the anchor region 541. That is, from among the samples in the anchor region 541, samples located on an extension line of a center of the current block 500 in a vertical direction may be determined as the anchor samples 545 and 550.

Figure 5F:
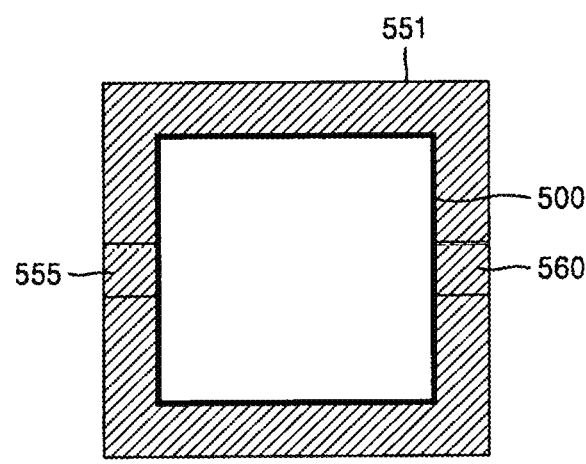

Referring to FIG. 5F, anchor samples 555 and 560 of the current block 500 may be determined. An anchor region 551 of the current block 500 may be determined, and then, the anchor sample 555 and the anchor sample 560 may be determined from among samples included in the anchor region 551. That is, from among the samples in the anchor region 551, samples located on an extension line of a center of the current block 500 in a horizontal direction may be determined as the anchor samples 555 and 560.

Figure 5G:
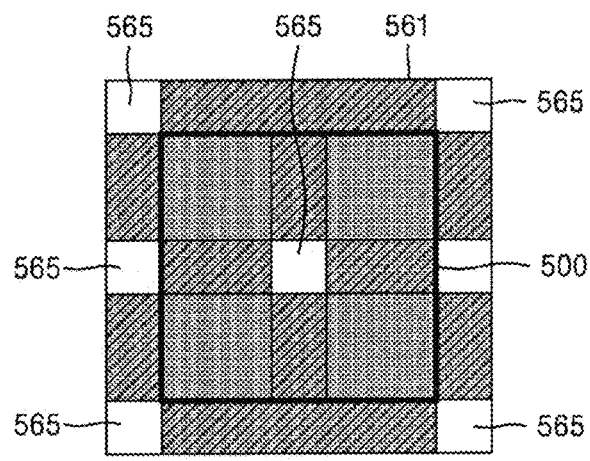

Referring to FIG. 5G, anchor samples 565 of the current block 500 may be determined. An anchor region 561 of the current block 500 may be determined, and then, the anchor samples 565 may be determined from among samples included in the anchor region 561. That is, from among the samples in the anchor region 561, a sample adjacent to the center of the current block and samples adjacent to vertices of the current block may be determined as the anchor samples 565.

Figure 5H:
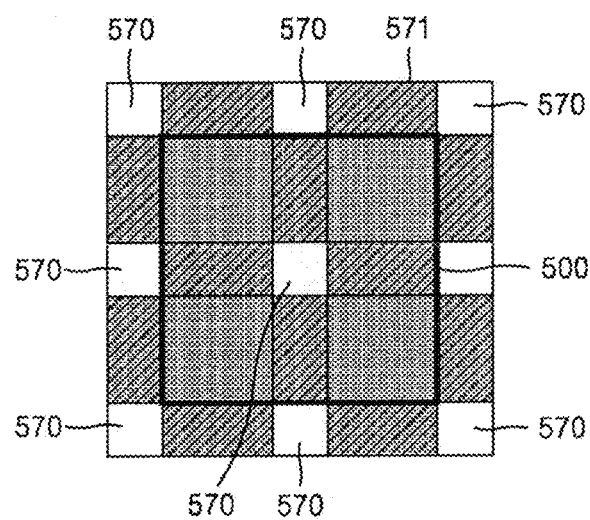

Referring to FIG. 5H, anchor samples 570 of the current block 500 may be determined. An anchor region 571 of the current block 500 may be determined, and then, the anchor samples 570 may be determined from among samples included in the anchor region 571. That is, from among the samples in the anchor region 571, a sample adjacent to the center of the current block, samples adjacent to vertices of the current block, and samples positioned on extension lines of the center of the current block in the vertical and horizontal directions may be determined as the anchor samples 570.

Figure 6A:
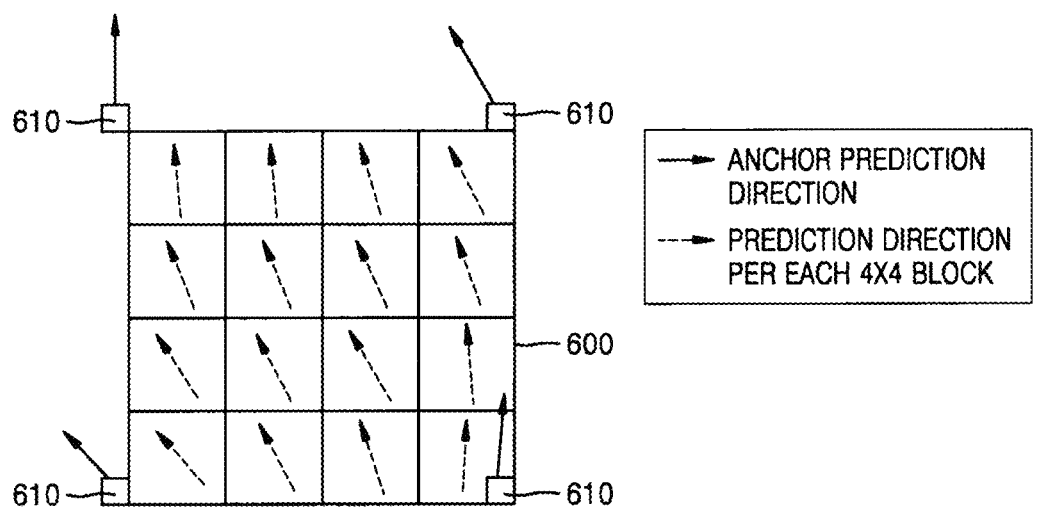
FIG. 6A is a diagram for describing processes of determining a prediction direction of 4×4 blocks included in a current block by using an anchor sample.

FIG. 6A is a diagram for describing processes of determining a prediction direction of 4×4 blocks included in a current block by using an anchor sample.

Referring to FIG. 6A, the video decoding apparatus 100 may determine a prediction direction of each of 4×4 blocks included in a current block 600 by using prediction directions of anchor samples 610.

Here, from among the anchor samples 610, it is assumed that an intra prediction mode index of an anchor sample located at an upper left side is 26, an intra prediction mode index of an anchor sample located at an upper right side is 20, an intra prediction mode index of an anchor sample located at a lower left side is 19, and an intra prediction mode index of an anchor sample located at a lower left side is 23. Here, an anchor prediction direction of each anchor sample 610 may have an x-axis direction component and a y-axis direction component. For example, the prediction direction of the anchor sample located at the upper left side, from among the anchor samples 610, may have an x-axis direction component of 0 and a y-axis direction component of −32. The prediction direction of the anchor sample located at the upper right side, from among the anchor samples 610, may have an x-axis direction component of −21 and a y-axis direction component of −32. The prediction direction of the anchor sample located at the lower left side, from among the anchor samples 610, may have an x-axis direction component of −26 and a y-axis direction component of −32. The prediction direction of the anchor sample located at the lower right side, from among the anchor samples 610, may have an x-axis direction component of −9 and a y-axis direction component of −32. A prediction direction vector represented by each direction component may have various magnitudes. For example, a magnitude of the prediction direction vector represented by each direction component may be 1.

The video decoding apparatus 100 may perform a bilinear interpolation for determining the prediction direction of each of 4×4 blocks in proportion to a distance of each 4×4 block from the anchor sample 610. That is, the video decoding apparatus 100 may perform linear interpolation respectively on the x-axis direction components and the y-axis direction components in the prediction directions of the anchor sample 610, with the components in the same direction. Here, in addition to the bilinear interpolation, various interpolation methods, e.g., piecewise constant interpolation (or nearest neighbor interpolation), spline interpolation, bi-cubic interpolation; etc. may be used.

For example, referring to FIG. 6A, with respect to the prediction direction of the 4×4 block adjacent to a lower left vertex of the current block 600, the x-axis direction component may be determined as follows. First, a distance from the upper left and lower left anchor samples 610 to the above 4×4 block in the x-axis direction is 0. Therefore, a maximum weighted value (¼) may be applied to the upper left and lower left anchor samples. Also, a distance from the upper right and lower right anchor samples 610 to the above 4×4 block in the x-axis direction is 32. That is, since the distance is maximum, a minimum weighted value (0) may be applied to the upper right and lower right anchor samples. Therefore, the x-axis direction component in the prediction direction of the above 4×4 block may be determined as −26/4=−6.5.

For example, referring to FIG. 6A, with respect to the prediction direction of the 4×4 block adjacent to a lower left vertex of the current block 600, the y-axis direction component may be determined as follows. First, a distance from the upper right and lower right anchor samples 610 to the above 4×4 block in the y-axis direction is 32. Therefore, a minimum weighted value (0) may be applied to the upper right and lower right anchor samples. Also, a distance from the upper right and lower right anchor samples 610) to the above 4×4 block in the y-axis direction is 0. A maximum weighted value (¼) may be applied to the upper right and lower right anchor samples. Therefore, the y-axis direction component in the prediction direction of the above 4×4 block may be determined as −35/4=−8.75.

Therefore, in the prediction direction of the 4×4 block adjacent to the lower left vertex of the current block, the x-axis direction component may be determined as −6.5 and the y-axis direction component may be determined as −8.75. However, the y-axis direction component in the prediction direction may be scaled to be represented as an integer, e.g., −32, and each direction component may be multiplied by a scaling factor of 128/35. In this case, the x-axis direction component may be −3328/140=−23.7714 . . . . Here, the x-axis direction component in the prediction direction of the above 4×4 block may be re-determined as a prediction direction that is closest to the above determined prediction direction, from among the prediction directions of FIG. 4A.

In addition, as shown in FIG. 4B, the video decoding apparatus 100 may determine the prediction sample value of the current block by using a neighboring sample value meeting the extension line in the determined intra prediction direction from the sample included in the current block, but is not limited thereto, and the video decoding apparatus 100 may determine a reference sample located in the determined intra prediction direction from the sample included in the current block, taking into account magnitudes of the x-axis direction component and the y-axis direction component in the prediction direction. When the prediction direction of the 4×4 block is determined, and when a prediction direction vector of a null vector having (0,0) component is determined or the prediction direction vector is determined in a direction in which the neighboring reference sample may not be determined from the 4×4 block, the prediction sample value may be generated as an average value of the neighboring reference samples of the current block with respect to the corresponding 4×4 block, and the prediction sample value may be generated as a local average value of a neighboring prediction image.

The video decoding apparatus 100 receives, from the bitstream, information about an anchor prediction direction in order to determine the anchor prediction direction of the anchor sample, and may determine the anchor prediction direction of the anchor sample based on the information about the anchor prediction direction. For example, the video decoding apparatus 100 may receive, from the bitstream, information about the x-axis direction component and the y-axis direction component in the anchor prediction direction of the anchor sample, and may determine the anchor prediction direction of the anchor sample based on the information. However, the present disclosure is not limited thereto, and the video decoding apparatus 100 may obtain, from the bitstream, information about the intra prediction mode index, and may determine the prediction direction of the intra prediction mode indicated by the intra prediction mode index as the anchor prediction direction of the anchor sample, based on the information. Here, the intra prediction mode index about the anchor prediction mode of the anchor sample may be transmitted according to a most probable mode (MPM) mode. Here, the MPM mode is a mode in which the intra prediction mode of the current block is determined according to the intra prediction mode of the neighboring block of the current block, for example, when the intra prediction mode of the anchor sample included in the current block is one of the intra prediction mode of the anchor sample included in a left block of the current block, the intra prediction mode of the anchor sample included in an upper left block of the current block, and the intra prediction mode of the anchor sample included in an upper block of the current block, the video decoding apparatus 100 may obtain, from the bitstream, index information indicating that the intra prediction mode is one of the intra prediction modes of the upper left block, the left block, and the upper block, and may determine the intra prediction mode of the anchor sample included in the current block based on the obtained index information.

Alternatively, the video decoding apparatus 100 may split a region including a plurality of anchor samples into regions each including one anchor sample, and may obtain an intra prediction mode index of each region. Here, the intra prediction mode index of the each region may be an intra prediction mode index in the MPM mode.

Alternatively, the video decoding apparatus. 100 may determine the intra prediction mode of the anchor sample Included in the current block, according to the intra prediction mode index information of the current block obtained from the bitstream. The video decoding apparatus 100 may determine an intra prediction mode of an anchor sample that is not included in the current block, according to intra prediction mode index information of a block, adjacent to the current block, including each anchor sample.

Figure 6B:
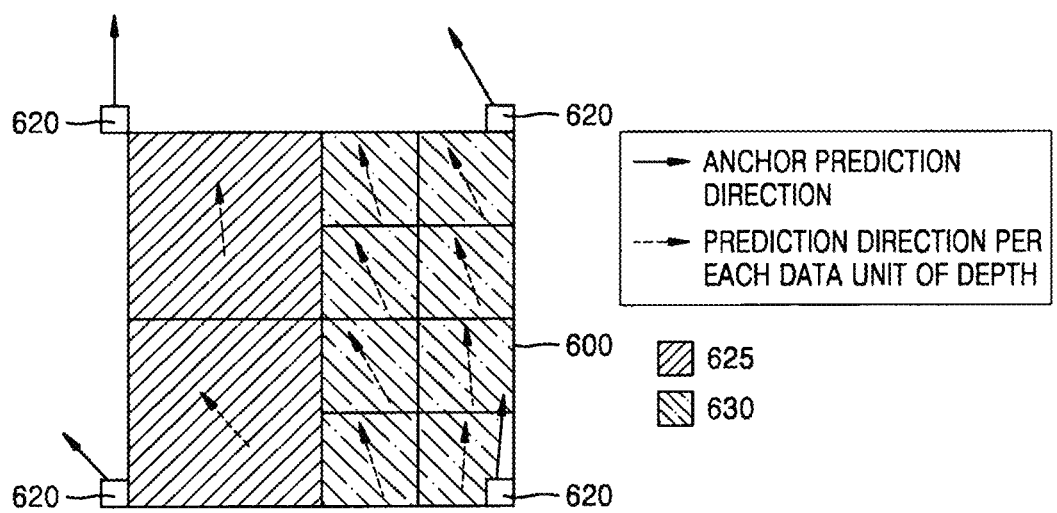
FIG. 6B is a diagram for describing processes of determining a prediction direction of data units of various depths included in a current block by using an anchor sample, according to an embodiment.

FIG. 6B is a diagram for describing processes of determining a prediction direction of data units of various depths included in a current block by using an anchor sample, according to an embodiment.

Referring to FIG. 6B, the video decoding apparatus 100 may determine prediction directions of data units 625 and 630 of various depths included in a current block 600, by using an anchor sample 620. For example, a data unit of a depth d may be split into four data units of a depth d+1, and the current block 600 may include two data units 625 of a depth 1 and eight data units 630 of a depth 2. Here, the data unit may be a transformation unit.

Here, the video decoding apparatus 100 may determine the prediction directions of the data units 625 and 630 of various depths included in the current block 600 based on a prediction direction of the anchor sample 620. Since the processes of determining the prediction directions of the data units 625 and 630 of various depths included in the current block 600 based on the prediction direction of the anchor sample 620 are similar to those described with reference to FIG. 6A, detailed descriptions thereof are omitted.

Figure 6C:
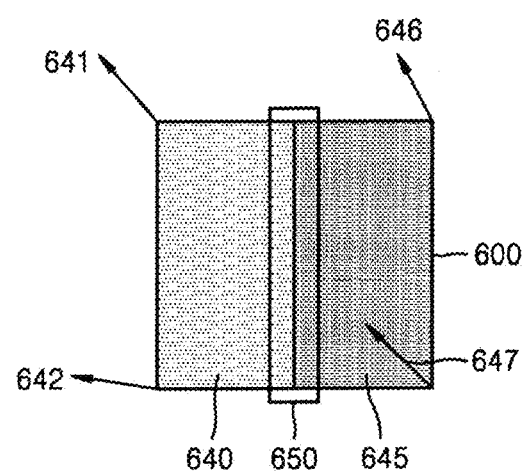
FIGS. 6C and 6D are diagrams for describing processes of splitting a current block in a horizontal or vertical direction and determining a prediction direction of a split block by using an anchor sample.
Figure 6D:
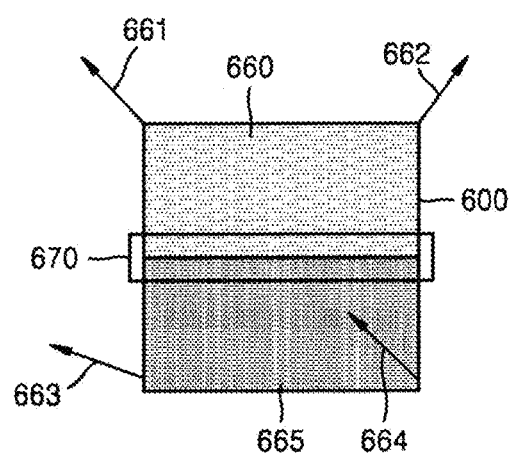

FIGS. 6C and 6D are diagrams for describing processes of splitting a current block in a horizontal or vertical direction and determining a prediction direction of a split block by using an anchor sample.

Referring to FIG. 6C, the video encoding apparatus 150 may split the current block 600 in the vertical direction. Here, a left block 640 and a right block 645 may be generated.

A prediction direction of at least one region included in the left block 640 may be determined by using anchor prediction directions 641 and 642 of anchor samples included in an anchor region of the current block 600. Processes of determining the prediction direction of at least one region included in the left block 640 based on the prediction directions 641 and 642 of the anchor sample are similar to those described with reference to FIG. 6A, and thus, detailed descriptions thereof are omitted.

Likewise, a prediction direction of at least one region included in the right block 645 may be determined by anchor prediction directions 646 and 647 of anchor samples included in an anchor region of the current block 600. Processes of determining the prediction direction of at least one region included in the right block 645 based on the prediction directions 646 and 647 of the anchor sample are similar to those described with reference to FIG. 6A, and thus, detailed descriptions thereof are omitted.

Here, a prediction direction in a boundary region 650 between the left block 640 and the right block 645 includes the prediction direction determined by using the anchor prediction directions 641 and 642 of the anchor sample or the prediction direction determined by using the anchor prediction directions 646 and 647 of the sample. Therefore, the prediction directions may have a large difference at the boundary, and when the intra prediction is performed on each region by using the above determined prediction direction, discontinuity may occur among prediction sample values in the boundary region 650. Therefore, the prediction directions in the boundary region 650 may be filtered. For example, a linear interpolation may be performed with respect to the prediction directions in the boundary region 650 in a horizontal direction. In addition, various interpolation methods may be used.

The filtering of the prediction directions is described above, but the present disclosure is not limited thereto. That is, the video decoding apparatus 100 may generate a prediction block of the left block and a prediction block of the right block by performing an intra prediction on the left and right blocks by using the prediction directions determined with respect to the left and right blocks, and a filtering may be performed with respect to prediction sample values in the boundary region 650 between the prediction block of the left block and the prediction block of the right block. For example, a linear interpolation may be performed with respect to the prediction sample values in the boundary region 650 in a horizontal direction. In addition, various interpolation methods may be used.

Referring to FIG. 6D, the video encoding apparatus 150 may split the current block 600 in the horizontal direction. Here, an upper block 660 and a lower block 665 may be generated.

A prediction direction of at least one region included in the upper block 660 may be determined by using anchor prediction directions 661 and 662 of anchor samples included in an anchor region of the current block 600. Processes of determining the prediction direction of at least one region included in the upper block 660 based on the anchor prediction directions 661 and 662 of the anchor sample are similar to those described with reference to FIG. 6A, and thus, detailed descriptions thereof are omitted.

Likewise, a prediction direction of at least one region included in the lower block 665 may be determined by anchor prediction directions 663 and 664 of anchor samples included in an anchor region of the current block 600. Processes of determining the prediction direction of at least one region included in the lower block 665 based on the prediction directions 646 and 647 of the anchor sample are similar to those described with reference to FIG. 6A, and thus, detailed descriptions thereof are omitted.

Here, a prediction direction in a boundary region 670 between the upper block 660 and the lower block 665 may include the prediction direction determined by using the anchor prediction directions 661 and 662 of the anchor sample or the prediction direction determined by using the anchor prediction directions 663 and 664 of the sample. Therefore, the prediction directions may have a large difference at the boundary, and when the intra prediction is performed on each region by using the above determined prediction direction, discontinuity may occur among prediction sample values in the boundary region 670. Therefore, the prediction directions in the boundary region 670 may be filtered. For example, a linear interpolation may be performed with respect to the prediction directions in the boundary region 670 in a vertical direction. In addition, various interpolation methods may be used. The method of splitting the current block in the horizontal direction and performing the filtering on the boundary region may be the same as the method of splitting the current block in the vertical direction and performing the filtering on the boundary region, but is not limited thereto, and different methods may be used.

Figure 7:
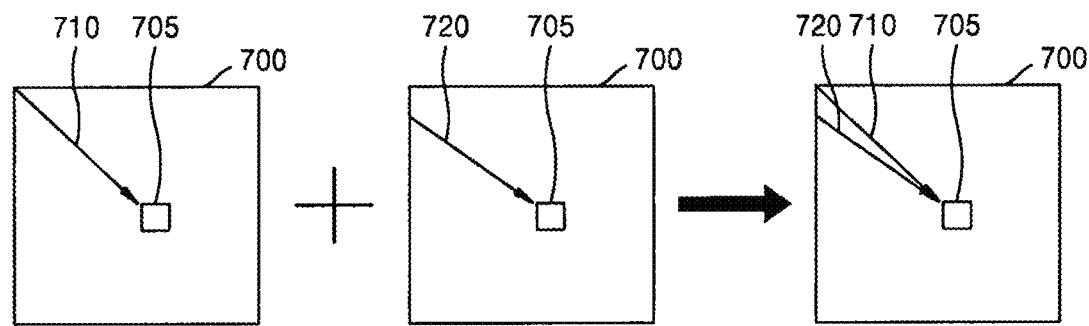
FIG. 7 is a diagram for describing processes of generating a prediction block of a current block by using a plurality of prediction blocks generated by performing an intra prediction on the current block based on a plurality of prediction directions.

FIG. 7 is a diagram for describing processes of generating a prediction block of a current block by using a plurality of prediction blocks generated by an intra prediction on the current block based on a plurality of prediction directions.

Referring to FIG. 7, the video decoding apparatus 100 may generate a first prediction sample value of a sample 705 included in a current block 700, by using a reference sample located at a point where an extension line from the sample 705 in a first prediction direction 710 and a neighboring sample adjacent to an edge of the current block meet each other. The video decoding apparatus 100 may generate a first prediction sample value of another sample included in the current block, in a way similar to that of generating the first prediction sample value of the sample 705. Therefore, the video decoding apparatus 100 may generate a first prediction block of the current block 700 by using the first prediction sample values of the sample 705 and another sample in the current block 700. For example, the first prediction direction may be a prediction mode of an intra prediction mode indicated by the intra prediction mode index 18 among the intra prediction modes of FIG. 4A.

The video decoding apparatus 100 may generate a second prediction sample value of a sample 705 included in a current block 700, by using a reference sample located at a point where an extension line from the sample 705 in a second prediction direction 720 and a neighboring sample adjacent to an edge of the current block meet each other. The video decoding apparatus 100 may generate a second prediction sample value of another sample included in the current block, in a way similar to that of generating the second prediction sample value of the sample 705. Therefore, the video decoding apparatus 100 may generate a second prediction block of the current block 700 by using the first prediction sample values of the sample 705 and another sample in the current block 700. For example, the second prediction direction may be a prediction mode of an intra prediction mode indicated by the intra prediction mode index 17 among the intra prediction modes of FIG. 4A, and may be adjacent to the prediction direction indicated by the intra prediction mode index 18.

The video decoding apparatus 100 may generate a prediction sample value of the sample 705 by using the first prediction sample value and the second prediction sample value with respect to the sample 705 included in the current block 700. Here, the video decoding apparatus 100 may determine a weighted average value of the first prediction sample value and the second prediction sample value with respect to the sample 705 included in the current block 700, as the prediction sample value of the sample 705.

Likewise, the video decoding apparatus 100 may generate a prediction sample value of a sample rather than the sample 705, from among the samples included in the current block 700, by using a first prediction sample value and a second prediction sample value with respect to the above sample rather than the sample 705. Therefore, the video decoding apparatus 100 may generate a prediction block of the current block 700 by using the prediction sample value of the sample 705 and the prediction sample value of the sample rather than the sample 705, from among the samples included in the current block 700.

While the video decoding apparatus 100 generates the prediction sample value of the sample 705 by using the first prediction sample value and the second prediction sample value with respect to the sample 705 included in the current block 700, a weighted value applied to the first prediction sample value and a weighted value applied to the second prediction sample value may be equal to each other, that is, 0.5. However, the present disclosure is not limited thereto, and the video decoding apparatus 100 may receive, from the bitstream, information about weighted values of the first and second prediction sample values, and may determine the weighted value of the first prediction sample value and the weighted value of the second prediction sample value based on the received information about the weighted values of the first and second prediction sample values.

Alternatively, the video decoding apparatus 100 may determine the weighted value of the first prediction sample value and the weighted value of the second prediction sample value, based on neighboring samples of the current block 700.

Figure 8:
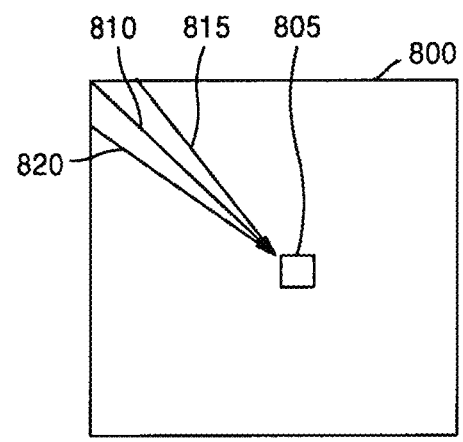
FIG. 8 is a diagram for describing processes of determining a plurality of prediction direction candidates, by a video encoding apparatus, in order to generate a plurality of prediction blocks through an intra prediction on a current block based on the plurality of prediction directions.

FIG. 8 is a diagram for describing processes of determining a plurality of prediction direction candidates, by a video encoding apparatus, in order to generate a plurality of prediction blocks through an intra prediction on a current block based on the plurality of prediction directions.

Referring to FIG. 8, the video encoding apparatus 150 performs an intra prediction by using each intra prediction mode from among a plurality of intra prediction mode candidates, and may determine one intra prediction mode from among the plurality of intra prediction mode candidates based on an intra prediction execution result of each intra prediction mode.

The video encoding apparatus 150 may generate a prediction value of a sample 805 by performing an intra prediction on the sample 805 included in a current block 800 by using a prediction direction according to one intra prediction mode, and may generate prediction values of the other samples by performing the intra prediction on the other samples in a similar way of the intra prediction on the sample 805 to perform the intra prediction on the current block 800.

FIG. 8 will be described assuming that an index of an intra prediction mode 810 determined as above is 18 from among the indices indicating the intra prediction modes shown in FIG. 4A.

The video encoding apparatus 150 may determine a prediction direction adjacent to the prediction direction 810 according to the currently determined intra prediction mode as a prediction direction candidate. For example, the video encoding apparatus 150 may determine a prediction direction 815 and a prediction direction 820 adjacent to the prediction direction 810 as prediction direction candidates. The prediction direction 815 may be a prediction direction according to an intra prediction mode indicated by an index 19 from among the indices indicating the intra prediction modes of FIG. 4A. The prediction direction 820 may be a prediction direction according to an intra prediction mode indicated by an index 17 from among the indices indicating the intra prediction modes of FIG. 4A.

The video encoding apparatus 150 may perform an intra prediction on a current block by using the prediction direction 810 and the prediction direction 815, and may perform an intra prediction on the current block by using the prediction direction 810 and the prediction direction 820.

The video encoding apparatus 150 may compare a result of performing the intra prediction on the current block only by using the prediction direction 810, a result of performing the intra prediction on the current block by using the prediction direction 810 and the prediction direction 815, and a result of performing the intra prediction on the current block by using the prediction direction 810 and the prediction direction 820 with one another, and then, may determine a prediction direction related to an intra prediction result having a smaller rate-distortion cost. When the result of performing the intra prediction on the current block only by using the prediction direction 810 has the smallest rate-distortion cost, the video encoding apparatus 150 may generate a flag indicating that the intra prediction is performed on the current block only by using one prediction direction. When the result of performing the intra prediction on the current block by using the prediction direction 810 and the prediction direction 815 or using the prediction direction 810 and the prediction direction 820 has the smallest rate-distortion cost, the video encoding apparatus 150 may generate a flag indicating the intra prediction is performed on the current block by using a plurality of prediction directions.

When the determined intra prediction mode index of the current block is x, that is, one of the intra prediction mode indices a to 33 shown in FIG. 4A, the video encoding apparatus 150 may determine prediction directions according to an intra prediction mode having an intra prediction mode index x−1 and an intra prediction mode having an intra prediction mode index x+1 as the prediction direction candidates.

However, the present disclosure is not limited thereto, that is, the video encoding apparatus 150 may not determine the prediction direction adjacent to the determined intra prediction mode of the current block as the at least one prediction direction candidate, but may determine various prediction directions as the prediction direction candidates. In this case, the video encoding apparatus 150 may generate a bitstream including information about at least one determined prediction direction candidate. However, the present disclosure is not limited thereto, and the determined prediction direction candidate may be determined from a prediction direction of a neighboring block. Here, the video encoding apparatus 150 may generate a bitstream including a flag indicating that the determined prediction direction candidate is determined from the prediction direction of at least one neighboring block.

Also, when there is a case, when 1 is added to or subtracted from the index of the determined intra prediction mode of the current block, and the mode is not a mode according to a specific angle, e.g., a DC mode or a planar mode, the video encoding apparatus 150 may not determine the corresponding mode as the prediction direction candidate, but determine a mode according to another specific angle as the prediction direction candidate.

For example, when the intra prediction mode index of the current block is 2, the video encoding apparatus 150 may determine an intra prediction mode having an intra prediction mode index 3 and an intra prediction mode having an intra prediction mode index 4 as the prediction direction candidates.

For example, when the intra prediction mode index of the current block is 34, the video encoding apparatus 150 may determine prediction directions according to an intra prediction mode having an intra prediction mode index 33 and an intra prediction mode having an intra prediction mode index 32 as the prediction direction candidates.

The determined intra prediction mode is not a mode of a direction according to a specific angle, such as the DC mode or the planar mode, the video encoding apparatus 150 may determine a mode that is determined in advance to correspond to each of the DC mode and the planar mode as the prediction direction candidate.

For example, when the intra prediction mode of the current block is the DC mode, the video encoding apparatus 150 may determine prediction directions according to the planar mode and an intra prediction mode having an intra prediction mode index 10 as the prediction direction candidates.

When the intra prediction mode of the current block is the planar mode, the video encoding apparatus 150 may determine prediction directions according to the DC mode and an intra prediction mode having an intra prediction mode index 10 as the prediction direction candidates.

Generating of the prediction block of the current block by using two prediction directions is described above, but the present disclosure is not limited thereto, that is, the prediction block of the current block may be generated by prediction directions greater than 2.

For example, the video encoding apparatus 150 may generate the prediction block of the current block by using two prediction directions determined as the prediction direction candidates and the determined prediction direction. Here, a first prediction sample value, a second prediction sample value, and a third prediction sample value of the sample 805 according to the respective prediction directions may have a weighted value of ⅓. However, the present disclosure is not limited thereto, that is, the video encoding apparatus 150 may determine a weighted value of the first prediction sample value generated by the determined prediction direction as ½, and determine weighted values of the second prediction sample value and the third prediction sample value according to two prediction directions determined as the prediction direction candidates as ¼.

The weighted value with respect to the prediction sample value generated according to each prediction direction may be determined by using a neighboring sample of the current block. For example, the video encoding apparatus 150 may predict a prediction direction that is most likely to be the prediction direction of the current block from the neighboring sample of the current block, and then, may determine a greater weighted value with respect to a prediction direction that is closer to the predicted prediction direction and a smaller weighted value with respect to a prediction direction that is farther from the predicted prediction direction.

Also, the video encoding apparatus 150 may predict a prediction direction that is most likely to be the prediction direction of the current block from the neighboring sample of the current block, and may determine prediction directions according to two intra prediction modes that are the closest to the predicted prediction direction. Then, the video encoding apparatus 150 may determine weighted values with respect to prediction sample values respectively generated by the prediction directions, based on proximities between the predicted prediction direction and the prediction directions according to the two closest intra prediction modes. For example, the video encoding apparatus 150 may predict a direction that is most likely to be the prediction direction of the current block. Then, in a case where the predicted prediction direction is between a prediction direction of an intra prediction mode indicated by an intra prediction mode index 9 and a prediction direction of an intra prediction mode indicated by an intra prediction mode index 10, from among the intra prediction modes shown in FIG. 4A, when the predicted prediction direction is at the middle of the prediction direction of the intra prediction mode indicated by the intra prediction mode index 9 and the prediction direction of the intra prediction mode indicated by the intra prediction mode index 10, the video encoding apparatus 150 may determine a weighted value with respect to a prediction sample value generated according to the prediction direction of the intra prediction mode indicated by the intra prediction mode index 9 and a weighted value with respect to a prediction sample value generated according to the prediction direction of the intra prediction mode index 10 to be equal to each other.

When the predicted prediction direction is closer to the prediction direction of the intra prediction mode indicated by the intra prediction mode index 9, the weighted value with respect to the prediction sample value generated according to the prediction direction of the intra prediction mode indicated by the intra prediction mode index 9 may be determined to be greater than the weighted value with respect to the prediction sample value generated according to the prediction direction of the intra prediction mode indicated by the intra prediction mode index 10.

The video encoding apparatus 150 may generate a bitstream including information about the determined weighted values. However, the present disclosure is not limited thereto, that is, the video encoding apparatus 150 may determine the information about the determined weighted value based on a prediction direction indicated by an intra prediction mode of a neighboring block. Also, the video encoding apparatus 150 may determine the information about the determined weighted value, according to properties (e.g., a size or a type) of a block (the current block or the neighboring block).

In addition, when determining one of two prediction direction candidates, the video encoding apparatus 150 may signal one of the two prediction direction candidates according to the following method. That is, the video encoding apparatus 150 generates a first flag indicating whether the intra prediction is performed on the current block only by using one prediction direction or by using a plurality of prediction directions. In addition, when the intra prediction is performed on the current block by using the plurality of prediction directions, the video encoding apparatus 150 may generate a second flag indicating whether the intra prediction is performed on the current block by using the prediction direction according to the determined intra prediction mode and an intra prediction mode indicated by an index having a value adding 1 to the index of the determined intra prediction mode or by using the prediction direction according to the determined intra prediction mode and an intra prediction mode indicated by an index having a value subtracting 1 from the index of the determined intra prediction mode.

Alternatively, the video encoding apparatus 150 may generate index information indicating whether the intra prediction is performed on the current block only by using one prediction direction, by using the prediction directions according to the determined intra prediction mode and the intra prediction mode indicated by an index adding 1 to the index of the determined intra prediction mode, or by using the prediction directions according to the determined intra prediction mode and the intra prediction mode indicated by an index subtracting 1 from the index of the determined intra prediction mode, to perform a variable length coding, and then, may include the encoded index information in the bitstream.

However, according to the above description, the video encoding apparatus 150 determines one prediction direction from among a plurality of prediction directions and then determines prediction direction candidates, and performs the intra prediction on the current block according to a plurality of prediction directions including each prediction direction candidate and the determined prediction direction to determine one of the prediction direction candidates, but the present disclosure is not limited thereto. The video encoding apparatus 150 may not determine one prediction direction from among the plurality of prediction direction candidates (M prediction direction candidates), but may perform the intra prediction on the current block according to a first prediction direction from among the plurality of prediction direction candidates, and then, may perform an intra prediction on the current block according to the first prediction direction and a first prediction direction candidate that is a prediction direction candidate with respect to the first prediction direction. The video encoding apparatus 150 may perform the intra prediction on the current block according to the first prediction direction and a second prediction direction candidate that is a prediction direction candidate with respect to the first prediction direction. The video encoding apparatus 150 may perform the intra prediction on the current block according to a second prediction direction from among the plurality of prediction direction candidates, in the same way as above. The video encoding apparatus 150 may perform the intra prediction on the current block according to the second prediction direction and a first prediction direction candidate that is a prediction direction candidate with respect to the second prediction direction.

The video encoding apparatus 150 may perform the intra prediction on the current block according to the second prediction direction and a second prediction direction candidate that is a prediction direction candidate with respect to the second prediction direction. The video encoding apparatus 150 may perform the intra prediction on the current block according to an N-th prediction direction (N<=M), from among the plurality of prediction directions, and a first prediction direction candidate that is a prediction direction candidate with respect to the N-th prediction direction. The video encoding apparatus 150 may perform the intra prediction on the current block according to the N-th prediction direction and a second prediction direction candidate that is a prediction direction candidate with respect to the N-th prediction direction, and may determine a prediction direction related to an intra prediction result having smaller rate-distortion cost from among results of the intra prediction according to the prediction directions. The video encoding apparatus 150 may generate a bitstream including information about the determined prediction direction.

According to the above description, the video encoding apparatus 150 may determine two prediction direction candidates and then determine one of the two prediction direction candidates, but the present disclosure is not limited thereto, and the video encoding apparatus 150 may only determine one prediction direction candidate. For example, a prediction direction based on an intra prediction mode indicated by an index having a value adding 1 to the index of the intra prediction mode according to the determined prediction direction may be determined as one prediction direction candidate. Alternatively, a prediction direction based on an intra prediction mode indicated by an index having a value subtracting 1 from the index of the intra prediction mode according to the determined prediction direction may be determined as one prediction direction candidate. In this case, there is no need to encode information indicating one of the two prediction directions, and a bitstream only including information about the intra prediction mode according to the determined prediction direction may be generated. That is, the video decoding apparatus 100 may obtain, from the bitstream, the information about the intra prediction mode according to the prediction direction, determine the prediction direction based on the obtained information, and determine one prediction direction candidate from the determined prediction direction.

Figure 9A:
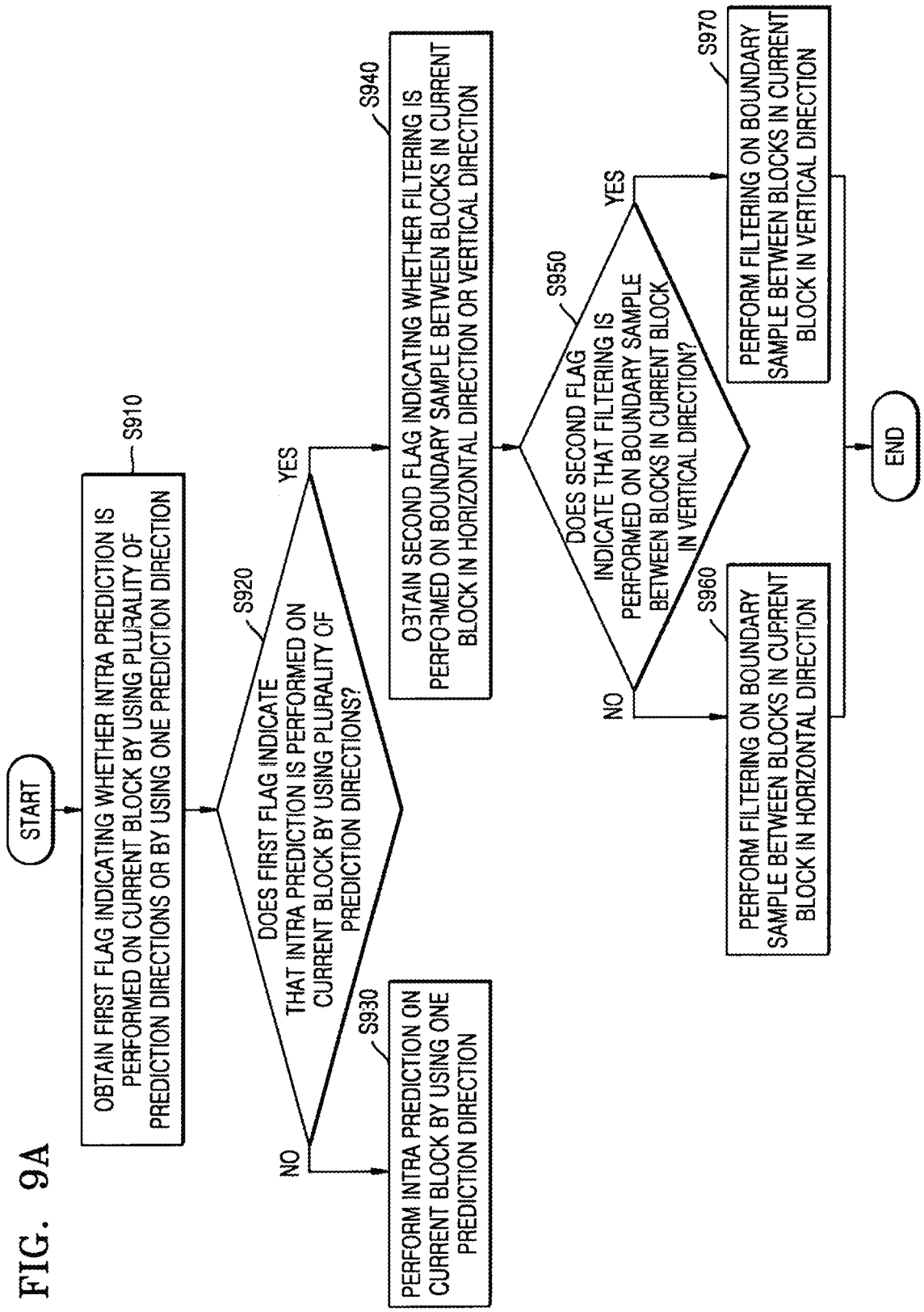
FIG. 9A is a flowchart illustrating processes of performing an intra prediction on a current block, by a video decoding apparatus, according to an embodiment.

FIG. 9A is a flowchart illustrating processes of performing an intra prediction on a current block, by a video decoding apparatus, according to an embodiment.

In operation S910, the video decoding apparatus 100 may obtain, from the bitstream, a first flag indicating whether the intra prediction is performed on the current block by using a plurality of prediction directions or by using one prediction direction.

In operation S920, the video decoding apparatus 100 may determine that the first flag indicates that the intra prediction is performed on the current block by using the plurality of prediction directions.

In operation S930, when the first flag does not indicate that the intra prediction is performed on the current block by using the plurality of prediction directions, the video decoding apparatus 100 may perform the intra prediction on the current block by using one prediction direction.

In operation S940, when the first flag indicates that the intra prediction is performed on the current block by using the plurality of prediction directions, the video decoding apparatus 100 may obtain a second flag indicating whether the filtering is performed on a boundary sample between blocks in the current block in a horizontal direction or a vertical direction.

In operation S950, the video decoding apparatus 100 determines whether the second flag indicates that the filtering is performed on the boundary sample between the blocks in the current block in the vertical direction.

In operation S960, when the second flag does not indicate that the filtering is performed on the boundary sample between the blocks in the current block in the vertical direction, the video decoding apparatus 100 may perform the intra prediction on the current block by using a plurality of prediction directions of the blocks in the current block by performing the filtering on the boundary sample between the blocks in the current block in the horizontal direction.

In operation S970, when the second flag indicates that the filtering is performed on the boundary sample between the blocks in the current block in the vertical direction, the video decoding apparatus 100 may perform the intra prediction on the current block by using a plurality of prediction directions of the blocks in the current block by performing the filtering on the boundary sample in the current block in the vertical direction.

Figure 9B:
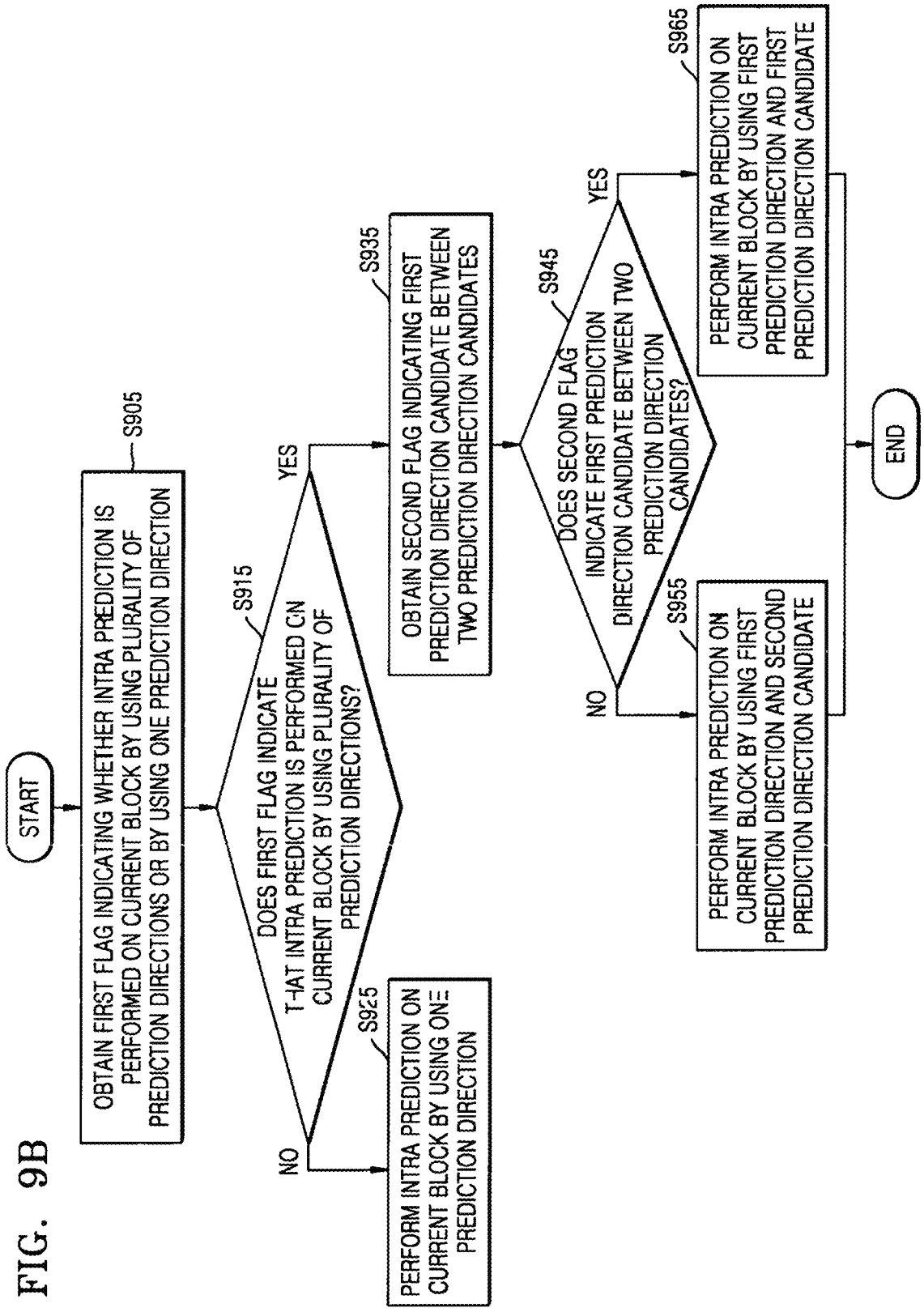
FIG. 9B is a flowchart illustrating processes of performing an intra prediction on a current block, by a video decoding apparatus, according to an embodiment.

FIG. 9B is a flowchart illustrating processes of performing an intra prediction on a current block, by a video decoding apparatus, according to an embodiment.

In operation S905, the video decoding apparatus 100 may obtain, from the bitstream, a first flag indicating whether the intra prediction is performed on the current block by using a plurality of prediction directions or by using one prediction direction.

In operation S915, the video decoding apparatus 100 may determine that the first flag indicates that the intra prediction is performed on the current block by using the plurality of prediction directions.

In operation S925, when the first flag does not indicate that the intra prediction is performed on the current block by using the plurality of prediction directions, the video decoding apparatus 100 may perform the intra prediction on the current block by using one prediction direction.

In operation S935, when the first flag indicates that the intra prediction is performed on the current block by using the plurality of prediction directions, the video decoding apparatus 100 may obtain a second flag indicating a first prediction direction candidate between two prediction direction candidates.

In operation S945, the video decoding apparatus 100 may determine whether the second flag indicates the first prediction direction candidate between the two prediction direction candidates.

In operation S955, when the second flag does not indicate the first prediction direction candidate between the two prediction direction candidates, the video decoding apparatus 100 may perform the intra prediction on the current block by using the first prediction direction and the second prediction direction candidate.

In operation S965, when the second flag indicates the first prediction direction candidate between the two prediction direction candidates, the video decoding apparatus 100 may perform the intra prediction on the current block by using the first prediction direction and the first prediction direction candidate.

According to various embodiments above, a plurality of reference samples with respect to the current block may be determined by using the plurality of prediction directions, and the intra prediction is performed on the current block by using the plurality of reference samples. Thus, a prediction efficiency may be improved while reducing prediction errors.

That is, the intra prediction is performed on the current block by determining various prediction directions with respect to regions included in the current block, and thus, the prediction efficiency may be improved. In addition, the intra prediction may be performed on the current block by determining the prediction direction of the current block by using various prediction directions, and the prediction efficiency may be improved.

Hereinafter, a method of determining a data unit that may be used while the video decoding apparatus 100 according to an embodiment decodes an image will be described with reference to FIGS. 10 through 23. Operations of the video encoding apparatus 150 may be similar to or the reverse of various embodiments of operations of the video decoding apparatus 100 described below.

FIG. 10 illustrates processes of determining at least one coding unit as the video decoding apparatus 100 splits a current coding unit, according to an embodiment.

According to an embodiment, the video decoding apparatus 100 may determine a shape of a coding unit by using block shape information, and determine a shape into which a coding unit is split by using split shape intormation. In other words, a split method of a coding unit, which is indicated by the split shape information, may be determined based on a block shape indicated by the block shape information used by the video decoding apparatus 100.

According to an embodiment, the video decoding apparatus 100 may use block shape information indicating that a current coding unit has a square shape. For example, the video decoding apparatus 100 may determine, according to split shape information, whether to not split a square coding unit, to split the square coding unit vertically, to split the square coding unit horizontally, or to split the square coding unit into four coding units. Referring to FIG. 10, when block shape information of a current coding unit 1000 indicates a square shape, the video decoding apparatus 100 may not split a coding unit 1010a having the same size as the current coding unit 1000 according to split shape information indicating non-split, or determine coding units 1010b, 1010c, or 1010d based on split shape information indicating a certain split method.

Referring to FIG. 10, the video decoding apparatus 100 may determine two coding units 1010b by splitting the current coding unit 1000 in a vertical direction based on split shape information indicating a split in a vertical direction, according to an embodiment. The video decoding apparatus 100 may determine two coding units 1010c by splitting the current coding unit 1000 in a horizontal direction based on split shape information indicating a split in a horizontal direction. The video decoding apparatus 100 may determine four coding units 1010d by splitting the current coding unit 1000 in vertical and horizontal directions based on split shape information indicating splitting in vertical and horizontal directions. However, a split shape into which a square coding unit may be split is not limited to the above shapes, and may include any shape indicatable by split shape information. Certain split shapes into which a square coding unit are split will now be described in detail through various embodiments.

Figure 11:
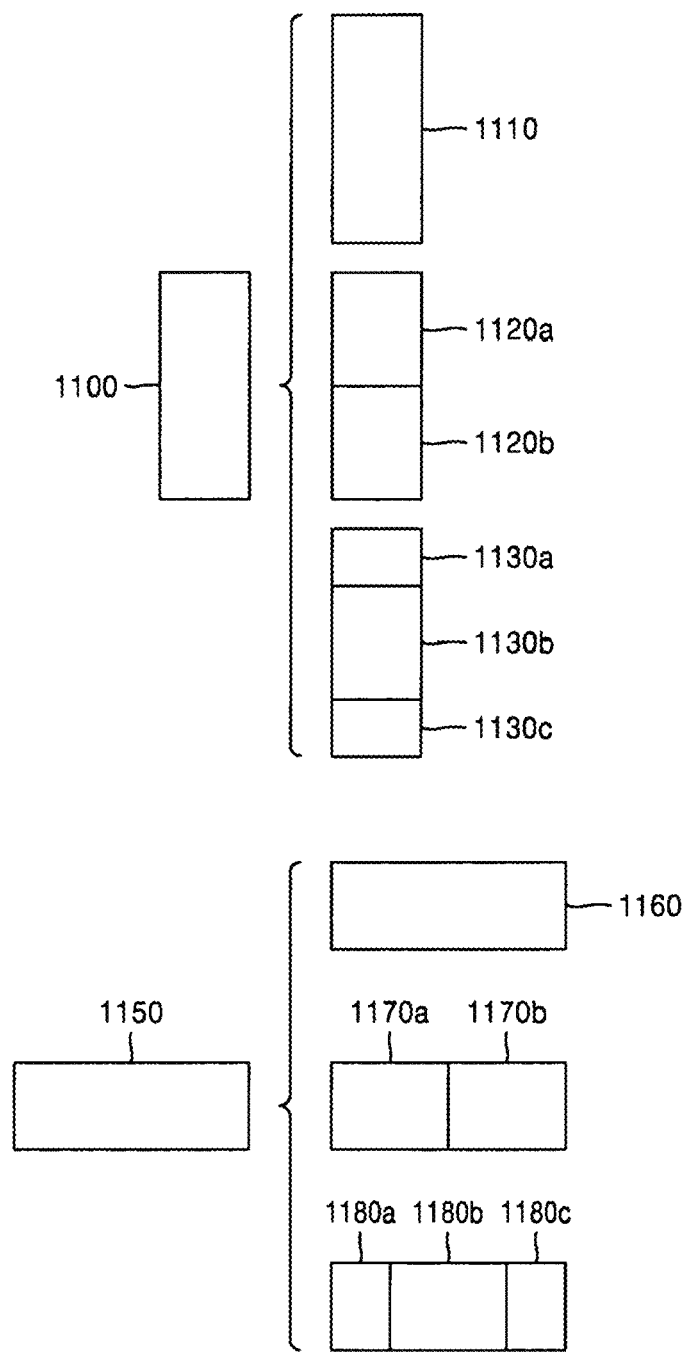
FIG. 11 illustrates processes of determining at least one coding unit when a coding unit having a non-square shape is split, according to an embodiment.

FIG. 11 illustrates processes of determining at least one coding unit when the video decoding apparatus 100 splits a coding unit having a non-square shape, according to an embodiment.

According to an embodiment, the video decoding apparatus 100 may use block shape information indicating that a current coding unit has a non-square shape. The video decoding apparatus 100 may determine, according to split shape information, whether to not split the non-square current coding unit or to split the non-square current coding unit via a certain method. Referring to FIG. 11, when block shape information of a current coding unit 1100 or 1150 indicates a non-square shape, the video decoding apparatus 100 may not split coding units 1110 or 1160 having the same size as the current coding unit 1100 or 1150 according to split shape information indicating non-split, or determine coding units 1120a, 1120b, 1130a, 1130b, 1130c, 1170a, 1170b, 1180a, 1180b, and 1180c based on split shape information indicating a certain split method. A certain split method of splitting a non-square coding unit will now be described in detail through various embodiments.

According to an embodiment, the video decoding apparatus 100 may determine a shape into which a coding unit is split by using split shape information, and in this case, the split shape information may indicate the number of at least one coding unit generated as the coding unit is split. Referring to FIG. 11, when split shape information indicates that the current coding unit 1100 or 1150 is split into two coding units, the video decoding apparatus 100 may determine two coding units 1120a and 1120b or 1170a and 1170b included in the current coding unit 1100 or 1150 by splitting the current coding unit 1100 or 1150 based on the split shape information.

According to an embodiment, when the video decoding apparatus 100 splits the current coding unit 1100 or 1150 having a non-square shape based on split shape information, the video decoding apparatus 100 may split the current coding unit 1100 or 1150 considering locations of long sides of the current coding unit 1100 or 1150 having a non-square shape. For example, the video decoding apparatus 100 may determine a plurality of coding units by splitting the current coding unit 1100 or 1150 in a direction of splitting the long sides of the current coding unit 1100 or 1150 considering a shape of the current coding unit 1100 or 1150.

According to an embodiment, when split shape information indicates that a coding unit is split into an odd number of blocks, the video decoding apparatus 100 may determine the odd number of coding units included in the current coding unit 1100 or 1150. For example, when split shape information indicates that the current coding unit 1100 or 1150 is split into three coding units, the video decoding apparatus 100 may split the current coding unit 1100 or 1150 into three coding units 1130a through 1130c or 1180a through 1180c. According to an embodiment, the video decoding apparatus 100 may determine the odd number of coding units included in the current coding unit 1100 or 1150, and the sizes of the determined coding units may not be all the same. For example, the size of the coding unit 1130b or 1180b from among the determined odd number of coding units 1130a through 1130c or 1180a through 1180c may be different from the sizes of coding units 1130a and 1130c or 1180a and 1180c. In other words, coding units that may be determined when the current coding unit 1100 or 1150 is split may have a plurality of types of sizes, and in some cases, the coding units 1130a through 1130c or 1180a through 1180c may have different sizes.

According to an embodiment, when split shape information indicates that a coding unit is split into an odd number of blocks, the video decoding apparatus 100 may determine the odd number of coding units included in the current coding unit 1100 or 1150, and in addition, may set a certain limit on at least one coding unit from among the odd number of coding units generated via splitting. Referring to FIG. 11, the video decoding apparatus 100 may differentiate decoding processes performed on the coding unit 1130b or 1180b located at the center from among the three coding units 1130a through 1130c or 1180a through 1180c generated as the current coding unit 1100 or 1150 is split from the other coding units 1130a and 1130c or 1180a and 1180c. For example, the video decoding apparatus 100 may limit the coding unit 1130b or 1180b located at the center to be no longer split unlike the other coding units 1130a and 1130c or 1180a and 1180c, or to be split only a certain number of times.

Figure 12:
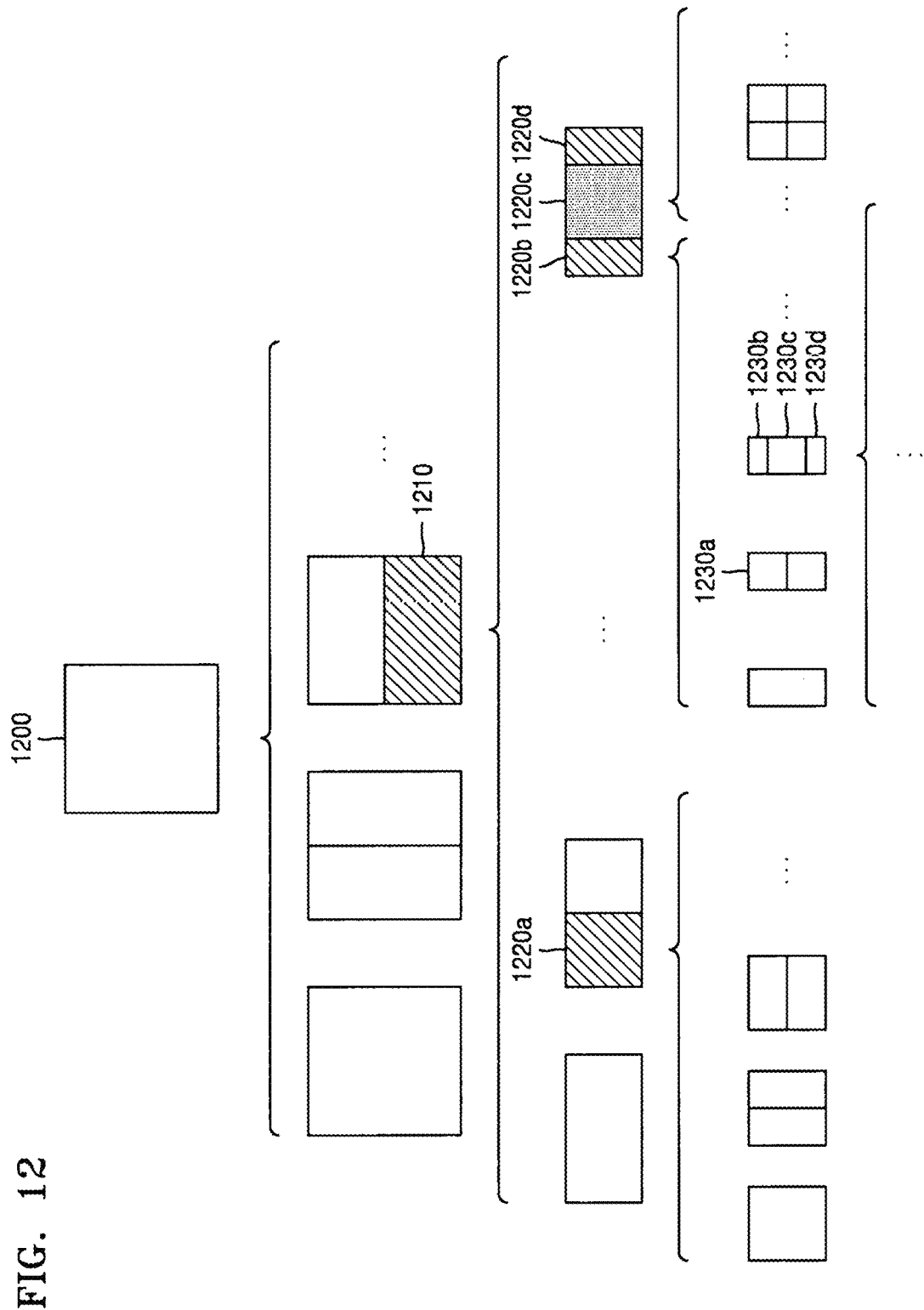
FIG. 12 illustrates processes of splitting a coding unit, based on at least one of a block shape information and split shape information, according to an embodiment.

FIG. 12 illustrates processes of the video decoding apparatus 100 splitting a coding unit, based on at least one of a block shape information and split shape information, according to an embodiment.

According to an embodiment, the video decoding apparatus 100 may determine that a first coding unit 1200 having a square shape is split or not split into coding units, based on at least one of block shape information and split shape information. According to an embodiment, when split shape information indicates that the first coding unit 1200 is split in a horizontal direction, the video decoding apparatus 100 may determine a second coding unit 1210 by splitting the first coding unit 1200 in a horizontal direction. A first coding unit, a second coding unit, and a third coding unit used according to an embodiment are terms used to indicate a relation between before and after splitting a coding unit. For example, a second coding unit may be determined by splitting a first coding unit, and a third coding unit may be determined by splitting a second coding unit. Hereinafter, it will be understood that relations between first through third coding units are in accordance with the features described above.

According to an embodiment, the video decoding apparatus 100 may determine that the determined second coding unit 1210 is split or not split into coding units based on at least one of block shape information and split shape information. Referring to FIG. 12, the video decoding apparatus 100 may split the second coding unit 1210, which has a non-square shape and is determined by splitting the first coding unit 1200, into at least one third coding unit 1210a, 1220b, 1220c, or 1220d, or may not split the second coding unit 1210, based on at least one of block shape information and split shape information. The video decoding apparatus 100 may obtain at least one of the block shape information and the split shape information, and obtain a plurality of second coding units (for example, the second coding units 1210) having various shapes by splitting the first coding unit 1200 based on at least one of the obtained block shape information and split shape information, wherein the second coding unit 1210 may be split according to a method of splitting the first coding unit 1200 based on at least one of the block shape information and the split shape information. According to an embodiment, when the first coding unit 1200 is split into the second coding units 1210 based on at least one of block shape information and split shape information with respect to the first coding unit 1200, the second coding unit 1210 may also be split into third coding units (for example, the third coding units 1220a through 1220d) based on at least one of block shape information and split shape information with respect to the second coding unit 1210. In other words, a coding unit may be recursively split based on at least one of split shape information and block shape information related to each coding unit. Accordingly, a square coding unit may be determined from a non-square coding unit, and such a square coding unit may be recursively split such that a non-square coding unit is determined. Referring to FIG. 12, a certain coding unit (for example, a coding unit located at the center or a square coding unit) from among the odd number of third coding units 1220b through 1220d determined when the second coding unit 1210 having a non-square shape is split may be recursively split. According to an embodiment, the third coding unit 1220c having a square shape from among the third coding units 1220b through 1220d may be split in a horizontal direction into a plurality of fourth coding units. A fourth coding unit 1240 having a non-square shape from among the plurality of fourth coding units may again be split into a plurality of coding units. For example, the fourth coding unit 1240 having a non-square shape may be split into an odd number of coding units 1250a through 1250c.

A method that may be used to recursively split a coding unit will be described below through various embodiments.

According to an embodiment, the video decoding apparatus 100 may determine that each of the third coding units 1220a through 1220d is split into coding units or that the second coding unit 1210 is not split, based on at least one of block shape information and split shape information. The video decoding apparatus 100 may split the second coding unit 1210 having a non-square shape into the odd number of third coding units 1220b through 1220d, according to an embodiment. The video decoding apparatus 100 may set a certain limit on a certain third coding unit from among the third coding units 1220b through 1220d. For example, the video decoding apparatus 100 may limit that the third coding unit 1220c located at the center of the third coding units 1220b through 1220d is no longer split, or is split into a settable number of times. Referring to FIG. 12, the video decoding apparatus 100 may limit that the third coding unit 1220c located at the center of the third coding units 1220b through 1220d included in the second coding unit 1210 having a non-square shape is no longer split, is split into a certain split shape (for example, split into four coding units or split into shapes corresponding to those into which the second coding unit 1210 is split), or is split only a certain number of times (for example, split only n times wherein n>0). However, such limits on the third coding unit 1220c located at the center are only examples and should not be interpreted as being limited by those examples, but should be interpreted as including various limits as long as the third coding unit 1220c located at the center are decoded differently from the other third coding units 1220b and 1220d.

According to an embodiment, the video decoding apparatus 100 may obtain at least one of block shape information and split shape information used to split a current coding unit from a certain location in the current coding unit.

Figure 13:
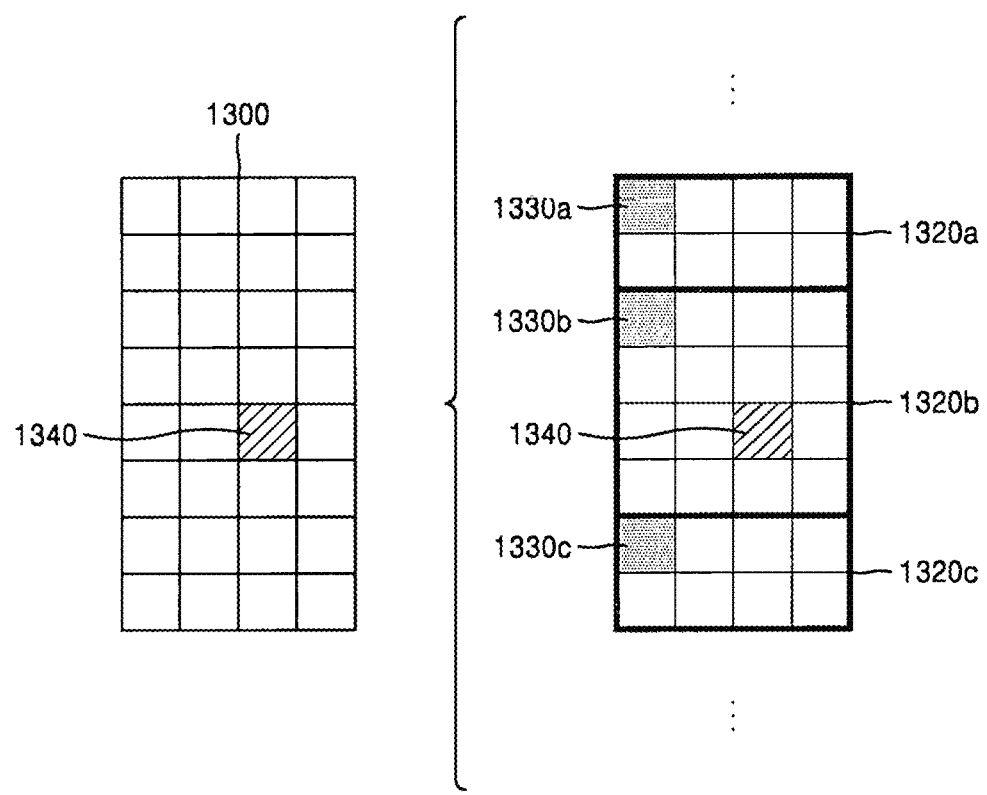
FIG. 13 illustrates a method of determining a certain coding unit from among an odd number of coding units, according to an embodiment.

FIG. 13 illustrates a method of determining, by the video decoding apparatus 100, a certain coding unit from among an odd number of coding units, according to an embodiment. Referring to FIG. 13, at least one of block shape information and split shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and split shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The video decoding apparatus 100 may determine that a current coding unit is split into coding units having various shapes and sizes or is not split by obtaining at least one of block shape information and split shape information from a certain location.

According to an embodiment, the video decoding apparatus 100 may select one coding unit when a current coding unit is split into a certain number of coding units. A method of selecting one of a plurality of coding units may vary, and details thereof will be described below through various embodiments.

According to an embodiment, the video decoding apparatus 100 may split a current coding unit into a plurality of coding units, and determine a coding unit at a certain location.

FIG. 13 illustrates a method of determining, by the video decoding apparatus 100, a coding unit at a certain location from among an odd number of coding units, according to an embodiment.

According to an embodiment, the video decoding apparatus 100 may use information indicating a location of each of the odd number of coding units so as to determine a coding unit located at the center from among the odd number of coding units. Referring to FIG. 13, the video decoding apparatus 100 may determine the odd number of coding units 1320a through 1320c by splitting the current coding unit 1300. The video decoding apparatus 100 may determine the center coding unit 1320b by using information about the locations of the odd number of coding units 1320a through 1320c. For example, the video decoding apparatus 100 may determine the coding unit 1320b located at the center by determining the locations of the coding units 1320a through 1320b based on information indicating locations of certain samples included in the coding units 1320a through 1320c. In detail, the video decoding apparatus 100 may determine the coding unit 1320b located at the center by determining the locations of the coding units 1320a through 1320c based on information indicating locations of upper left samples 1330a through 1330c of the coding units 1320a through 1320c.

According to an embodiment, the information indicating the locations of the upper left samples 1330a through 1330c included in the coding units 1320a through 1320c respectively may include information about a location or coordinates of the coding units 1320a through 1320c in a picture. According to an embodiment, the information indicating the locations of the upper left samples 1330a through 1330c included in the coding units 1320a through 1320c respectively may include information indicating widths or heights of the coding units 1320a through 1320c included in the current coding unit 1300, and such widths or heights may correspond to information indicating differences between coordinates of the coding units 1320a through 1320c in a picture. In other words, the video decoding apparatus 100 may determine the coding unit 1320b located at the center by directly using the information about the locations or coordinates of the coding units 1320a through 1320c in a picture or by using information about the widths or heights of the coding units 1320a through 1320c corresponding to the differences between coordinates.

According to an embodiment, the information indicating the location of the upper left sample 1330a of the upper coding unit 1320a may indicate (xa, ya) coordinates, the information indicating the location of the upper left sample 1330b of the center coding unit 1320b may indicate (xb, yb) coordinates, and the information indicating the location of the upper left sample 1330c of the lower coding unit 1320c may indicate (xc, yc) coordinates. The video decoding apparatus 100 may determine the center coding unit 1320b by using the coordinates of the upper left samples 1330a through 1330c respectively included in the coding units 1320a through 1320c. For example, when the coordinates of the upper left samples 1330a through 1330c are arranged in an ascending order or descending order, the coding unit 1320b including the coordinates (xb, yb) of the sample 1330b located at the center may be determined as a coding unit located at the center from among, the coding units 1320a through 1320c determined when the current coding unit 1300 is split. However, coordinates indicating the locations of the upper left samples 1330a through 1330c may be coordinates indicating absolute locations in a picture, and in addition, (dxb, dyb) coordinates, i.e., information indicating a relative location of the upper left sample 1330b of the center coding unit 1320b, and (dxc, dyc) coordinates, i.e., information indicating a relative location of the upper left sample 1330c of the lower coding unit 1320c, may be used based on the location of the upper left sample 1330a of the upper coding unit 1320a. Also, a method of determining a coding unit at a certain location by using, as information indicating locations of samples included in coding units, coordinates of the samples is not limited to the above, and various arithmetic methods capable of using coordinates of samples may be used.

According to an embodiment, the video decoding apparatus 100 may split the current coding unit 1300 into the plurality of coding units 1320a through 1320c, and select a coding unit from the coding units 1320a through 1320c according to a certain standard. For example, the video decoding apparatus 100 may select the coding unit 1320b having a different size from among the coding units 1320a through 1320c.

According to an embodiment, the video decoding apparatus 100 may determine widths or heights of the coding units 1320a through 1320c by respectively using the (xa, ya) coordinates, i.e., the information indicating the location of the upper left sample 1330a of the upper coding unit 1320a, the (xb, yb) coordinates, i.e., the information indicating the location of the upper left sample 1330b of the center coding unit 1320b, and the (xc, yc) coordinates, i.e., the information indicating the location of the upper left sample 1330c of the lower coding unit 1320c. The video decoding apparatus 100 may determine the sizes of the coding units 1320a through 1320c by respectively using the coordinates (xa, ya), (xb, yb), and (xc, yc) indicating the locations of the coding units 1320a through 1320c.

According to an embodiment, the video decoding apparatus 100 may determine the width of the upper coding unit 1320a to be xb-xa, and the height to be yb-ya. According to an embodiment, the video decoding apparatus 100 may determine the width of the center coding unit 1320b to be xc-xb, and the height to be yc-yb. According to an embodiment, the video decoding apparatus 100 may determine the width or height of the lower coding unit 1320c by using the width and height of the current coding unit 1300 and the widths and heights of the upper coding unit 1320a and the center coding unit 1320b. The video decoding apparatus 100 may determine a coding unit having a different size from other coding units based on the determined widths and heights of the coding units 1320a through 1320c. Referring to FIG. 13, the video decoding apparatus 100 may determine the center coding unit 1320b having a size different from those of the upper coding unit 1320a and the lower coding unit 1320c as a coding unit at a certain location. However, processes of the video decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the video decoding apparatus 100 may select a coding unit at a certain location from among an odd number of coding units determined when a current coding unit is split, while considering a shape of the current coding unit. For example, when the current coding unit has a non-square shape in which a width is longer than a height, the video decoding apparatus 100 may determine a coding unit at a certain location in a horizontal direction. In other words, the video decoding apparatus 100 may determine one of coding units having a different location in the horizontal direction and set a limit on the one coding unit. When the current coding unit has a non-square shape in which a height is longer than a width, the video decoding apparatus 100 may determine a coding unit at a certain location in a vertical direction. In other words, the video decoding apparatus 100 may determine one of coding units having a different location in the vertical direction and set a limit on the one coding unit.

According to an embodiment, the video decoding apparatus 100 may use information indicating a location of each of an even number of coding units so as to determine a coding unit at a certain location from among the even number of coding units. The video decoding apparatus 100 may determine the even number of coding units by splitting a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is split into a plurality of coding units, certain information about a coding unit at a certain location during splitting processes may be used to determine the coding unit at the certain location from among the plurality of coding units. For example, the video decoding apparatus 100 may use at least one of block shape information and split shape information stored in a sample included in a center coding unit during splitting processes so as to determine a coding unit located at the center from among a plurality of coding units obtained by splitting a current coding unit.

Referring to FIG. 13, the video decoding apparatus 100 may split the current coding unit 1300 into the plurality of coding units 1320a through 1320c based on at least one of block shape information and split shape information, and determine the coding unit 1320b located at the center from among the plurality of coding units 1320a through 1320c. In addition, the video decoding apparatus 100 may determine the coding unit 1320b located at the center considering a location from which at least one of the block shape information and the split shape information is obtained. In other words, at least one of the block shape information and the split shape information of the current coding unit 1300 may be obtained from the sample 1340 located at the center of the current coding unit 1300, and when the current coding unit 1300 is split into the plurality of coding units 1320a through 1320c based on at least one of the block shape information and the split shape information, the coding unit 1320b including the sample 1340 may be determined as a coding unit located at the center. However, information used to determine a coding unit located at the center is not limited to at least one of the block shape information and the split shape information, and various types of information may be used while determining a coding unit located at the center.

According to an embodiment, certain information for identifying a coding unit at a certain location may be obtained from a certain sample included in a coding unit to be determined. Referring to FIG. 13, the video decoding apparatus 100 may use at least one of block shape information and split shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320a through 1320c determined when the current coding unit 1300 is split. In other words, the video decoding apparatus 100 may determine the sample at the certain location considering a block shape of the current coding unit 1300, and determine and set a certain limit on the coding unit 1320b including a sample from which certain information (for example, at least one of block shape information and split shape information) is obtainable, from among the plurality of coding units 1320a through 1320c determined when the current coding unit 1300 is split. Referring to FIG. 13, according to an embodiment, the video decoding apparatus 100 may determine, as a sample from which certain information is obtainable, the sample 1340 located at the center of the current coding unit 1300, and set a certain limit on the coding unit 1320b including such a sample 1340 during decoding processes. However, a location of a sample from which certain information is obtainable is not limited to the above, and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the video decoding apparatus 100 may determine, as a sample from which certain information is obtainable, a sample located on a boundary of splitting at least one of a width and a height of a current coding unit into halves by using at least one of information about the width of the current coding unit and information about the height of the current coding unit. As another example, when block shape information related to a current coding unit indicates a non-square shape, the video decoding apparatus 100 may determine, as a sample from which certain information is obtainable, one of samples adjacent to a boundary of splitting long sides of the current coding unit into halves.

According to an embodiment, when a current coding unit is split into a plurality of coding units, the video decoding apparatus 100 may use at least one of block shape information and split shape information so as to determine a coding unit at a certain location from among the plurality of coding units. According to an embodiment, the video decoding apparatus 100 may obtain at least one of block shape information and split shape information from a sample at a certain location included in a coding unit, and may split a plurality of coding units generated as a current coding unit is split by using at least one of the split shape information and the block shape information obtained from the sample at the certain location included in each of the plurality of coding units. In other words, a coding unit may be recursively split by using at least one of block shape information and split shape information obtained from a sample at a certain location included in each coding unit. Since processes of recursively splitting a coding unit have been described above with reference to FIG. 12, details thereof are not provided again.

According to an embodiment, the video decoding apparatus 100 may determine at least one coding unit by splitting a current coding unit, and determine an order of decoding the at least one coding unit according to a certain block (for example, the current coding unit).

Figure 14:
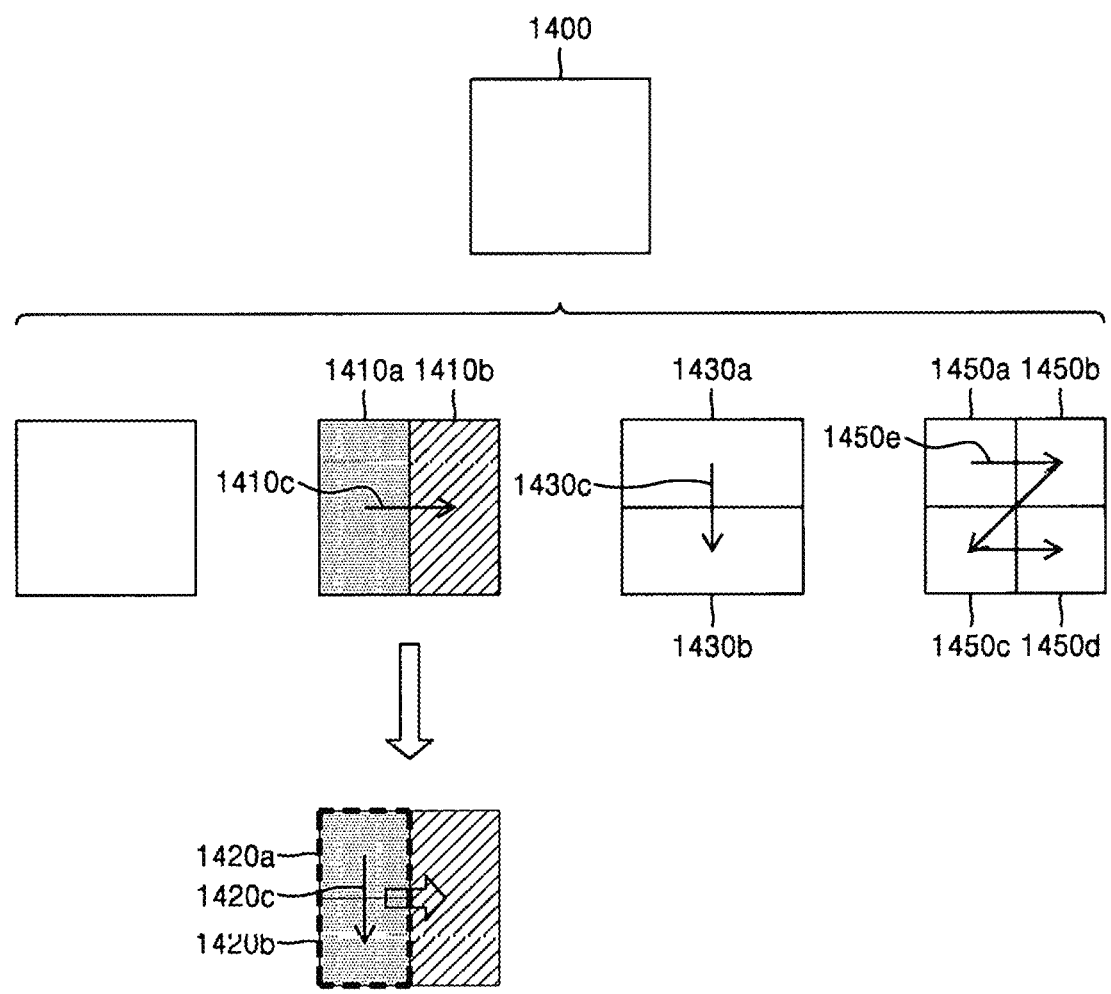
FIG. 14 illustrates an order of processing a plurality of coding units when the plurality of coding units are determined when a current coding unit is split, according to an embodiment.

FIG. 14 illustrates an order of processing a plurality of coding units when the plurality of coding units are determined when the video decoding apparatus 100 splits a current coding unit, according to an embodiment.

According to an embodiment, the video decoding apparatus 100 may determine second coding units 1410a and 1410b by splitting a first coding unit 1400 in a vertical direction, determine second coding units 1430a and 1430b by splitting the first coding unit 1400 in a horizontal direction, or determine second coding units 1450a through 1450d by splitting the first coding unit 140 in horizontal and vertical directions, according to block shape information and split shape information.

Referring to FIG. 14, the video decoding apparatus 100 may determine the second coding units 1410a and 1410b, which are determined by splitting the tirst coding unit 1400 in the vertical direction, to be processed in a horizontal direction 1410c. The video decoding apparatus 100 may determine the second coding units 1430a and 1430b, which are determined by splitting the first coding unit 1400 in the horizontal direction, to be processed in a vertical direction 1430c. The video decoding apparatus 100 may determine the second coding units 1450a through 1450d, which are determined by splitting the first coding unit 1400 in the vertical and horizontal directions, to be processed according to a certain order in which coding units located in one row are processed and then coding units located in a next row are processed (for example, a raster scan order or a z-scan order 1450e).

According to an embodiment, the video decoding apparatus 100 may recursively split coding units. Referring to FIG. 14, the video decoding apparatus 100 may determine the plurality of second coding units 1410a and 1410b, 1430a and 1430b, or 1450a through 1450d by splitting the first coding unit 1400, and recursively split each of the plurality of second coding units 1410a and 1410b, 1430a and 1430b, or 1450a through 1450d. A method of splitting the plurality of second coding units 1410a and 1410b, 1430a and 1430b, or 1450a through 1450d may correspond to a method of splitting the first coding unit 1400. Accordingly, each of the plurality of second coding units 1410a and 1410b, 1430a and 1430b, or 1450a through 1450d may be independently split into a plurality of coding units. Referring to FIG. 14, the video decoding apparatus 100 may determine the second coding units 1410a and 1410b by splitting the first coding unit 1400 in the vertical direction, and in addition, determine that each of the second coding units 1410a and 1410b is independently split or not split.

According to an embodiment, the video decoding apparatus 100 may split the second coding unit 1410a at the left in a horizontal direction into third coding units 1420a and 1420b, and may not split the second coding unit 1410b at the right.

According to an embodiment, an order of processing coding units may be determined based on split processes of coding units. In other words, an order of processing coding units that are split may be determined based on an order of processing coding units before being split. The video decoding apparatus 100 may determine an order of processing the third coding units 1420a and 1420b determined when the second coding unit 1410a at the left is split independently from the second coding unit 1410b at the right. Since the third coding units 1420a and 1420b are determined when the second coding unit 1410a at the left is split in a horizontal direction, the third coding units 1420a and 1420b may be processed in a vertical direction 1420c. Also, since an order of processing the second coding unit 1410a at the left and the second coding unit 1410b at the right corresponds to the horizontal direction 1410c, the second coding unit 1410b at the right may be processed after the third coding units 1420a and 1420b included in the second coding unit 1410a at the left are processed in the vertical direction 1420c. The above descriptions are related processes of determining an order of processing coding units according to coding units before being split, but such processes are not limited to the above embodiments, and any method of independently processing, in a certain order, coding units split into various shapes may be used.

Figure 15:
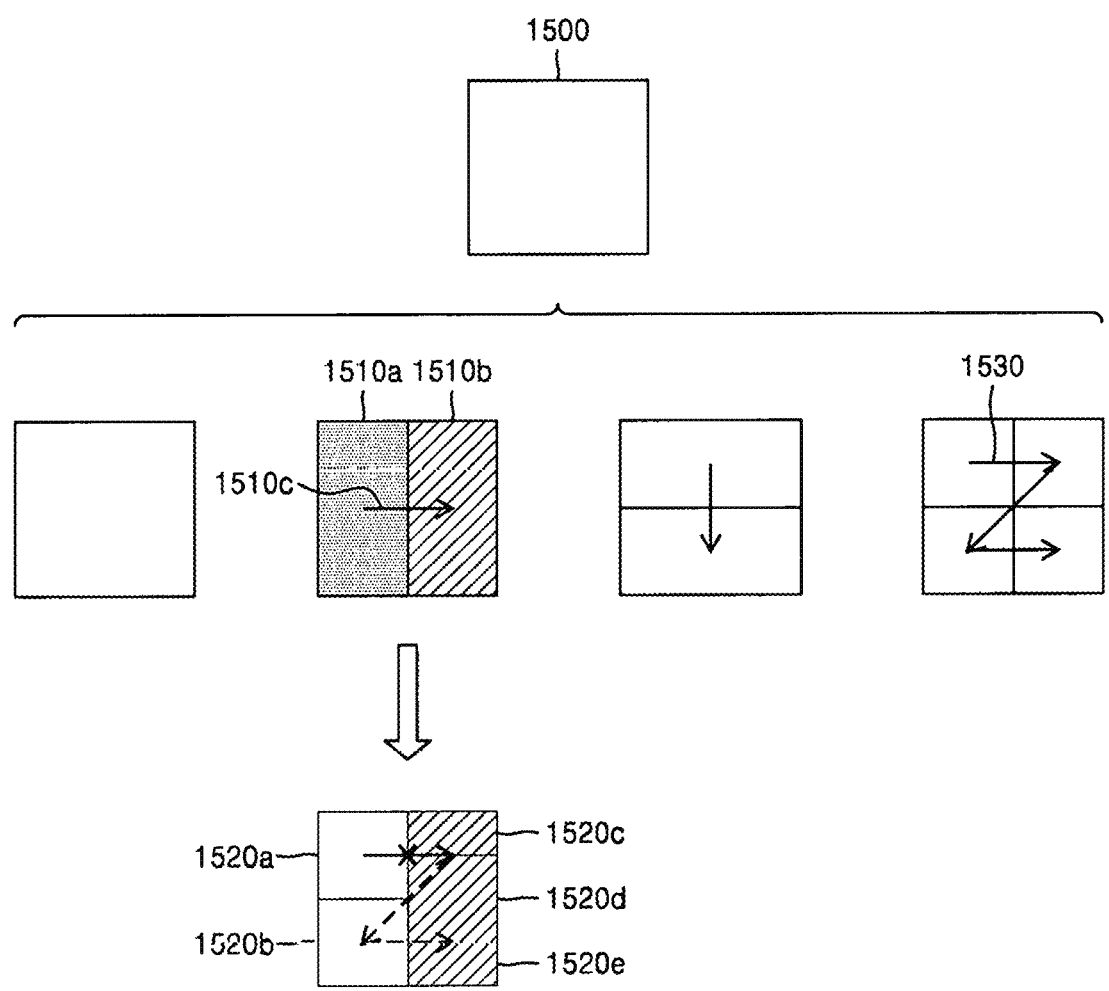
FIG. 15 illustrates processes of determining that a current coding unit is split into an odd number of coding units when coding units are not processable in a certain order, according to an embodiment.

FIG. 15 illustrates processes of determining that a current coding unit is split into an odd number of coding units when coding units are not processable in a certain order by the video decoding apparatus 100, according to an embodiment.

According to an embodiment, the video decoding apparatus 100 may determine that a current coding unit is split into an odd number of coding units based on obtained block shape information and split shape information. Referring to FIG. 15, a first coding unit 1500 having a square shape may be split into second coding units 1510a and 1510b having a non-square shape, and the second coding units 1510a and 1510b may be independently respectively split into third coding units 1520a and 1520b, and 1520c through 1520e. According to an embodiment, the video decoding apparatus 100 may split the second coding unit 1510a at the left from among the second coding units 1510a and 1510b into a horizontal direction to determine the plurality of third coding units 1520a and 1520b, and split the second coding unit 1510b at the right into the odd number of third coding units 1520c through 1520e.

According to an embodiment, the video decoding apparatus 100 may determine whether a coding unit split into an odd number exists by determining whether the third coding units 1520a through 1520e are processable in a certain order. Referring to FIG. 15, the video decoding apparatus 100 may determine the third coding units 1520a through 1520e by recursively splitting the first coding unit 1500. The video decoding apparatus 100 may determine, based on at least one of block shape information and split shape information, whether a coding unit is split into an odd number from among shapes into which the first coding unit 1500, the second coding units 1510a and 1510b, or the third coding units 1520a through 1520e are split. For example, the second coding unit 1510b at the right from among the second coding units 1510a and 1510b may be split into the odd number of third coding units 1520c through 1520e. An order of processing a plurality of coding units included in the first coding unit 1500 may be a certain order (for example, a z-scan order 1530), and the video decoding apparatus 100 may determine whether the third coding units 1520c through 1520e determined when the second coding unit 1510b at the right is split into an odd number satisfy a condition of being processable according to the certain order.

According to an embodiment, the video decoding apparatus 100 may determine whether the third coding units 1520a through 1520e included in the first coding unit 1500 satisfy a condition of being processable according to a certain order, wherein the condition is related to whether at least one of a width and a height of each of the second coding units 1510a and 1510b is split into halves according to boundaries of the third coding units 1520a through 1520e. For example, the third coding units 1520a and 1520b determined when the height of the second coding unit 1510a at the left and having a non-square shape is split into halves satisfy the condition, but it may be determined that the third coding units 1520c through 1520e do not satisfy the condition because the boundaries of the third coding units 1520c through 1520e that are determined when the second coding unit 1510b at the right is split into three coding units do not split the width or height of the second coding unit 1510b at the right into halves. The video decoding apparatus 100 may determine disconnection of a scan order when the condition is not satisfied, and determine that the second coding unit 1510b at the right is split into the odd number of coding units, based on a result of the determination. According to an embodiment, the video decoding apparatus 100 may set a certain limit on a coding unit at a certain location from among an odd number of coding units obtained by splitting a coding unit, and since such a limit or certain location has been described above through various embodiments, details thereof are not provided again.

Figure 16:
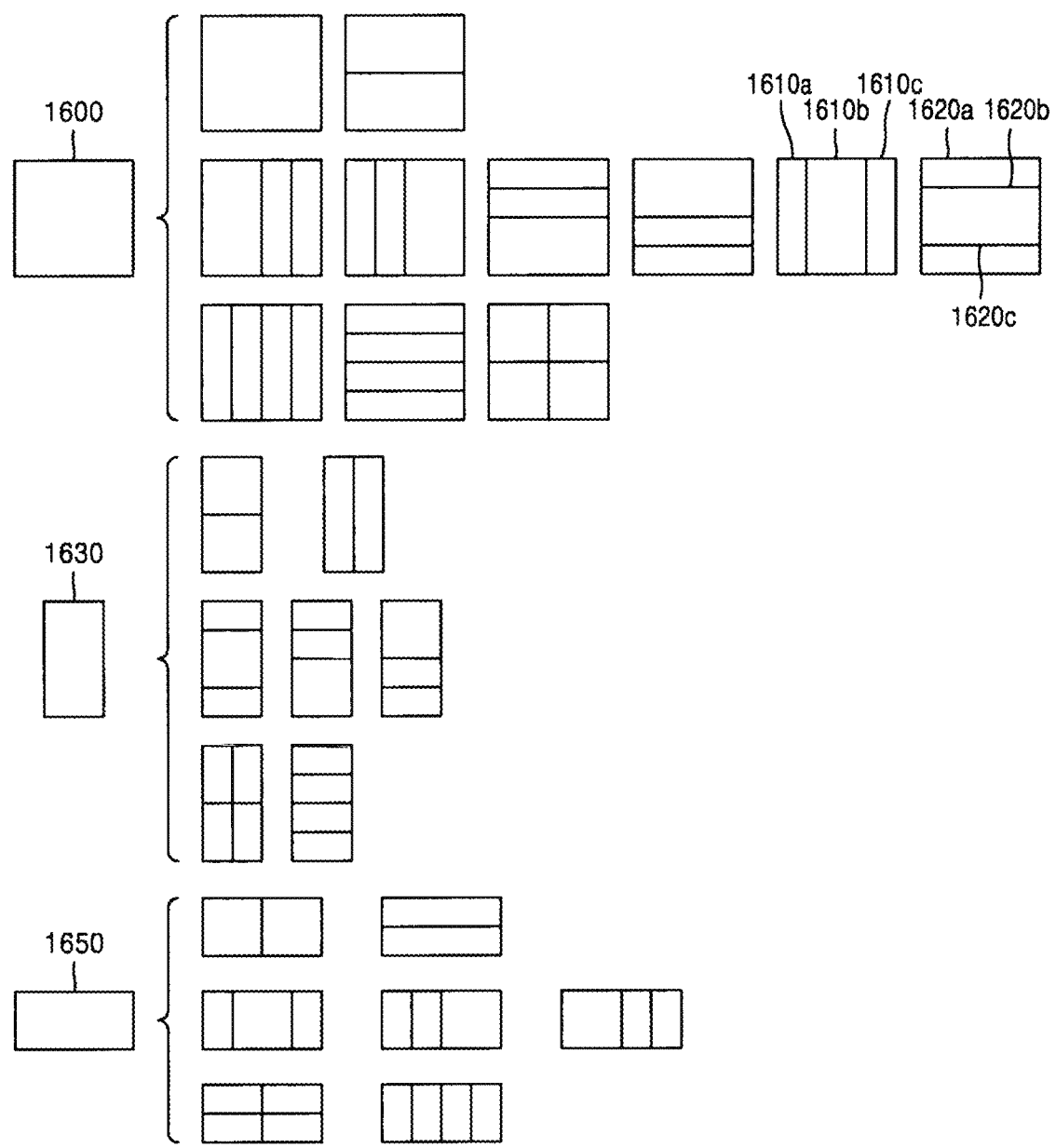
FIG. 16 illustrates processes of determining at least one coding unit when a first coding unit is split, according to an embodiment.

FIG. 16 illustrates processes of determining at least one coding unit when the video decoding apparatus 100 splits a first coding unit 1600, according to an embodiment. According to an embodiment, the video decoding apparatus 100 may split the first coding unit 1600 based on at least one of block shape information and split shape information obtained through the obtainer 105. The first coding unit 1600 having a square shape may be split into four coding units having a square shape or a plurality of coding units having a non-square shape. For example, referring to FIG. 16, when block shape information indicates that the first coding unit 1600 is a square and split shape information indicates a split into non-square coding units, the video decoding apparatus 100 may split the first coding unit 1600 into a plurality of non-square coding units. In detail, when split shape information indicates that an odd number of coding units are determined by splitting the first coding unit 1600 in a horizontal direction or a vertical direction, the video decoding apparatus 100 may determine, as the odd number of coding units, second coding units 1610a through 1610c by splitting the first coding unit 1600 having a square shape in a vertical direction, or second coding units 1620a through 1620c by splitting the first coding unit 1600 in a horizontal direction.

According to an embodiment, the video decoding apparatus 100 may determine whether the second coding units 1610a through 1610c and 1620a through 1620c included in the first coding unit 1600 satisfy a condition of being processable in a certain order, wherein the condition is related to whether at least one of a width and a height of the first coding unit 1600 is split into halves according to boundaries of the second coding units 1610a through 1610c and 1620a through 1620c. Referring to FIG. 16, since the boundaries of the second coding units 1610a through 1610c determined when the first coding unit 1600 having a square shape is split in a vertical direction do not split the width of the first coding unit 1600 into halves, it may be determined that the first coding unit 1600 does not satisfy the condition of being processable in a certain order. Also, since the boundaries of the second coding units 1620a through 1620c determined when the first coding unit 1600 having a square shape is split in a horizontal direction do not split the height of the first coding unit 1600 into halves, it may be determined that the first coding unit 1600 does not satisfy the condition of being processable in a certain order. The video decoding apparatus 100 may determine disconnection of a scan order when the condition is not satisfied, and determine that the first coding unit 1600 is split into the odd number of coding units based on a result of the determination. According to an embodiment, the video decoding apparatus 100 may set a certain limit on a coding unit at a certain location from among an odd number of coding units obtained by splitting a coding unit, and since such a limit or certain location has been described above through various embodiments, details thereof are not provided again.

According to an embodiment, the video decoding apparatus 100 may determine coding units having various shapes by splitting a first coding unit.

Referring to FIG. 16, the video decoding apparatus 100 may split the first coding unit 1600 having a square shape and a first coding unit 1630 or 1650 having a non-square shape into coding units having various shapes.

Figure 17:
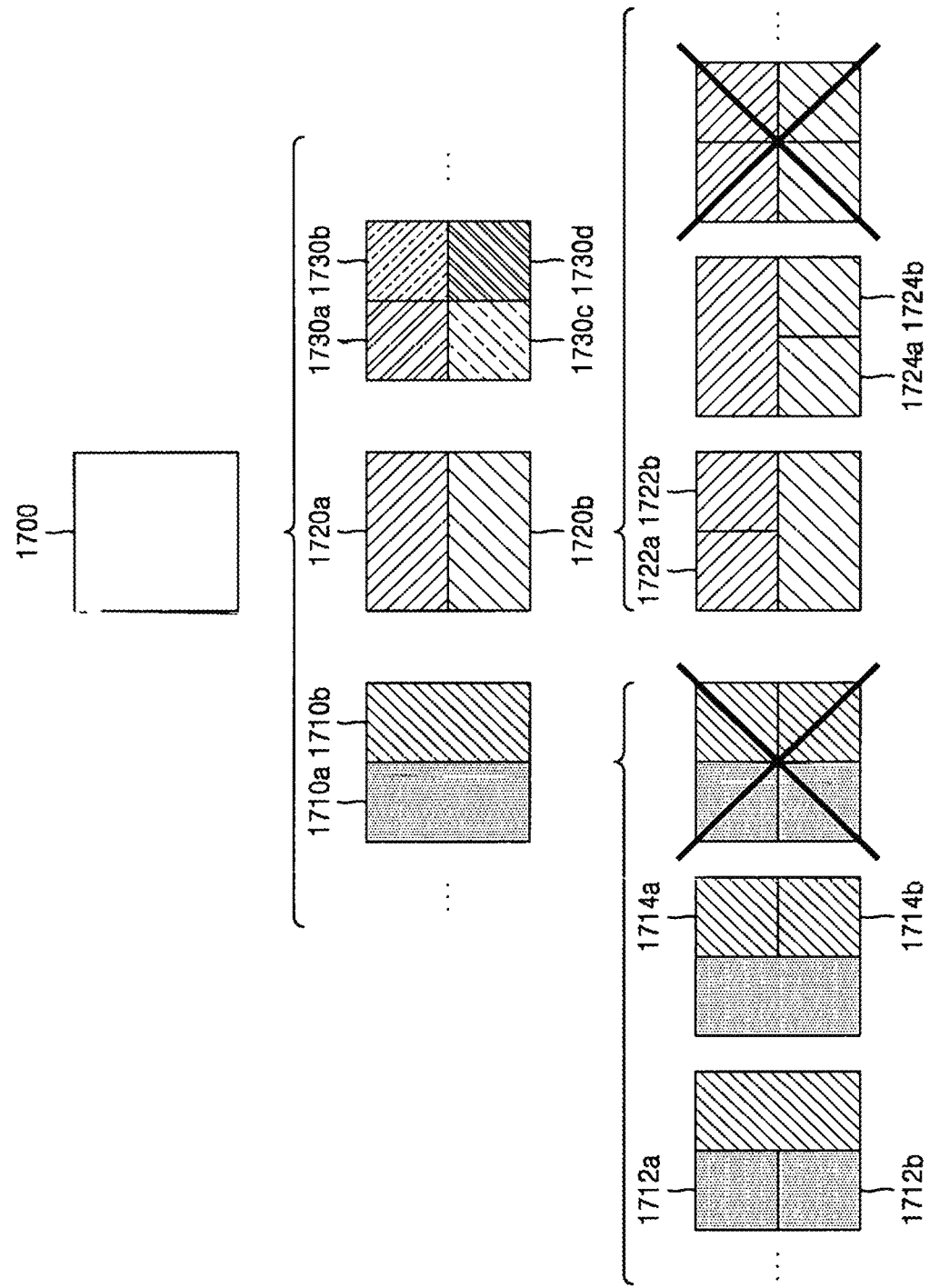
FIG. 17 illustrates that a shape into which a second coding unit is splittable is restricted when the second coding unit having a non-square shape determined when a first coding unit is split satisfies a certain condition, according to an embodiment.

FIG. 17 illustrates that a shape into which a second coding unit is splittable by the video decoding apparatus 100 is restricted when the second coding unit having a non-square shape determined when a first coding unit 1700 is split satisfies a certain condition, according to an embodiment.

According to an embodiment, the video decoding apparatus 100 may determine that the first coding unit 1700 having a square shape is split into second coding units 1710a and 1710b or 1720a and 1720b having a non-square shape, based on at least one of block shape information and split shape information obtained through the obtainer 105. The second coding units 1710a and 1710b or 1720a and 1720b may be independently split. Accordingly, the video decoding apparatus 100 may determine that the second coding units 1710a and 1710b or 1720a and 1720b are split into a plurality of coding units or are not split based on at least one of block shape information and split shape information related to each of the coding units 1710a and 1710b or 1720a and 1720b. According to an embodiment, the video decoding apparatus 100 may determine third coding units 1712a and 1712b by splitting, in a horizontal direction, the second coding unit 1710a at the left having a non-square shape, which is determined when the first coding unit 1700 is split in a vertical direction. However, when the second coding unit 1710a at the left is split in the horizontal direction, the video decoding apparatus 100 may set a limit that the second coding unit 1710b at the right is not split in the horizontal direction like the second coding unit 1710a at the left. When third coding units 1714a and 1714b are determined when the second coding unit 1710b at the right is split in the same direction, i.e., the horizontal direction, the third coding units 1712a, 1712b, 1714a, and 1714b are determined when the second coding units 1710a at the left and the second coding unit 1710b at the right are each independently split in the horizontal direction. However, this is the same result as splitting the first coding unit 1700 into four second coding units 1730a through 1730d having a square shape based on at least one of block shape information and split shape information, and thus may be inefficient in terms of image decoding.

According to an embodiment, the video decoding apparatus 100 may determine third coding units 1722a and 1722b, or 1724a and 1724b by splitting, in a vertical direction, the second coding unit 1720a or 1720b having a non-square shape determined when the first coding unit 1700 is split in the horizontal direction. However, when one of second coding units (for example, the second coding unit 1720a at the top) is split in a vertical direction, the video decoding apparatus 100 may set a limit that the other second coding unit (for example, the second coding unit 1720b at the bottom) is not split in the vertical direction like the second coding unit 1720a at the top for the above described reasons.

Figure 18:
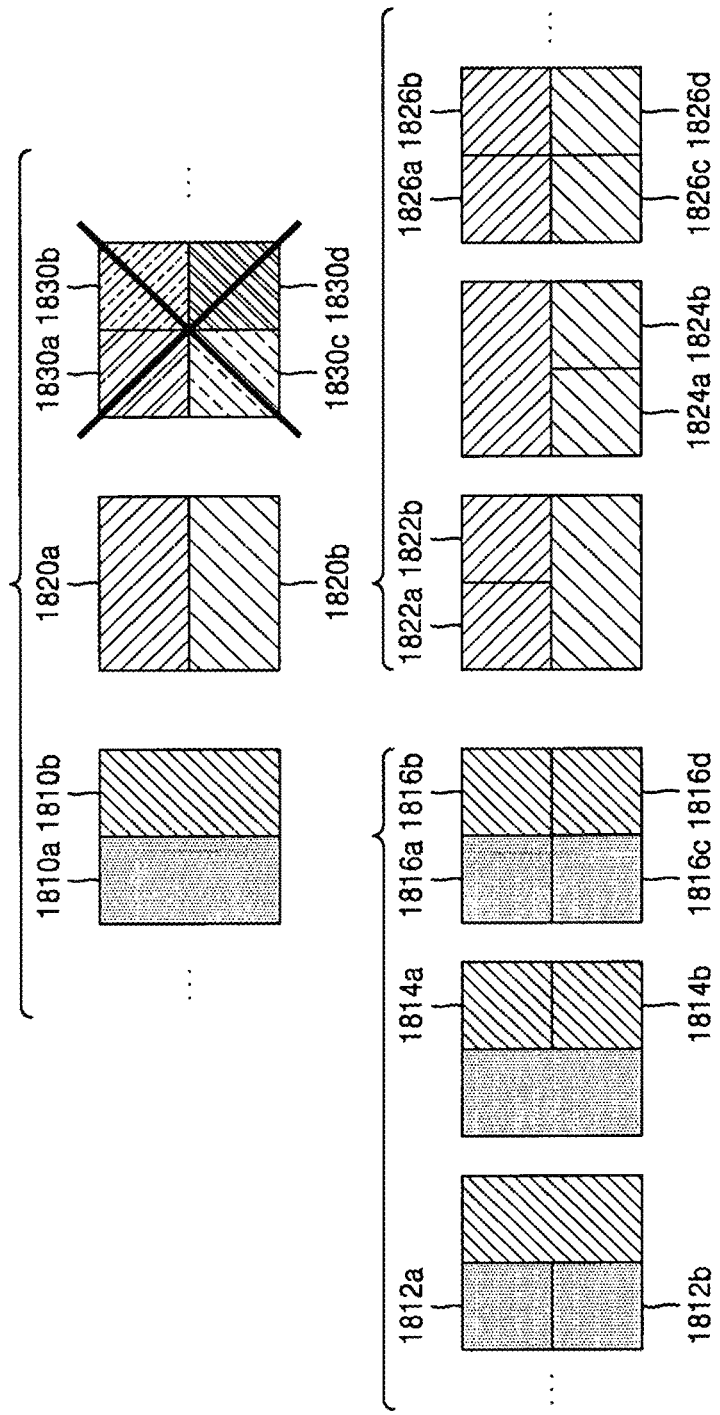
FIG. 18 illustrates processes of splitting a coding unit having a square shape when split shape information is unable to indicate that a coding unit is split into four square shapes, according to an embodiment.

FIG. 18 illustrates processes of the video decoding apparatus 100 splitting a coding unit having a square shape when split shape information is unable to indicate that a coding unit is split into four square shapes, according to an embodiment.

According to an embodiment, the video decoding apparatus 100 may determine second coding units 1810a and 1810b, or 1820a and 1820b, by splitting a first coding unit 1800 based on at least one of block shape information and split shape information. Split shape information may include information about various shapes into which a coding unit may be split, but such information about various shapes may not include information for splitting a coding unit into four square coding units. According to such split shape information, the video decoding apparatus 100 is unable to split the first coding unit 1800 having a square shape into four second coding units 1830 through 1830d having a square shape. The video decoding apparatus 100 may determine the second coding units 1810a and 1810b, or 1820a and 1820b having a non-square shape based on the split shape information.

According to an embodiment, the video decoding apparatus 100 may independently split each of the second coding units 1810a and 1810b, or 1820a and 1820b having a non-square shape. Each of the second coding units 1810a and 1810b, or 1820a and 1820b may be split in a certain order via a recursive method that may be a split method corresponding to a method of splitting the first coding unit 1800 based on at least one of the block shape information and the split shape information.

For example, the video decoding apparatus 100 may determine third coding units 1812a and 1812b having a square shape by splitting the second coding unit 1810a at the left in a horizontal direction, or determine third coding units 1814a and 1814b having a square shape by splitting the second coding unit 1810b at the right in a horizontal direction. In addition, the video decoding apparatus 100 may determine third coding units 1816a through 1816d having a square shape by splitting both the second coding unit 1810a at the lett and the second coding unit 1810b at the right in the horizontal direction. In this case, coding units may be determined in the same manner as when the first coding unit 1800 is split into four second coding units 1830a through 1830d having a square shape.

As another example, the video decoding apparatus 100 may determine third coding units 1822a and 1822b having a square shape by splitting the second coding unit 1820a at the top in a vertical direction, and determine third coding units 1824a and 1824b having a square shape by splitting the second coding unit 1820b at the bottom in a vertical direction. In addition, the video decoding apparatus 100 may determine third coding units 1826a through 1826d having a square shape by splitting both the second coding unit 1820a at the top and the second coding unit 1820b at the bottom in the vertical direction. In this case, coding units may be determined in the same manner as when the first coding unit 1800 is split into four second coding units 1830a through 1830d having a square shape.

Figure 19:
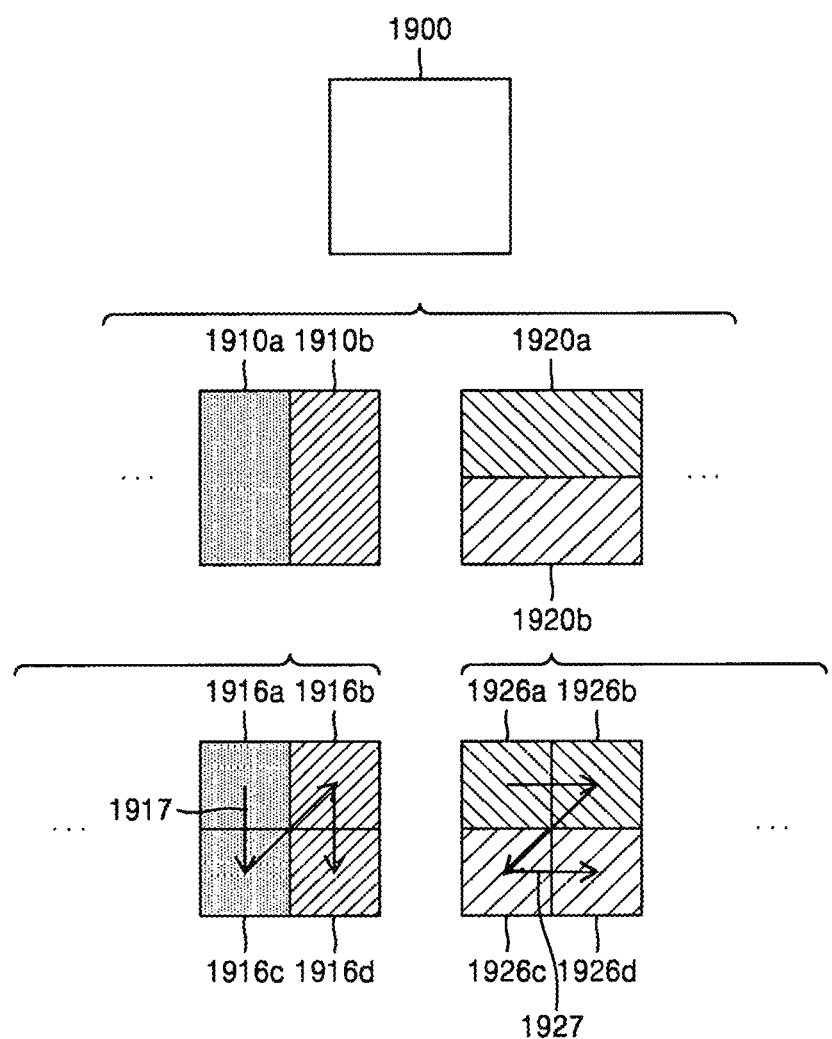
FIG. 19 illustrates that an order of processing a plurality of coding units may be changed according to processes of splitting a coding unit, according to an embodiment.

FIG. 19 illustrates that an order of processing a plurality of coding units may be changed according to processes of splitting a coding unit, according to an embodiment.

According to an embodiment, the video decoding apparatus 100 may split a first coding unit 1900 based on block shape information and split shape information. When the block shape information indicates a square shape and the split shape information indicates that the first coding unit 1900 is split in at least one of a horizontal direction and a vertical direction, the video decoding apparatus 100 may split the first coding unit 1900 to determine second coding units 1910a and 1910b, or 1920a and 1920b. Referring to FIG. 19, the second coding units 1910a and 1910b, or 1920a and 1920b having a non-square shape and determined when the first coding unit 1900 is split in the horizontal direction or the vertical direction may each be independently split based on block shape information and split shape information. For example, the video decoding apparatus 100 may determine third coding units 1916a through 1916d by splitting, in the horizontal direction, each of the second coding units 1910a and 1910b generated as the first coding unit 1900 is split in the vertical direction, or determine third coding units 1926a through 1926d by splitting, in the horizontal direction, the second coding units 1920a and 1920b generated as the first coding unit 1900 is split in the horizontal direction. Processes of splitting the second coding units 1910a and 1910b, or 1920a and 1920b have been described above with reference to FIG. 17, and thus details thereof are not provided again.

According to an embodiment, the video decoding apparatus 100 may process coding units according to a certain order. Features about processing coding units according to a certain order have been described above with reference to FIG. 14, and thus details thereof are not provided again. Referring to FIG. 19, the video decoding apparatus 100 may determine four third coding units 1916a through 1916d or 1926a through 1926d having a square shape by splitting the first coding unit 1900 having a square shape. According to an embodiment, the video decoding apparatus 100 may determine an order of processing the third coding units 1916a through 1916d or 1926a through 1926d based on how the first coding unit 1900 is split.

According to an embodiment, the video decoding apparatus 100 may determine the third coding units 1916a through 1916d by splitting, in the horizontal direction, the second coding units 1910a and 1910b generated as the first coding unit 1900 is split in the vertical direction, and process the third coding units 1916a through 1916d according to an order 1917 of first processing, in the vertical direction, the third coding units 1916a and 1916b included in the second coding unit 1910a at the left, and then processing, in the vertical direction, the third coding units 1916c and 1916d included in the second coding unit 1910b at the right.

According to an embodiment, the video decoding apparatus 100 may determine the third coding units 1926a through 1926d by splitting, in the vertical direction, the second coding units 1920a and 1920b generated as the first coding unit 1900 is split in the horizontal direction, and process the third coding units 1926a through 1926d according to an order 1927 of first processing, in the horizontal direction, the third coding units 1926a and 1926b included in the second coding unit 1920*a* at the top, and then processing, in the horizontal direction, the third coding units 1926*c* and 1926*d* included in the second coding unit 1920*b* at the bottom.

Referring to FIG. 19, the third coding units 1916*a* through 1916*d* or 1926*a* through 1926*d* having a square shape may be determined when the second coding units 1910*a* and 1910*b*, or 1920*a* and 1920*b* are each split. The second coding units 1910*a* and 1910*b* determined when the first coding unit 1900 is split in the vertical direction and the second coding units 1920*a* and 1920*b* determined when the first coding unit 1900 is split in the horizontal direction are split in different shapes, but according to the third coding units 1916*a* through 1916*d* and 1926*a* through 1926*d* determined afterwards, the first coding unit 1900 is split in coding units having same shapes. Accordingly, the video decoding apparatus 100 may process pluralities of coding units determined in same shapes in different orders even when the coding units having the same shapes are consequently determined when coding units are recursively split through different processes based on at least one of block shape information and split shape information.

FIG. 20 illustrates processes of determining a depth of a coding unit as a shape and size of the coding unit are changed, when a plurality of coding units are determined when the coding unit is recursively split, according to an embodiment.

According to an embodiment, the video decoding apparatus 100 may determine a depth of a coding unit according to a certain standard. For example, the certain standard may be a length of a long side of the coding unit. When a length of a long side of a current coding unit is split 2*n* times shorter than a length of a long side of a coding unit before being split, it may be determined that a depth of the current coding unit is increased n times a depth of the coding unit before being split, wherein n>0. Hereinafter, a coding unit having an increased depth is referred to as a coding unit of a lower depth.

Referring to FIG. 20, the video decoding apparatus 100 may determine a second coding unit 2002 and a third coding unit 2004 of lower depths by splitting a first coding unit 2000 having a square shape, based on block shape information indicating a square shape (for example, block shape information may indicate '0:SQURE'), according to an embodiment. When a size of the first coding unit 2000 having a square shape is 2N×2N, the second coding unit 2002 determined by splitting a width and a height of the first coding unit 2000 by ½^1 may have a size of N×N. In addition, the third coding unit 2004 determined by splitting a width and a height of the second coding unit 2002 by ½ may have a size of N/2×N/2. In this case, a width and a height of the third coding unit 2004 corresponds to ½^2 of the first coding unit 2000. When a depth of first coding unit 2000 is D, a depth of the second coding unit 2002 having ½^1 of the width and the height of the first coding unit 2000 may be D+1, and a depth of the third coding unit 2004 having ½^2 of the width and the height of the first coding unit 2000 may be D+2.

According to an embodiment, the video decoding apparatus 100 may determine a second coding unit 2012 or 2022 and a third coding unit 2014 or 2024 by splitting a first coding unit 2010 or 2020 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The video decoding apparatus 100 may determine a second coding unit (for example, the second coding unit 2002, 2012, or 2022) by splitting at least one of a width and a height of the first coding unit 2010 having a size of N×2N. In other words, the video decoding apparatus 100 may determine the second coding unit 2002 having a size of N×N or the second coding unit 2022 having a size of N×N/2 by splitting the first coding unit 2010 in a horizontal direction, or determine the second coding unit 2012 having a size of N/2×N by splitting the first coding unit 2010 in horizontal and vertical directions.

The video decoding apparatus 100 may determine a second coding unit (for example, the second coding unit 2002, 2012, or 2022) by splitting at least one of a width and a height of the first coding unit 2020 having a size of 2N×N. In other words, the video decoding apparatus 100 may determine the second coding unit 2002 having a size of N×N or the second coding unit 2012 having a size of N/2×N by splitting the first coding unit 2020 in a vertical direction, or determine the second coding unit 2022 having a size of N×N/2 by splitting the first coding unit 2010 in horizontal and vertical directions.

According to an embodiment, the video decoding apparatus 100 may determine a third coding unit (for example, the third coding unit 2004, 2014, or 2024) by splitting at least one of a width and a height of the second coding unit 2002 having a size of N×N. In other words, the video decoding apparatus 100 may determine the third coding unit 2004 having a size of N/2×N/2, the third coding unit 2014 having a size of N/22×N/2, or the third coding unit 2024 having a size of N/2×N/22 by splitting the second coding unit 2002 in vertical and horizontal directions.

According to an embodiment, the video decoding apparatus 100 may determine a third coding unit (for example, the third coding unit 2004, 2014, or 2024) by splitting at least one of a width and a height of the second coding unit 2022 having a size of N/2×N. In other words, the video decoding apparatus 100 may determine the third coding unit 2004 having a size of N/2×N/2 or the third coding unit 2024 having a size of N/2×N/22 by splitting the second coding unit 2012 in a horizontal direction, or the third coding unit 2014 having a size of N/22×N/2 by splitting the second coding unit 2012 in vertical and horizontal directions.

According to an embodiment, the video decoding apparatus 100 may determine a third coding unit (for example, the third coding unit 2004, 2014, or 2024) by splitting at least one of a width and a height of the second coding unit 2022 having a size of N×N/2. In other words, the video decoding apparatus 100 may determine the third coding unit 2004 having a size of N/2×N/2 or the third coding unit 2014 having a size of N/22×N/2 by splitting the second coding unit 2022 in a vertical direction, or the third coding unit 2024 having a size of N/2×N/22 by splitting the second coding unit 2022 in vertical and horizontal directions.

According to an embodiment, the video decoding apparatus 100 may split a coding unit (for example, the first, second, or third coding unit 2000, 2002, or 2004) having a square shape in a horizontal or vertical direction. For example, the first coding unit 2010 having a size of N×2N may be determined by splitting the first coding unit 2000 having a size of 2N×2N in the vertical direction, or the first coding unit 2020 having a size of 2N×N may be determined by splitting the first coding unit 2000 in the horizontal direction. According to an embodiment, when a depth is determined based on a length of a longest side of a coding unit, a depth of a coding unit determined when the first coding unit 2000 having a size of 2N×2N is split in a horizontal or vertical direction may be the same as a depth of the first coding unit 2000.

According to an embodiment, the width and the height of the third coding unit 2014 or 2024 may be 1/22 of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is ½^2 of the width and the height of the first coding unit 2010 or 202 may be D+2.

Figure 21:
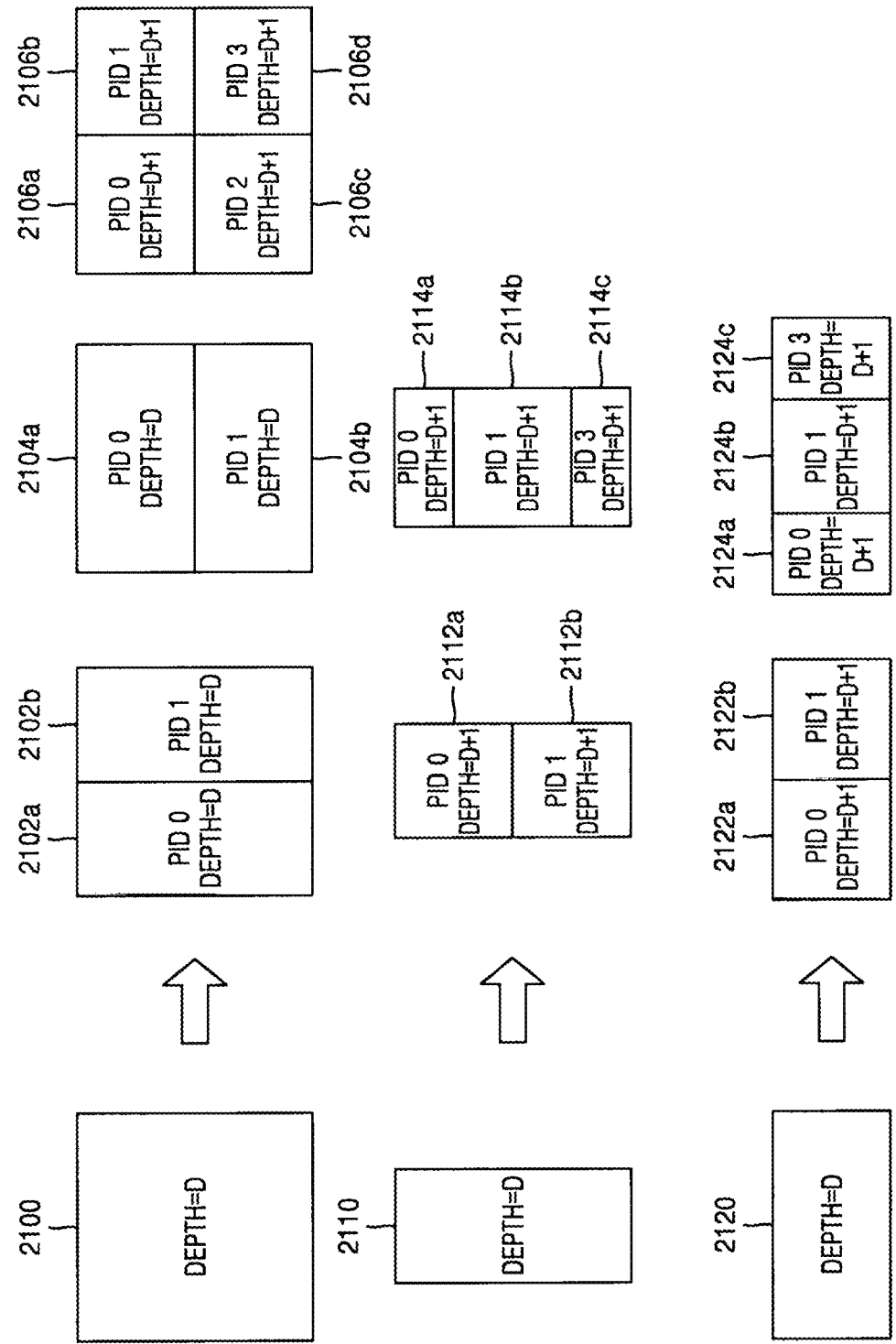
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the video decoding apparatus 100 may determine a second coding unit having various shapes by splitting a first coding unit 2100 having a square shape. Referring to FIG. 21, the video decoding apparatus 100 may determine second coding units 2102a and 2102b, 2104a and 2104b, or 2106a through 2106d by splitting the first coding unit 2100 in at least one of a vertical direction and a horizontal direction, according to split shape information. In other words, the video decoding apparatus 100 may determine the second coding units 2102a and 2102b, 2104a and 2104b, or 2106a through 2106d based on split shape information of the first coding unit 2100.

According to an embodiment, a depth of the second coding units 2102a and 2102b, 2104a and 2104b, or 2106a through 2106d determined according to the split shape information of the first coding unit 2100 having a square shape may be determined based on a length of a long side. For example, since a length of one side of the first coding unit 2100 having a square shape is the same as a length of a long side of the second coding units 2102a and 2102b or 2104a and 2104b having a non-square shape, the depths of the first coding unit 2100 and the second coding units 2102a and 2102b or 2104a and 2104b having a non-square shape may be the same, i.e., D. On the other hand, when the video decoding apparatus 100 splits the first coding unit 2100 into the four second coding units 2106a through 2106d having a square shape, based on the split shape information, a length of one side of the second coding units 2106a through 2106d having a square shape is ½ of the length of one side of the first coding unit 2100, the depths of the second coding units 2106a through 2106d may be D+1, i.e., a depth lower than the depth D of the first coding unit 2100.

According to an embodiment, the video decoding apparatus 100 may split a first coding unit 2110, in which a height is longer than a width, in a horizontal direction into a plurality of second coding units 2112a and 2112b or 2114a through 2114c, according to split shape information. According to an embodiment, the video decoding apparatus 100 may split a first coding unit 2120, in which a width is longer than a height, in a vertical direction into a plurality of second coding units 2122a and 2122b or 2124a through 2124c, according to split shape information.

According to an embodiment, depths of the second coding units 2112a and 2112b, 2114a through 2114c, 2122a and 2122b, or 2124a through 2124c determined according to the split shape information of the first coding unit 2110 or 2120 having a non-square shape may be determined based on a length of a long side. For example, since a length of one side of the second coding units 2112a and 2112b having a square shape is ½ of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the video decoding apparatus 100 may split the first coding unit 2110 having a non-square shape into an odd number of second coding units 2114a through 2114c, based on split shape information. The odd number of second coding units 2114a through 2114c may include the second coding units 2114a and 2114c having a non-square shape, and the second coding unit 2114b having a square shape. In this case, since a length of a long side of the second coding units 2114a and 2114c having a non-square shape and a length of one side of the second coding unit 2114b having a square shape are ½ of a length of one side of the first coding unit 2110, depths of the second coding units 2114a through 2114b may be D+1, i.e., a depth lower than the depth D of the first coding unit 2110. The video decoding apparatus 100 may determine depths of coding units related to the first coding unit 2120 having a non-square shape in which a width is longer than a height, in the same manner as the determining of depths of coding units related to the first coding unit 2110.

According to an embodiment, with respect to determining PIDs for distinguishing coding units, when an odd number of coding units do not have the same size, the video decoding apparatus 100 may determine PIDs based on a size ratio of the coding units. Referring to FIG. 21, the second coding unit 2114b located at the center from the odd number of second coding units 2114a through 2114c may have the same width as the second coding units 2114a and 2114c, but have a height twice higher than those of the second coding units 2114a and 2114c. In this case, the second coding unit 2114b located at the center may include two of the second coding units 2114a and 2114c. Accordingly, when the PID of the second coding unit 2114b located at the center is 1 according to a scan order, the PID of the second coding unit 2114c in a next order may be 3, the PID having increased by 2. In other words, values of the PID may be discontinuous. According to an embodiment, the video decoding apparatus 100 may determine whether an odd number of coding units have the same sizes based on discontinuity of PID for distinguishing the coding units.

According to an embodiment, the video decoding apparatus 100 may determine whether a plurality of coding units determined when a current coding unit is split have certain split shapes based on values of PID. Referring to FIG. 21, the video decoding apparatus 100 may determine the even number of second coding units 2112a and 211b or the odd number of second coding units 2114a through 2114c by splitting the first coding unit 2110 having a rectangular shape in which the height is longer than the width. The video decoding apparatus 100 may use the PID indicating each coding unit so as to distinguish a plurality of coding units. According to an embodiment, the PID may be obtained from a sample at a predetermined location (e.g., an upper left sample) in each of the coding units.

According to an embodiment, the video decoding apparatus 100 may determine a coding unit at a certain location from among coding units determined by using PIDs for distinguishing coding units. According to an embodiment, when split shape information of the first coding unit 2110 having a rectangular shape in which a height is longer than a width indicates that the first coding unit 2110 is split into three coding units, the video decoding apparatus 100 may split the first coding unit 2110 into the three second coding units 2114a through 2114c. The video decoding apparatus 100 may assign a PID to each of the three second coding units 2114a through 2114c. The video decoding apparatus 100 may compare PIDs of an odd number of coding units so as to determine a center coding unit from among the coding units. The video decoding apparatus 100 may determine, as a coding unit at a center location from among coding units determined when the first coding unit 2110 is split, the second coding unit 2114b having a PID corresponding to a center value from among PIDs, based on PIDs of the coding units. According to an embodiment, while determining PIDs for distinguishing coding units, when the coding units do not have the same sizes, the video decoding apparatus 100 may determine PIDs based on a size ratio of the coding units. Referring to FIG. 21, the second coding unit 2114b generated when the first coding unit 2110 is split may have the same width as the second coding units 2114a and 2114c, but may have a height twice higher than those of the second coding units 2114a and 2114c. In this case, when the PID of the second coding unit 2114b located at the center is 1, the PID of the second coding unit 2114c in a next order may be 3, the PID having increased by 2. As such, when an increasing range of PIDs differs while uniformly increasing, the video decoding apparatus 100 may determine that a current coding unit is split into a plurality of coding units including a coding unit having a different size from other coding units. According to an embodiment, when split shape information indicates splitting into an odd number of coding units, the video decoding apparatus 100 may split a current coding unit into a plurality of coding units, in which a coding unit at a certain location (for example, a center coding unit) has a size different from other coding units. In this case, the video decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the video decoding apparatus 100 may use a certain data unit from which recursive splitting of a coding unit is started.

Figure 22:
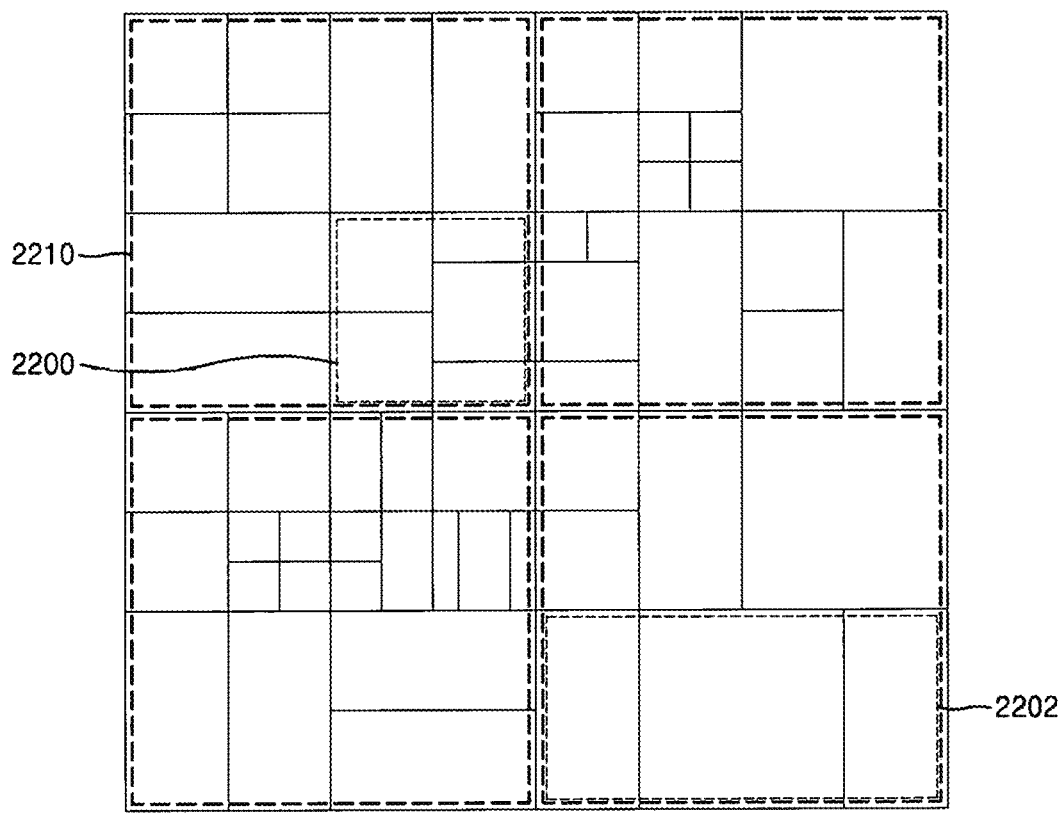
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively split by using at least one of block shape information and split shape information. In other words, the certain data unit may correspond to a coding unit of an uppermost depth used while determining a plurality of coding units by splitting a current picture. Hereinafter, the certain data unit is referred to as a reference data unit for convenience of description.

According to an embodiment, the reference data unit may indicate a certain size and shape. According to an embodiment, the reference data unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the video decoding apparatus 100 may split a current picture into a plurality of reference data units. According to an embodiment, the video decoding apparatus 100 may split the plurality of reference data units obtained by splitting the current picture by using split shape information about each of the reference data units. Split processes of such reference data units may correspond to split processes using a quad-tree structure.

According to an embodiment, the video decoding apparatus 100 may pre-determine a smallest size available for the reference data unit included in the current picture. Accordingly, the video decoding apparatus 100 may determine the reference data unit having various sizes that are equal to or larger than the smallest size, and determine at least one coding unit based on the determined reference data unit by using block shape information and split shape information.

Referring to FIG. 22, the video decoding apparatus 100 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the obtainer 105 of the video decoding apparatus 100 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of splitting the current coding unit 1000 of FIG. 10, and processes of determining at least one coding unit included in the reference coding unit 2200 having a non-square shape have been described above through processes of splitting the current coding unit 1100 or 1150 of FIG. 11, and thus details thereof are not provided again.

According to an embodiment, in order to determine a size and shape of a reference coding unit according to some data units pre-determined based on a predetermined condition, the video decoding apparatus 100 may use a PID for distinguishing the size and shape of the reference coding unit. In other words, the obtainer 105 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The video decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. In other words, the video decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the video decoding apparatus 100 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the video decoding apparatus 100 may determine a reference coding unit by splitting a largest coding unit n times according to a quad-tree structure, and split the reference coding unit based on at least one of block shape information and split shape information according to various embodiments.

Figure 23:
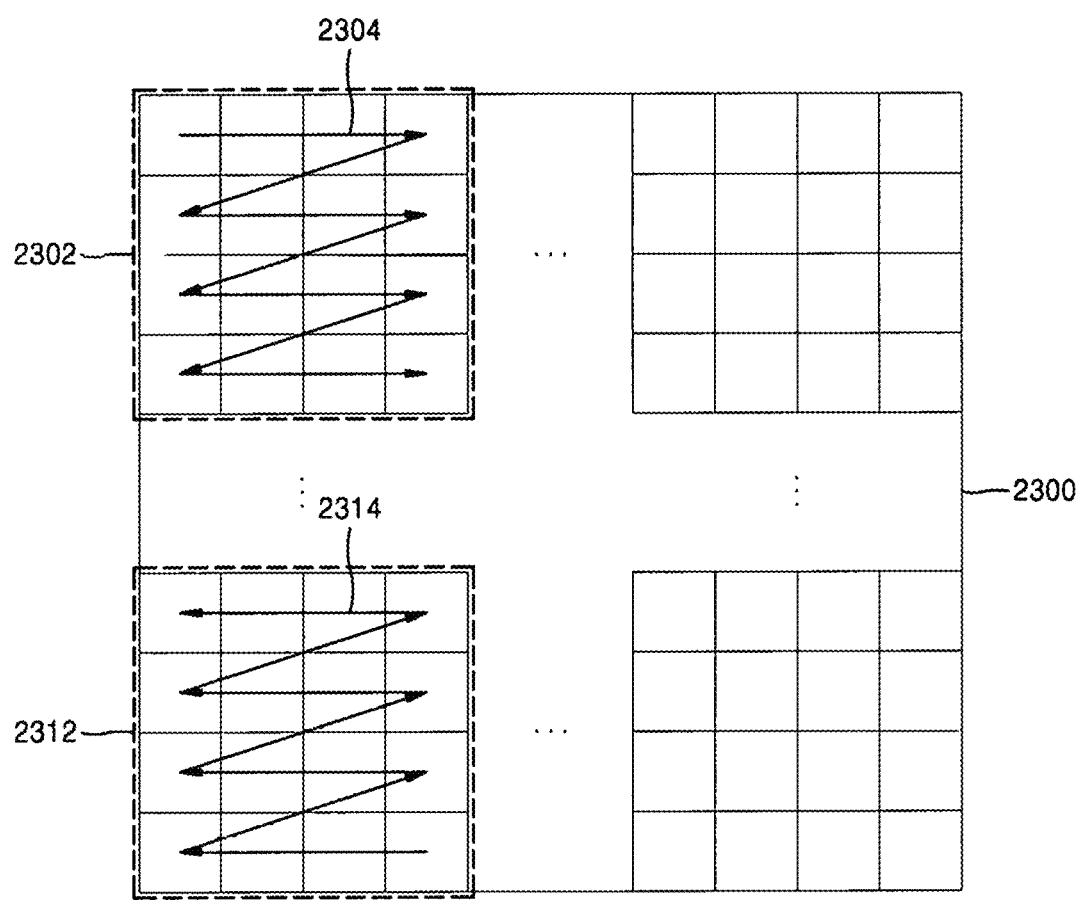
FIG. 23 illustrates a processing block serving as a criterion of determining a determination order of reference coding units included in a picture, according to an embodiment.

FIG. 23 illustrates a processing block serving as a criterion of determining a determination order of reference coding units included in a picture 2300, according to an embodiment.

According to an embodiment, the video decoding apparatus 100 may determine at least one processing block splitting a picture. A processing block is a data unit including at least one reference coding unit splitting an image, and the at least one reference coding unit included in the processing block may be determined in a certain order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the video decoding apparatus 100 may determine a size of at least one processing block included in an image by obtaining information about a size of a processing block. The video decoding apparatus 100 may obtain, from a bitstream, the information about a size of a processing block to determine the size of the at least one processing block included in the image. The size of the processing block may be a predetermined size of a data unit indicated by the information about the size of the processing block.

According to an embodiment, the obtainer 105 of the video decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the obtainer 105 may obtain, from the bitstream, the information about a size of a processing block according to such several data units, and the video decoding apparatus 100 may determine the size of at least one processing block splitting the picture by using the obtained information about a size of a processing block, wherein the size of the processing block may be an integer times a size of a reference coding unit.

According to an embodiment, the video decoding apparatus 100 may determine sizes of processing blocks 2302 and 2312 included in the picture 2300. For example, the video decoding apparatus 100 may determine a size of a processing block based on information about a size of a processing block, the information being obtained from a bitstream. Referring to FIG. 23, the video decoding apparatus 100 may determine horizontal sizes of the processing blocks 2302 and 2312 to be four times a horizontal size of a reference coding unit, and a vertical size thereof to be four times a vertical size of the reference coding unit, according to an embodiment. The video decoding apparatus 100 may determine a determining order of at least one reference coding unit in at least one processing block.

According to an embodiment, the video decoding apparatus 100 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining a size of the reference coding unit.

According to an embodiment, the video decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the video decoding apparatus 100 may obtain, from a bitstream, information about a determining order of a reference coding unit according to certain data units. For example, the obtainer 105 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the video decoding apparatus 100 may determine at least one reference coding unit based on the determined order.

According to an embodiment, the obtainer 105 may obtain, from the bitstream, information about a determining order of a reference coding unit, as information related to the processing blocks 2302 and 2312, and the video decoding apparatus 100 may determine an order of determining at least one reference coding unit included in the processing blocks 2302 and 2312 and determine at least one reference coding unit included in the picture 2300 according to a determining order of a coding unit. Referring to FIG. 23, the video decoding apparatus 100 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The video decoding apparatus 100 may decode determined at least one reference coding unit, according to an embodiment. The video decoding apparatus 100 may decode an image based on reference coding units determined through above embodiments. Examples of a method of decoding a reference coding unit may include various methods of decoding an image.

According to an embodiment, the video decoding apparatus 100 may obtain, from a bitstream, and use block shape information indicating a shape of a current coding unit or split shape information indicating a method of splitting the current coding unit. The block shape information or the partition shape information may be included in a bitstream related to various data units. For example, the video decoding apparatus 100 may use the block shape information or split shape information, which is included in a sequence parameter set, a picture parameter set, a video parameter set, a slice header, and a slice segment header. In addition, the video decoding apparatus 100 may obtain, from a bitstream, and use syntax corresponding to the block shape information or the split shape information, according to largest coding units, reference coding units, and processing blocks.

One or more embodiments are described as above. It will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. A video decoding method comprising:
   obtaining a bitstream including residual data about a residual block of a current block;
   determining a plurality of prediction directions with respect to the current block among a plurality of prediction direction candidates;
   determining a plurality of reference samples included in a neighboring region of the current block in a current image, by using the plurality of prediction directions that are determined among the plurality of the prediction direction candidates;
   generating a prediction block of the current block by using the plurality of reference samples;
   obtaining a residual block of the current block based on the residual data about the residual block of the current block; and
   reconstructing the current block by using the prediction block of the current block and the residual block of the current block,
   wherein the determining of the plurality of prediction directions with respect to the current block comprises determining a first prediction direction in the current block and a second prediction direction in the current block, by using an anchor prediction direction which is indicated by an anchor sample from among samples of an anchor region,
   wherein the samples of the anchor region include some samples of the neighboring region of the current block.

2. The video decoding method of claim 1, wherein a difference between indices of two of the plurality of prediction directions is 1.

3. The video decoding method of claim 1, wherein the determining of the plurality of prediction directions with respect to the current block comprises:
   determining the first prediction direction of a first region in the current block, by using an anchor prediction direction of an anchor sample from among samples of an anchor region including some samples of the neighboring region of the current block; and
   determining the second prediction direction of a second region in the current block by using the anchor prediction direction of the anchor sample.

4. The video decoding method of claim 3, wherein the first region or the second region is a sample or an M×N block (M and N are integers).

5. The video decoding method of claim 1, wherein the plurality of prediction directions with respect to the current block comprise the first prediction direction and a second prediction direction, and
   the determining of the plurality of reference samples included in the neighboring region of the current block in a current image, by using the plurality of prediction directions that are determined, comprises:
   determining a first reference sample by using the first prediction direction; and
   determining a second reference sample by using the second prediction direction,
   and the generating of the prediction block of the current block comprises:
   generating a first prediction block of the current block by using the first reference sample;
   generating a second prediction block of the current block by using the second reference sample; and
   generating the prediction block by using the first prediction block and the second prediction block.

6. The video decoding method of claim 5, further comprising:
   obtaining, from the bitstream, information about the first prediction direction;
   and
   determining the second prediction direction by using the information about the first prediction direction.

7. The video decoding method of claim 3, wherein the first prediction direction and the second prediction direction are determined by performing an interpolation based on a plurality of anchor prediction directions according to locations of the first region and the second region, which are apart from a location of a plurality of anchor samples which indicate the plurality of the anchor prediction directions.

8. The video decoding method of claim 3, wherein a block including the
   current block is hierarchically split to generate a transformation block having at least one transformation depth between a current transformation depth and a lower transformation depth, and the first region is one of the transformation block having at least one transformation depth between the current transformation depth and the lower transformation depth.

9. The video decoding method of claim 1, wherein the current block is split in a horizontal direction or a vertical direction to generate a first block and a second block, and
   the determining of the plurality of prediction directions with respect to the current block comprises:
   determining the first prediction direction of a first region included in the first block and the second prediction direction of a second region included in the first block, by using an anchor prediction direction of an anchor sample from among samples of a first anchor region that includes some samples of a neighboring region of the first block; and determining a third prediction direction of a third region included in the second block and a fourth prediction direction of a fourth region in the second block, by using an anchor prediction direction of an anchor sample from among samples of a second anchor sample that includes some samples of a neighboring region of the second block.

10. The video decoding method of claim 9, wherein a filtering is performed with respect to prediction directions or prediction values of samples located around a boundary between the first block and the second block.

11. The video decoding method of claim 1, further comprising
obtaining, from the bitstream, a flag indicating whether an intra prediction is performed on the current block based on one prediction direction or based on a plurality of prediction directions,
wherein the determining of the plurality of prediction directions with respect to the current block comprises:
when the flag indicates that the intra prediction is performed on the current block based on the plurality of prediction directions, determining the plurality of prediction directions, and
the determining of the plurality of reference samples included in the neighboring region of the current block in a current image, by using the plurality of prediction directions that are determined, comprises:
when the flag indicates that the intra prediction is performed on the current block based on the plurality of prediction directions, determining a plurality of reference samples included in a neighboring region of the current block in a current image, by using the determined plurality of prediction directions.

12. A video encoding method comprising:
performing an intra prediction on a current block based on a plurality of prediction direction candidates with respect to the current block;
determining a plurality of prediction directions among the plurality of the prediction direction candidates with respect to the current block based on the intra prediction on the current block;
generating a residual block of the current block by using a prediction block of the current block that is generated according to the determined plurality of prediction directions among the plurality of the prediction direction candidates with respect to the current block; and
generating a bitstream including data about the residual block,
wherein the performing of the intra prediction on the current block based on the plurality of prediction directions with respect to the current block comprises:
determining a plurality of reference samples included in a neighboring region of the current block in a current image, by using the plurality of prediction directions among the plurality of the prediction direction candidates with respect to the current block; and
generating the prediction block of the current block by using the plurality of reference samples,
wherein the determining of the plurality of prediction directions with respect to the current block comprises:
determining a first prediction direction in the current block and a second prediction direction in the current block, by using an anchor prediction direction which is indicated by an anchor sample from among samples of an anchor region,
wherein the samples of the anchor region include some samples of the neighboring region of the current block.

13. The video encoding method of claim 12, wherein the plurality of prediction direction candidates comprise the second prediction direction and a third prediction direction, wherein a difference between an index of one of the second prediction and the third prediction direction and an index of the first prediction direction is 1, the performing of the intra prediction on the current block based on the plurality of prediction direction candidates with respect to the current block comprises performing an intra prediction on the current block by using the first prediction direction and the second prediction direction among the plurality of the prediction candidates, and the determining of the plurality of prediction directions with respect to the current block comprises determining the first prediction direction and the second prediction direction among the plurality of the prediction candidates based on the intra prediction.

14. A video decoding apparatus comprising:
an obtainer configured to obtain a bitstream including residual data about a residual block of a current block;
an intra predictor configured to determine a plurality of prediction directions among a plurality of prediction direction candidates with respect to the current block, to determine a plurality of reference samples included in a neighboring region of the current block in a current image by using the determined plurality of prediction directions among the plurality of the prediction direction candidates, and to generate a prediction block of the current block by using the plurality of reference samples; and
an image decoder configured to obtain the residual block of the current block based on the residual data about the residual block of the current block, and to reconstruct the current block by using the residual block of the current block,
wherein when the intra predictor determines the plurality of prediction directions with respect to the current block, the intra predictor determines a first prediction direction in the current block and a second prediction direction in the current block, by using an anchor prediction direction which is indicated by an anchor sample from among samples of an anchor region,
wherein the samples of the anchor region include some samples of the neighboring region of the current block.

15. A video encoding apparatus comprising:
an intra predictor configured to perform an intra prediction on a current block based on a plurality of prediction direction candidates with respect to the current block,
and to determine a plurality of prediction directions among the plurality of the prediction direction candidates with respect to the current block based on the intra prediction on the current block; and
an image encoder configured to generate a residual block of the current block by using a prediction block of the current block that is generated according to the determined plurality of prediction directions among the plurality of the prediction direction candidates with respect to the current block, and to generate a bitstream including data about the residual block,
wherein the intra predictor is configured to determine a plurality of reference samples included in a neighboring region of the current block in a current image by using the plurality of prediction directions among the plurality of the prediction direction candidates with respect to the current block, and to generate the prediction block of the current block by using the plurality of reference samples, wherein when the intra predictor determines the plurality of prediction directions with respect to the current block, the intra predictor determines a first prediction direction in the current block and a second prediction direction in the current block, by using an anchor prediction direction which is indicated by an anchor sample from among samples of an anchor region, wherein the samples of the anchor region include including some samples of the neighboring region of the current block.

* * * * *